United States Patent [19]

Pfeiffer et al.

[11] Patent Number: 5,146,592
[45] Date of Patent: Sep. 8, 1992

[54] HIGH SPEED IMAGE PROCESSING COMPUTER WITH OVERLAPPING WINDOWS-DIV

[75] Inventors: David M. Pfeiffer, Plano; David T. Stoner, McKinney; John P. Norsworthy, Carrollton; Dwight D. Dipert, Richardson; Jay A. Thompson; James A. Fontaine, both of Plano; Michael K. Corry, Dallas, all of Tex.

[73] Assignee: Visual Information Technologies, Inc., Plano, Tex.

[21] Appl. No.: 301,371

[22] Filed: Jan. 24, 1989

Related U.S. Application Data

[62] Division of Ser. No. 97,664, Sep. 14, 1987, Pat. No. 4,985,848.

[51] Int. Cl.⁵ .............................................. G06F 15/20
[52] U.S. Cl. ..................................... 395/157; 395/164
[58] Field of Search ................ 364/518, 521; 340/721, 340/723, 798–800; 382/44–48

[56] References Cited

U.S. PATENT DOCUMENTS

| Re. 31,200 | 4/1983 | Sukonick | 340/724 |
|---|---|---|---|
| 3,614,742 | 10/1971 | Watson et al. | 364/200 |
| 3,614,766 | 10/1971 | Kievit | 340/726 |
| 3,641,555 | 2/1972 | Griffin | 340/709 |
| 3,697,678 | 10/1972 | Belleson | 360/10.1 |
| 3,716,842 | 2/1973 | Belady et al. | 364/200 |
| 3,735,363 | 5/1973 | Beers et al. | 364/200 |
| 3,739,345 | 6/1973 | Janssens et al. | 364/200 |
| 3,771,141 | 11/1973 | Culler | 364/200 |
| 3,787,673 | 1/1974 | Watson et al. | 364/736 |
| 3,868,649 | 2/1975 | Sato et al. | 364/200 |
| 3,891,792 | 6/1975 | Kimura | 358/142 |
| 3,906,480 | 9/1975 | Alexander et al. | 340/745 |
| 3,938,102 | 2/1976 | Morrin et al. | 382/44 |
| 3,959,774 | 5/1976 | Mead | 364/200 |
| 3,976,982 | 8/1976 | Eiselen | 382/44 |
| 3,995,253 | 11/1976 | Morrin et al. | 382/44 |
| 3,996,559 | 12/1976 | Morrin et al. | 382/44 |
| 3,996,585 | 12/1976 | Hogan et al. | 340/747 |
| 4,057,836 | 11/1977 | Munsey | 358/140 |
| 4,070,710 | 1/1978 | Sukonick et al. | 34/900 |
| 4,090,174 | 5/1978 | Van Vorrhis | 382/44 |
| 4,103,331 | 7/1978 | Thacker | 364/200 |
| 4,104,624 | 8/1978 | Hamada | 340/324 AD |
| 4,119,955 | 10/1978 | Nichols, III | 340/324 AD |
| 4,120,028 | 10/1978 | Membrino et al. | 364/200 |
| 4,121,283 | 10/1978 | Walker | 364/200 |
| 4,128,880 | 12/1978 | Cray, Jr. | 364/200 |
| 4,148,070 | 4/1979 | Taylor | 358/160 |
| 4,149,152 | 4/1979 | Russo | 340/703 |
| 4,163,249 | 7/1979 | Michael et al. | 358/21 R |
| 4,165,072 | 8/1979 | Stubben | 273/85 G |
| 4,173,783 | 11/1979 | Couleur et al. | 364/200 |

(List continued on next page.)

Primary Examiner—Heather R. Herndon
Attorney, Agent, or Firm—Baker & Botts

[57] ABSTRACT

An image processor having an image algorithm processor (66) operating under control of a writable control store (94), and a number of parallel image processors (72) operating under control of instruction words from a writable control store (100). An image memory controller (68) receives memory addresses from the image algorithm processor (66) for coordinating the reading and writing of an image memory (82) using pixel data processed by the parallel image processor set (72). The image memory controller (68) arbitrates memory address request cycles, memory refresh cycles and screen refresh cycles. The image memory (82) includes different planes (84, 86 and 88) associated with red, green and blue pixel data. Associated with each image memory plane is a video processor (106) for converting parallel image data to high speed serial image data. The pixel data output by the video processor (106) is further processed through look-up tables (108) to provide red, green and blue color signals for output to a video monitor (28). Overlay data is stored in an overlay memory plane (90), and is processed by an associated overlay data processor (80) and a video output overlay processor (116). A window clipping circuitry monitors the memory addresses from the image algorithm processor (66) to determined whether one or more pixels of a multi-pixel word are located outside of a window.

13 Claims, 30 Drawing Sheets

U.S. PATENT DOCUMENTS

| | | | |
|---|---|---|---|
| 4,183,058 | 1/1980 | Taylor | 358/127 |
| 4,197,590 | 4/1980 | Sukonick et al. | 364/900 |
| 4,208,723 | 6/1980 | Lecklider | 364/900 |
| 4,228,430 | 10/1980 | Iwamura et al. | 340/709 |
| 4,229,797 | 10/1980 | Ledley | 364/518 |
| 4,237,543 | 12/1980 | Nishio et al. | 364/900 |
| 4,258,385 | 3/1981 | Greenberg et al. | 358/22 |
| 4,259,718 | 3/1981 | Kaman et al. | 364/200 |
| 4,266,242 | 5/1981 | McCoy | 358/22 |
| 4,303,986 | 12/1981 | Lans | 364/900 |
| 4,309,691 | 1/1982 | Castleman | 364/200 |
| 4,330,833 | 5/1982 | Pratt et al. | 364/521 |
| 4,357,624 | 11/1982 | Greenburg | 358/22 |
| 4,375,638 | 3/1983 | O'Keefe et al. | 340/726 |
| 4,386,410 | 5/1983 | Pandya et al. | 364/518 |
| 4,395,697 | 7/1983 | Dargel et al. | 382/41 |
| 4,395,698 | 7/1983 | Sternberg et al. | 382/27 |
| 4,395,700 | 7/1983 | McCubbrey et al. | 382/27 |
| 4,414,621 | 11/1983 | Bown et al. | 364/200 |
| 4,434,502 | 2/1984 | Arakawa et al. | 382/41 |
| 4,435,792 | 3/1984 | Bechtolsheim | 365/230 |
| 4,437,121 | 3/1984 | Taylor et al. | 358/160 |
| 4,439,759 | 3/1984 | Fleming et al. | 340/703 |
| 4,439,760 | 3/1984 | Fleming | 340/799 |
| 4,442,495 | 4/1984 | Sukonick | 364/521 |
| 4,459,677 | 7/1984 | Porter et al. | 364/900 |
| 4,463,372 | 7/1984 | Bennett et al. | 358/22 |
| 4,463,380 | 7/1984 | Hooks, Jr. | 358/160 |
| 4,467,412 | 8/1984 | Hoff | 364/200 |
| 4,468,688 | 8/1984 | Gabriel et al. | 358/22 |
| 4,472,732 | 9/1984 | Bennett et al. | 358/22 |
| 4,475,161 | 10/1984 | Stock | 364/521 |
| 4,477,802 | 10/1984 | Walter et al. | 340/727 |
| 4,482,979 | 11/1984 | May | 364/900 |
| 4,484,187 | 11/1984 | Brown et al. | 340/703 |
| 4,484,346 | 11/1984 | Sternberg et al. | 382/27 |
| 4,484,349 | 11/1984 | McCubbrey | 382/49 |
| 4,485,402 | 11/1984 | Searby | 358/160 |
| 4,491,834 | 1/1985 | Oguchi | 340/726 |
| 4,496,944 | 1/1985 | Collmeyer et al. | 340/750 X |
| 4,498,155 | 2/1985 | Rao | 365/189 |
| 4,500,875 | 2/1985 | Schmitz | 340/703 |
| 4,511,962 | 4/1985 | Machida et al. | 364/200 |
| 4,511,965 | 4/1985 | Rajaram | 364/200 |
| 4,514,818 | 4/1985 | Walker | 364/521 |
| 4,533,910 | 8/1985 | Sukonick et al. | 340/721 |
| 4,543,645 | 9/1985 | Vigarie | 364/900 |
| 4,545,068 | 10/1985 | Tabata | 382/41 |
| 4,545,070 | 10/1985 | Miyagawa et al. | 382/48 |
| 4,562,435 | 12/1985 | McDonough et al. | 340/798 |
| 4,563,703 | 1/1986 | Taylor et al. | 358/160 |
| 4,564,915 | 1/1986 | Evans et al. | 364/521 |
| 4,571,635 | 2/1986 | Mahmoddi et al. | 358/284 |
| 4,574,277 | 3/1986 | Krause et al. | 340/703 |
| 4,578,812 | 3/1986 | Yui | 382/41 |
| 4,595,958 | 6/1986 | Anderson, Jr. et al. | 358/296 |
| 4,602,285 | 7/1986 | Beaulier et al. | 358/160 |
| 4,602,286 | 7/1986 | Kellar et al. | 358/183 |
| 4,606,065 | 8/1986 | Beg et al. | 382/18 |
| 4,606,066 | 8/1986 | Hata et al. | 382/41 |
| 4,609,917 | 9/1986 | Shen | 340/729 |
| 4,611,232 | 9/1986 | Searby | 358/160 |
| 4,613,852 | 9/1986 | Maruko | 340/703 |
| 4,616,220 | 10/1986 | Grunewald et al. | 340/747 |
| 4,620,186 | 10/1986 | Krause et al. | 340/703 |
| 4,628,467 | 12/1986 | Nishi et al. | 364/521 |
| 4,631,750 | 12/1986 | Gabriel | 382/41 |
| 4,633,416 | 12/1986 | Walker | 364/521 |
| 4,644,495 | 2/1987 | Crane | 364/900 |
| 4,653,012 | 3/1987 | Duffy et al. | 364/521 X |
| 4,653,020 | 3/1987 | Cheselka et al. | 364/521 X |
| 4,694,288 | 9/1987 | Harada | 340/721 |
| 4,710,767 | 12/1987 | Sciacero et al. | 340/799 |
| 4,747,081 | 5/1988 | Heilveil et al. | 340/799 X |
| 4,789,963 | 12/1988 | Takahashi et al. | 364/521 X |

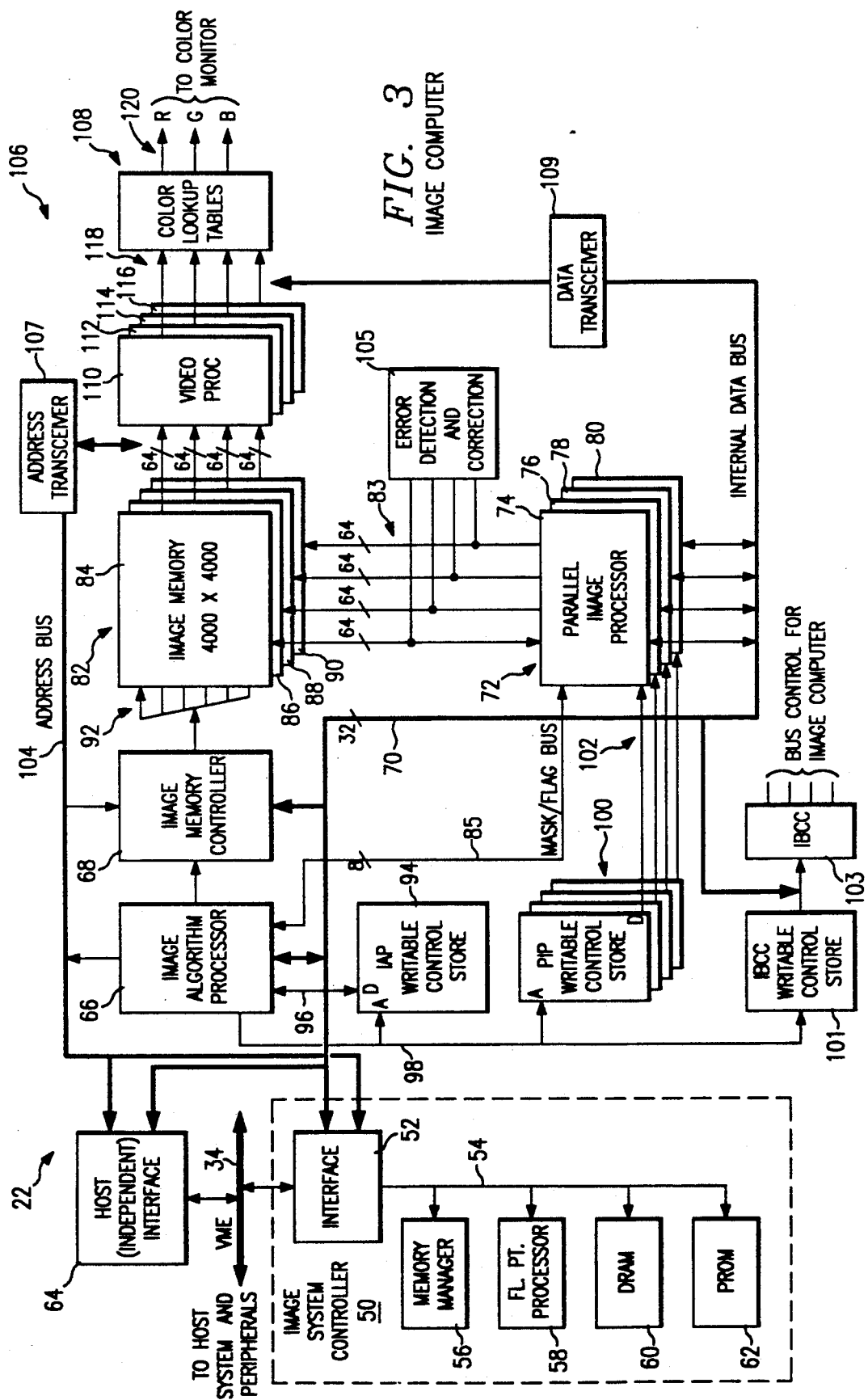
FIG. 3 IMAGE COMPUTER

IMAGE ALGORITHM PROCESSOR

IMAGE MEMORY CONTROLLER

DRAM REFRESH CONTROLLER

SCREEN REFRESH CONTROLLER

VIDEO STATE MACHINE

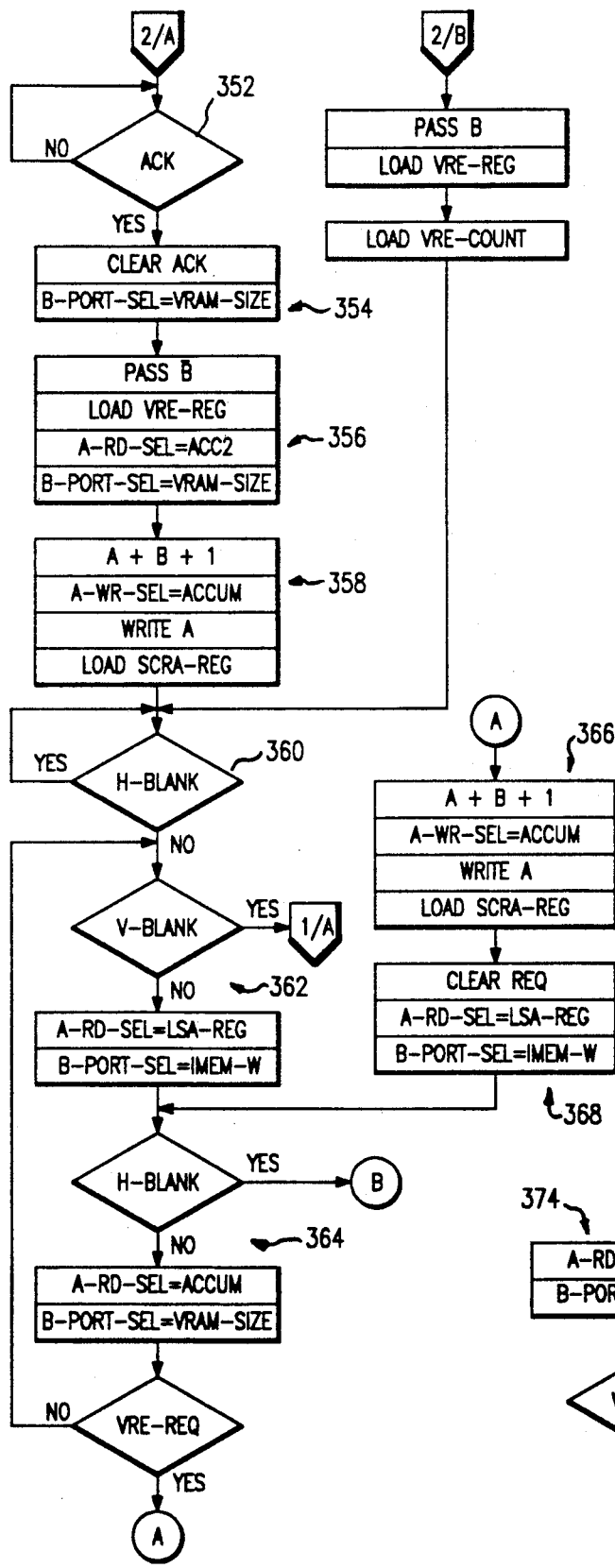
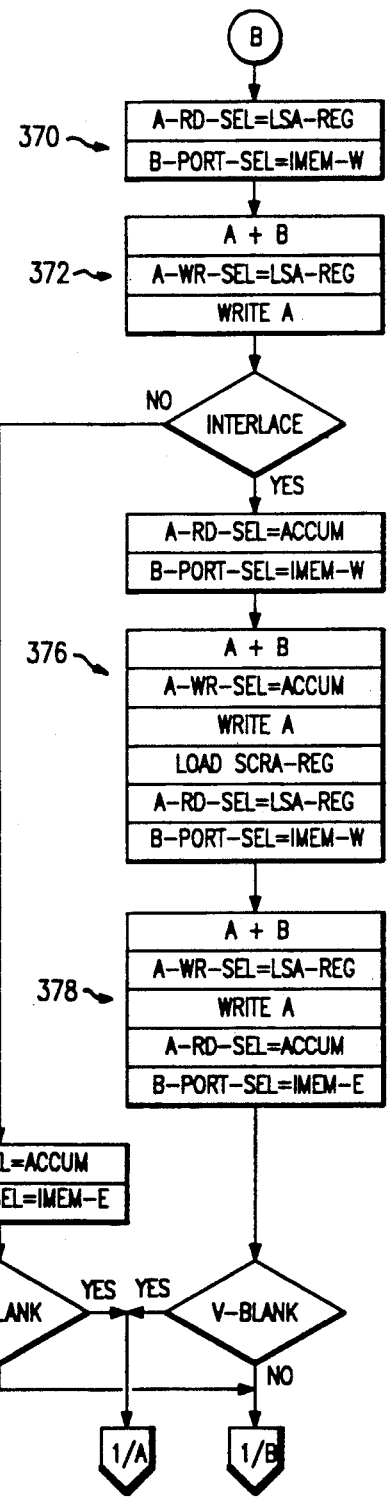
FIG. 11B

MEMORY ADDRESS MULTIPLEXER

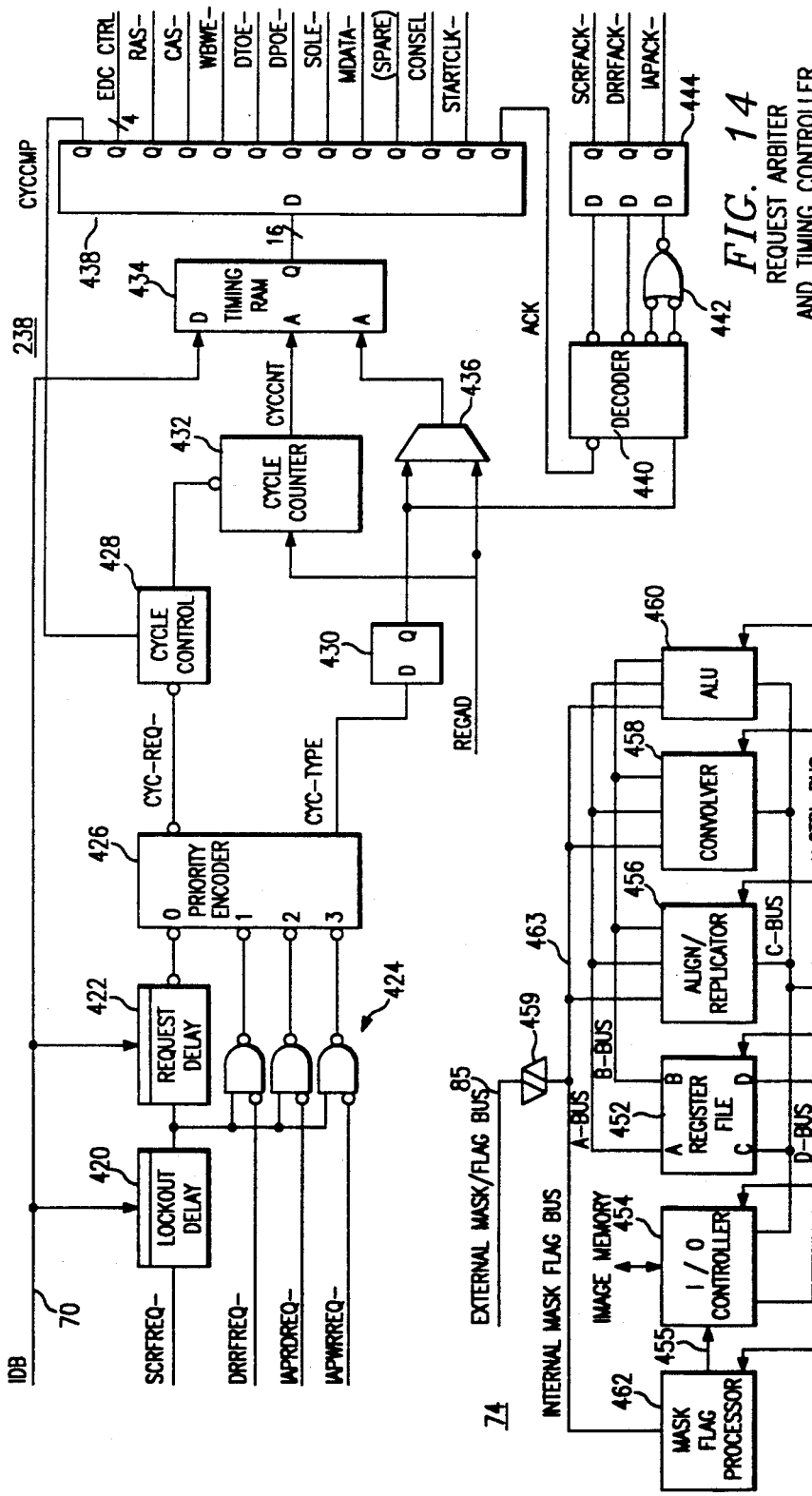
FIG. 14 REQUEST ARBITER AND TIMING CONTROLLER
FIG. 15 PARALLEL IMAGE PROCESSOR

PIP CONTROLLER

I/O CONTROLLER

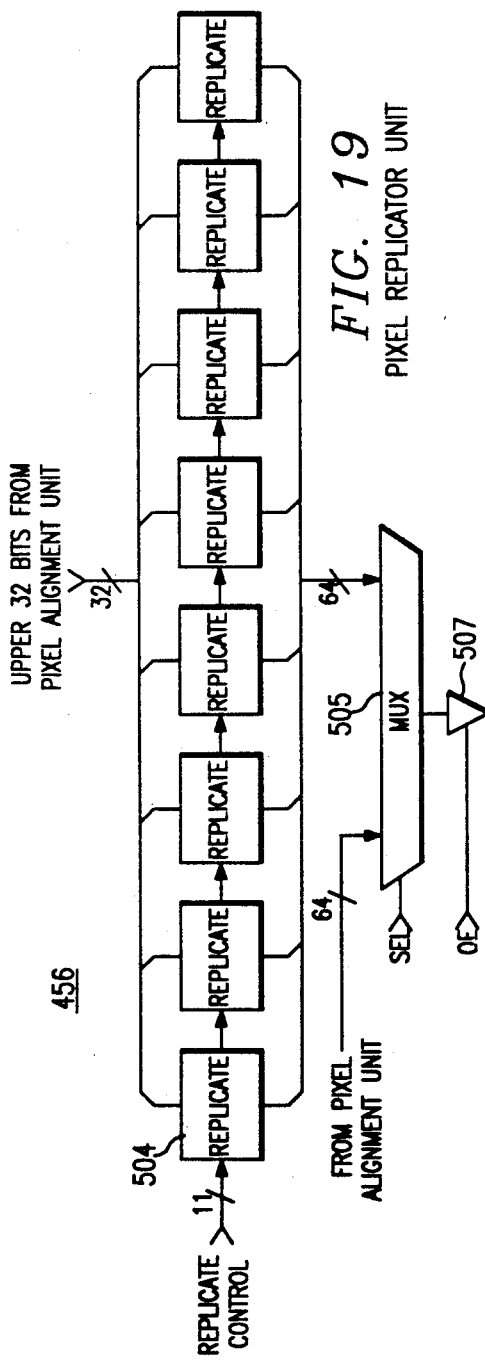
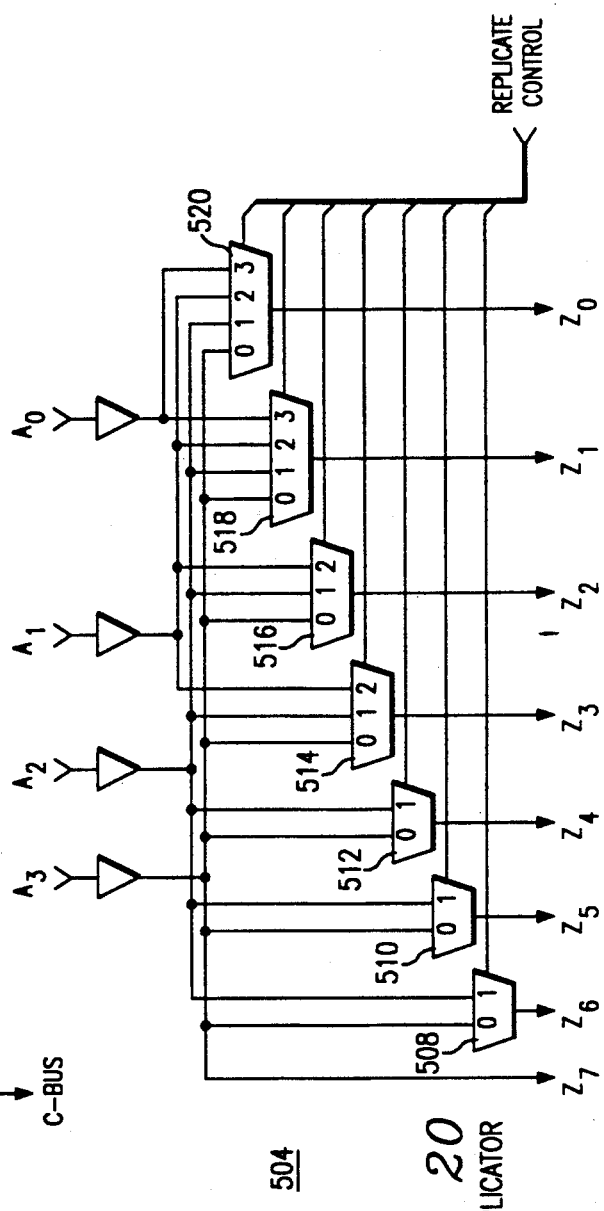
FIG. 19 PIXEL REPLICATOR UNIT
FIG. 20 PIXEL REPLICATOR

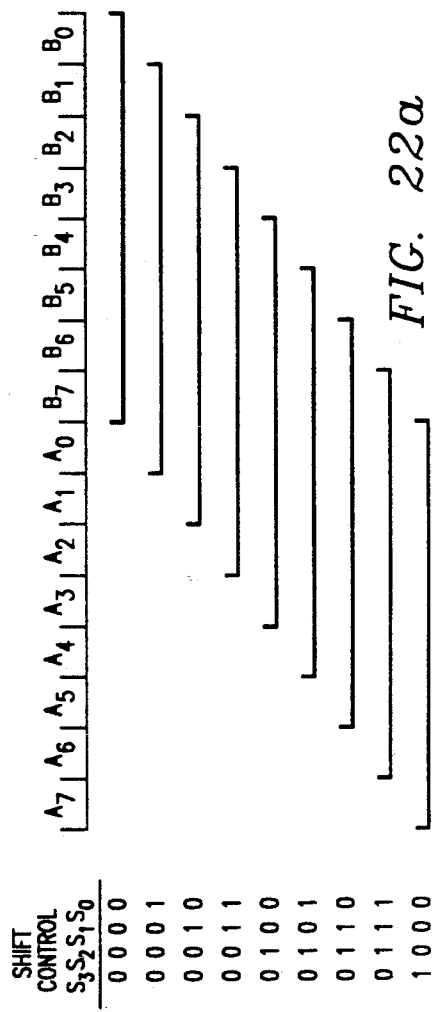

FUNNEL SHIFTER CIRCUIT

PIXEL CONVOLVER UNIT

SATURATE CIRCUIT

PIP-INTERNAL
DATA BUS INTERFACE

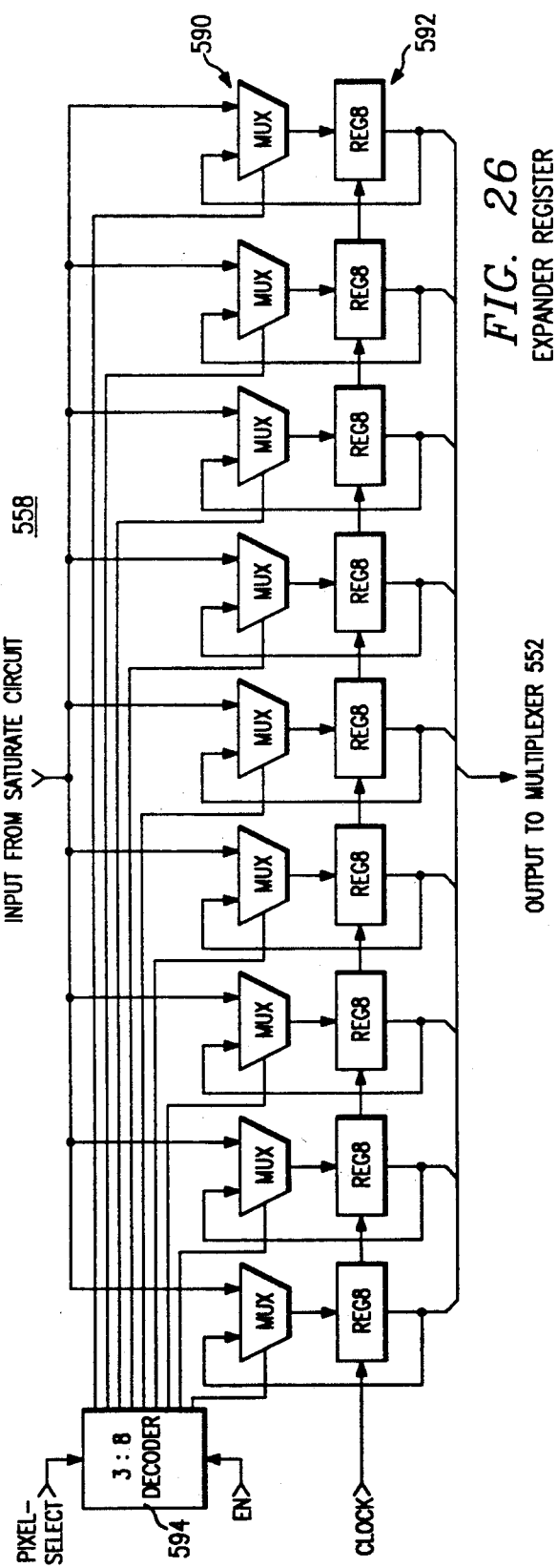
FIG. 26 EXPANDER REGISTER
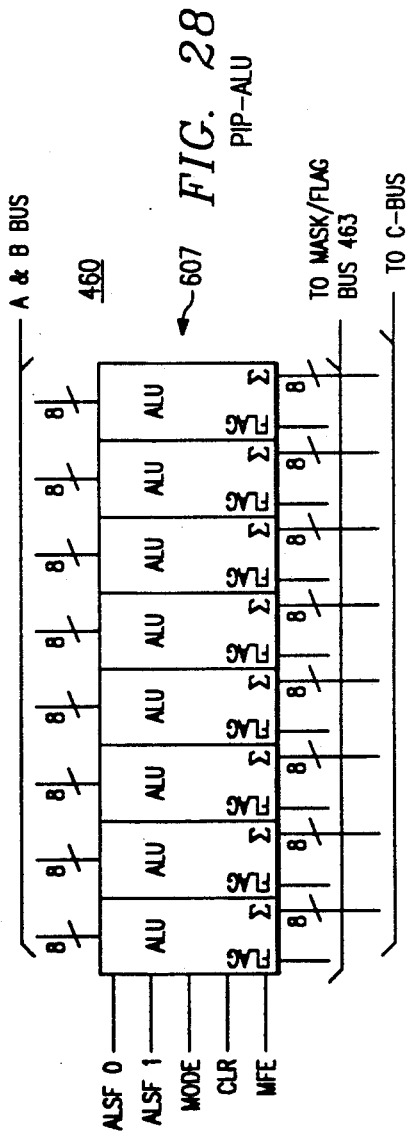
FIG. 28 PIP-ALU

PIP ARITHMETIC LOGIC SECTION

IAP MASK-FLAG PROCESSOR

PIP MASK-FLAG PROCESSOR

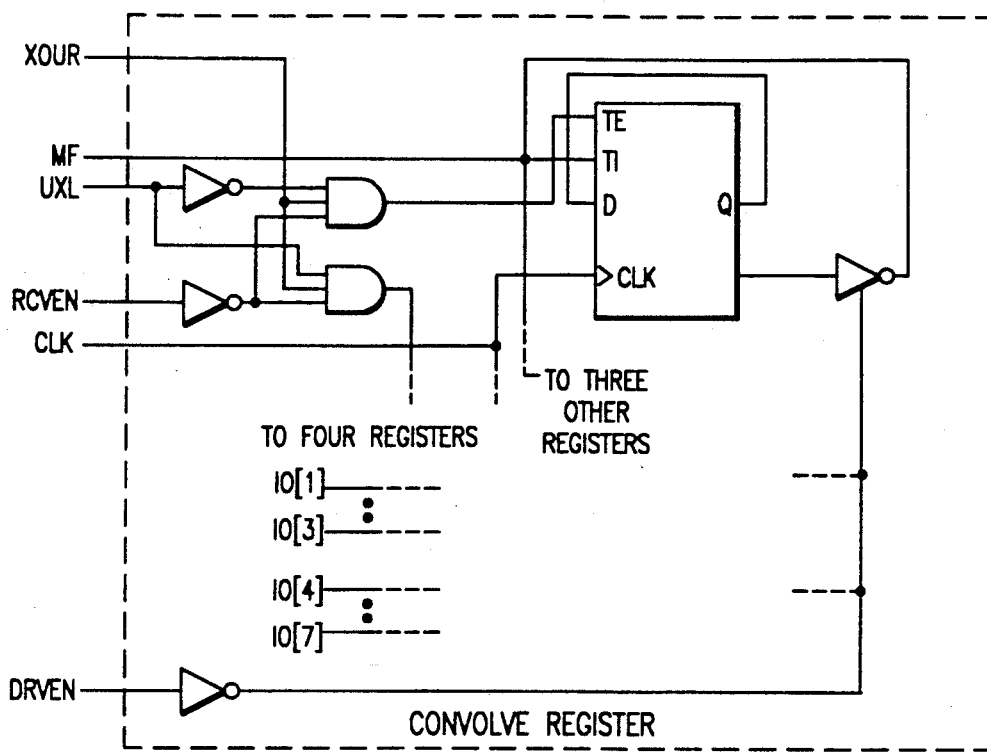
FIG. 34    627
CONVOLVE REGISTER
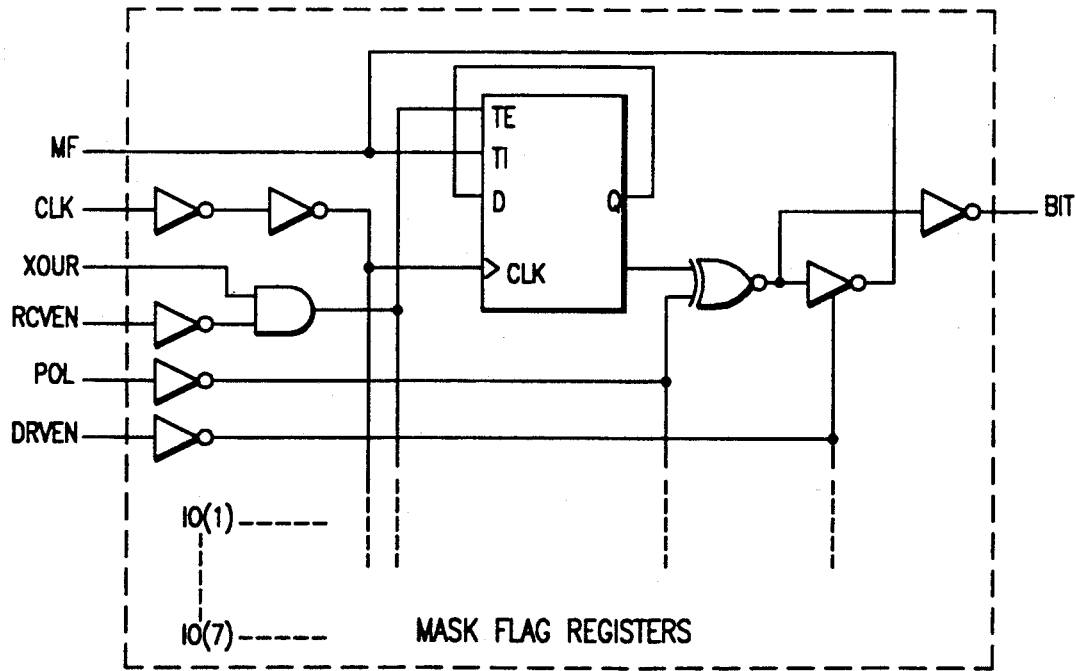
FIG. 35    629
MASK FLAG REGISTERS

ERROR DETECTION AND
AND CORRECTION UNIT

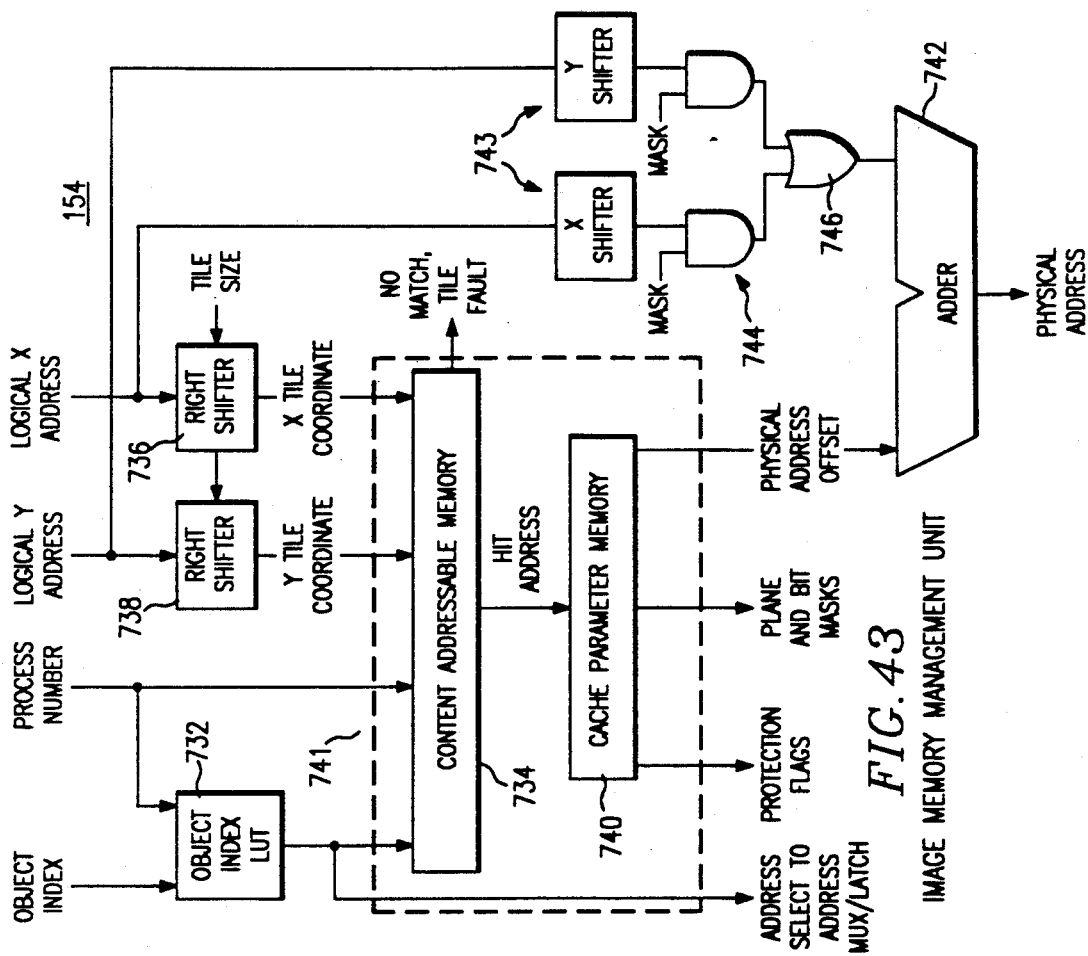
FIG. 43 IMAGE MEMORY MANAGEMENT UNIT
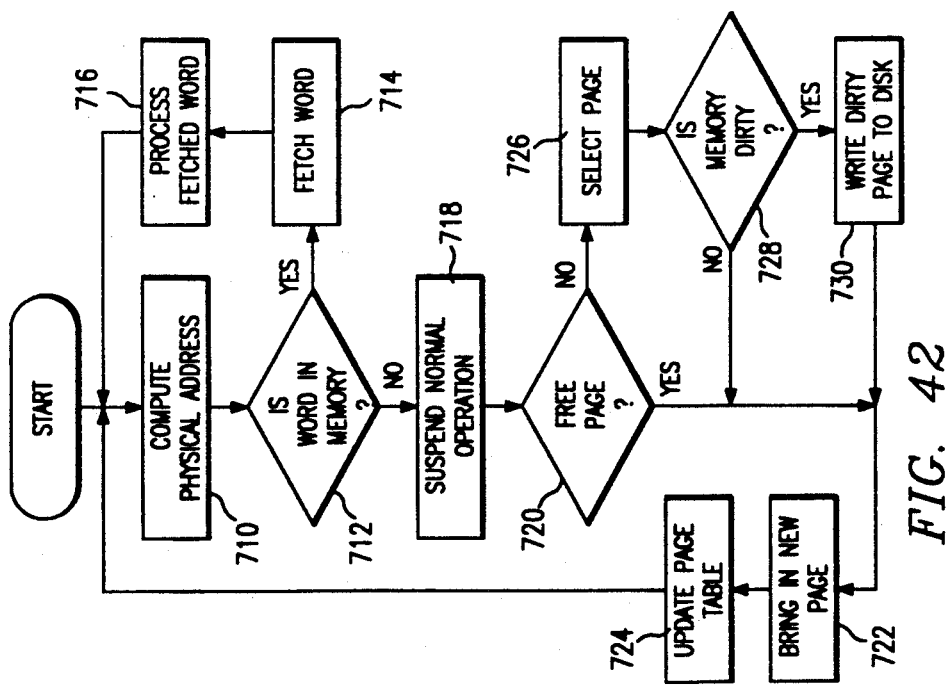
FIG. 42

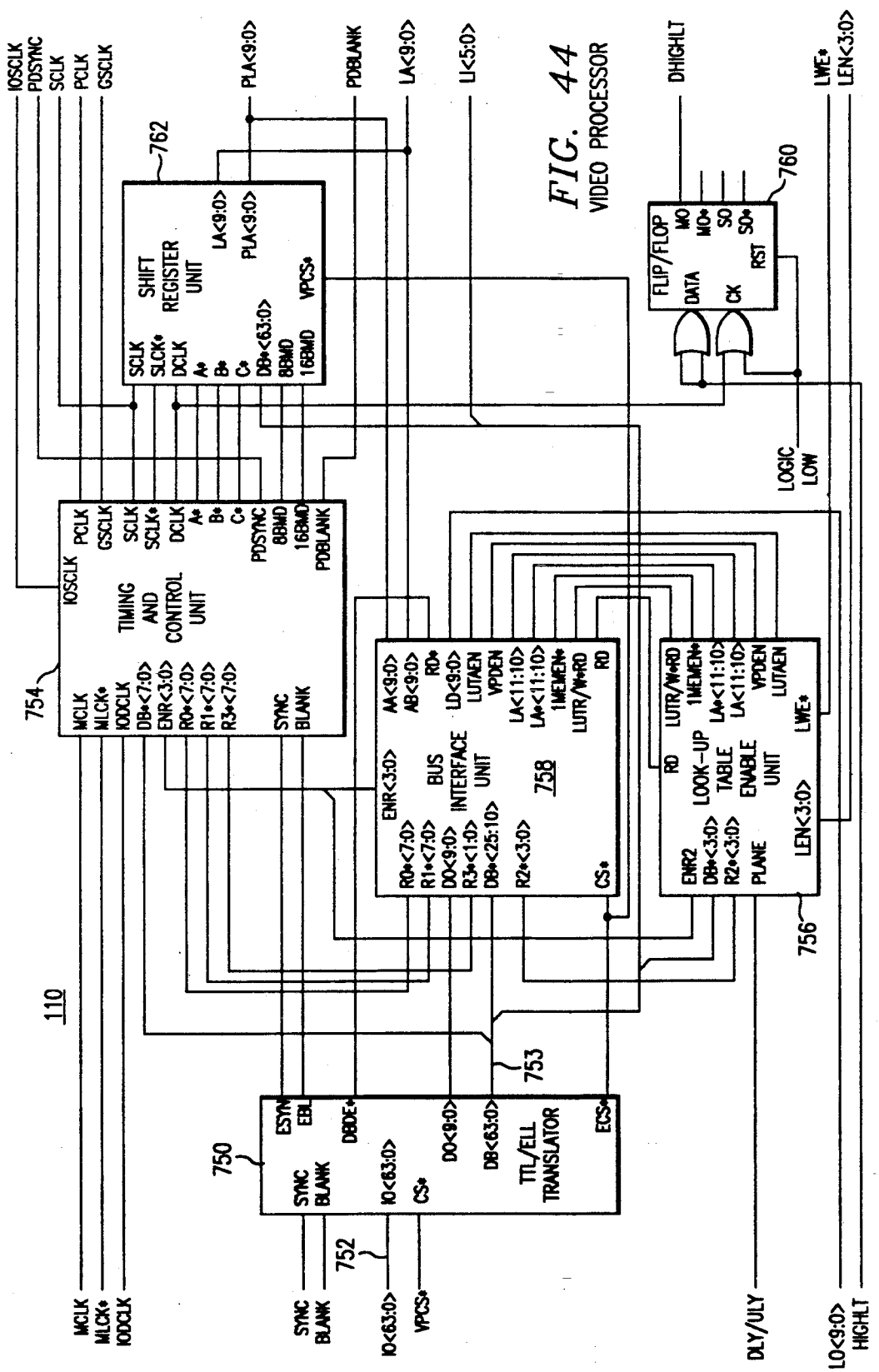

RED VIDEO PROCESSOR

VIDEO OUTPUT SECTION

HIGH SPEED IMAGE PROCESSING COMPUTER WITH OVERLAPPING WINDOWS-DIV

This is a divisional application of application Ser. No. 07/097,664, filed Sept. 14, 1987 and entitled "High Speed Image Processing Computer", now U.S. Pat. No. 4,985,848.

RELATED APPLICATION

This application is related to an Application for U.S. Pat. application Ser. No. 07/096,933, filed Sept. 14, 1987, now abandoned and entitled "HIGH SPEED IMAGE PROCESSING COMPUTER EMPLOYING VIDEO DRAMS TO PRODUCE RASTER SCAN PIXEL DATA", incorporated herein by reference.

TECHNICAL FIELD OF THE INVENTION

The present invention relates in general to image processing methods and apparatus, and more particularly relates to a high speed image computing system employing parallel processing of image data.

BACKGROUND OF THE INVENTION

Image processing is a relatively new field which involves the capturing of a video image, or other sensory image, and provides the ability to modify the image in various ways before presenting the same to a viewer. Graphics modification may be carried out in a number of well-known manners, such as scaling the size of the image, rotating it about an axis, modifying its color characteristics, etc. It is customary to convert images, pictures or other sensory information, into a digital format for storage in a memory of an image processing system. The data can then be operated upon in accordance with conventional algorithms for modifying the image to produce the desired visual effects.

Traditionally, the processing of an image is initiated by converting light, sound, x-rays, or other sensory information into digital values, and storing the same in a computer memory. Each digital value, or group of values comprising a word, represents a picture element, i.e., pixel, which are arranged in a grid pattern covering the image space known as an image array or pixel map. The image stored in a frame buffer can then be subjected to a series of operations to present an enhanced version thereof on a video screen, or printed on a paper media.

Several shortcomings are inherent with conventional image processing techniques. First, the size of the image presented to the viewer is constrained to that which can be accommodated by the computer memory. A four kilobit by four kilobit size memory has been found by some persons to be the optimum to provide a picture with sufficient resolution. In other applications, a 512×512 pixel array may be optimal. While larger memories could accommodate correspondingly more pixel storage area for larger images, more processing time is needed to operate upon the pixels and present an enhanced image thereof on a display screen. Accordingly, the overall system response becomes slower due to the additional data required to be processed.

Computer graphics have become well developed for generating geometric representations, such as lines, circles, polygons and other more complicated figures. Such representations are generated with specific mathematical equations, and can be altered by the interaction with a keyboard, or the like, and a computer. A repertoire of mathematical equations is generally provided, along with techniques for altering the same, to provide enhanced or modified geometrical figures. Again, a graphic representation of an image is stored in digital form in a pixel array of the image computer memory. The computer operates on the pixel data in the video frame buffer to redraw or display the enhanced graphical image on a screen, or print the same on a paper media. In contrast with image processing where an existing image is captured and a representation thereof is stored in a data base, graphical images are generated within the computer itself and stored in a data base.

It can be seen from the foregoing that a need exists for a high speed image processing system which provides image enhancement and feature extraction capabilities, neither of which compromise the system response nor the resolution or quality of the image. There is an associated need for providing improved image enhancement techniques in the nature of increased contrast or expansion to cover a larger dynamic range to also enhance the image for viewing or further processing. A further need exists for an image computing system for extracting features of the image and evaluating the foregoing and comparing the same with other stored parameters or data.

SUMMARY OF THE INVENTION

In accordance with the present invention, the disclosed methods and apparatus of the image computer substantially reduce or eliminate the disadvantages and shortcomings associated with the corresponding prior art methods and apparatus. According to the invention, there is disclosed a high speed image computer structured to provide an image memory buffer area which is larger than the viewable area of the display screen, and to provide parallel processing of data and address information in connection therewith to enhance high speed image processing capabilities.

The image computer of the invention includes individual memory planes, each associated with a blue, green and red color, as well as an additional overlay plane. High speed processing capability is accomplished by utilizing video dynamic random access memories (VRAM) having a first bidirectional random access port for accessing the memory cells of the array, and a second independent serial video port which is shift register controlled to provide high speed output serial image data.

A number of parallel image processors, comprising a composite parallel image processor set, function in parallel and independently, and are connected to associated planes of the image memory. 64-bit parallel buses are connected between the image memory planes and the respective parallel image processors to provide a massive interchange of pixel data therebetween to improve the response time of the system. With this arrangement, the size of each image memory buffer can be made large for storing a pixel array representative of an image which may be larger than that accommodatable by a CRT screen.

In order to further enhance the image processing capabilities of the image computer, the data processing functions of the parallel image processors are maintained distinct from the address and algorithm processing functions which are carried out by an image algorithm processor. Substantially all the image and graphics computations are under control of the image algorithm processor in conjunction with the parallel image processors. The image algorithm processor is the master controller of the image computer insofar as it calculates the addresses for the image memory and directs the parallel image processors in their data processing tasks. The addresses generated by the image algorithm processor can, for example, be used to move an image from one screen location to another, or used in convolving an image, or produce lines, circles, arcs or warping of images. An internal bus connects the image algorithm processor to the parallel image processors to transmit data and control signals thereto for use in processing image data. Further, the image algorithm processor is a microprogrammed processor with a sequencer and address calculation logic. Writable control stores supply the image algorithm processors, the parallel image processors, and an internal bus control circuit with microcode words for controlling the independent operations thereof.

Mask and flag buses and circuits connect the parallel image processors together, as well as to the image algorithm processor, to facilitate the transmission and processing of flag and write mask information therebetween. The independent operation of the memory address generation circuits and the pixel data processing circuits is enhanced. The mask/flag bus is constructed as an open drain or collector structure to provide wired-OR arithmetic operations. Such a bus structure enables an additional arithmetic operation without requiring extra processor cycles.

An image memory controller operates with the image algorithm processor for controlling the addressing of the memory and providing master timing and generating all the necessary control signals for the image memory. Video signals, such as video blanking and synchronization, are also provided by the image memory controller. A refresh controller provided with the image memory controller generates signals for refreshing the video DRAMS. Also, linear addresses received from the image algorithm processor are manipulated by the image memory controller into appropriate physical row and column addresses for addressing the video DRAMS of the image memory. Further included in the image memory controller is a screen refresh controller to control the loading and shifting of the VRAM serial shift registers to assure that a constant supply of pixel data is transmitted to the raster scan display device. Provisions are made to load the VRAM shift registers on-the-fly, during horizontal raster scanning, to enable the image memory to be more efficiently configured.

The data processing capabilities of the image computer are further enhanced by providing a plurality of video processors, each connected by a 64-bit bus to an associated image memory plane. Each video processor converts 64-bit parallel image memory data into 8-bits of high speed pixel data. The image data stored in the image memory constitutes color levels of the image. Further associated with each video processor are a respective multipage color look-up table, and an overlay look-up table, wherein the eight bits of serial data are translated or mapped into one of a possible sixteen million output intensities. The overlay look-up table is also associated with the overlay memory plane to be utilized therewith to provide the capability of transposing visual matter over the image on the screen.

The image computing system of the invention further includes an image memory management unit which controls the high speed swapping of image memory pages, as need be, so that large images can be processed without taking special programming precautions or measures. An additional feature of the invention is an error detection and correction unit employed in conjunction with the image memory to enhance the reliability thereof. The error detection and correction unit monitors the accuracy of all data written into or read from the image memory, including pixel data, image processing coefficients, intermediate processing results, etc.

BRIEF DESCRIPTION OF THE DRAWINGS

Further features and advantages will become more apparent from the following and more particular description of the preferred embodiment of the invention, as illustrated in the accompanying drawings in which like references characters generally refer to the same parts throughout the views, and in which:

FIG. 3 is a block diagram of the image computer of the invention;

FIGURES 11a and 11b are programmed operations carried out by the screen refresh controller sequencer;

FIG. 14 is an electrical schematic drawing of the video DRAM timing controller of the image memory controller;

FIG. 15 is a block diagram of one parallel image processor of the parallel image processor set of the invention;

FIG. 19 illustrates in block form the pixel replicator unit of the parallel image processor;

FIG. 20 illustrates in detail one pixel replicator circuit of the replicator unit of FIG. 19;

FIG. 21 illustrates in block form the pixel alignment unit of the parallel image processor;

FIG. 22a illustrates pixel shift patterns in the pixel alignment unit as a function of the shift control inputs;

FIG. 24 illustrates in electrical schematic diagram form the pixel shifter-divider circuit of the pixel convolver unit;

FIG. 26 is an electrical schematic drawing of the pixel expander circuit of the pixel convolver;

FIG. 28 illustrates in block diagram form the arithmetic logic unit of the parallel image processor, while

FIG. 31 shows in simplified form the mask/flag processor of the parallel image processor, while FIGURES 32-35 illustrate the details of various registers thereof;

FIG. 42 is an operational flow diagram of the image memory management unit of the invention;

FIG. 43 is an electrical schematic diagram of the image memory management unit of the invention;

FIG. 44 illustrates in block form the major circuits of the video processor and the bus interconnections therein;

DETAILED DESCRIPTION OF THE INVENTION

General

Figure 1:
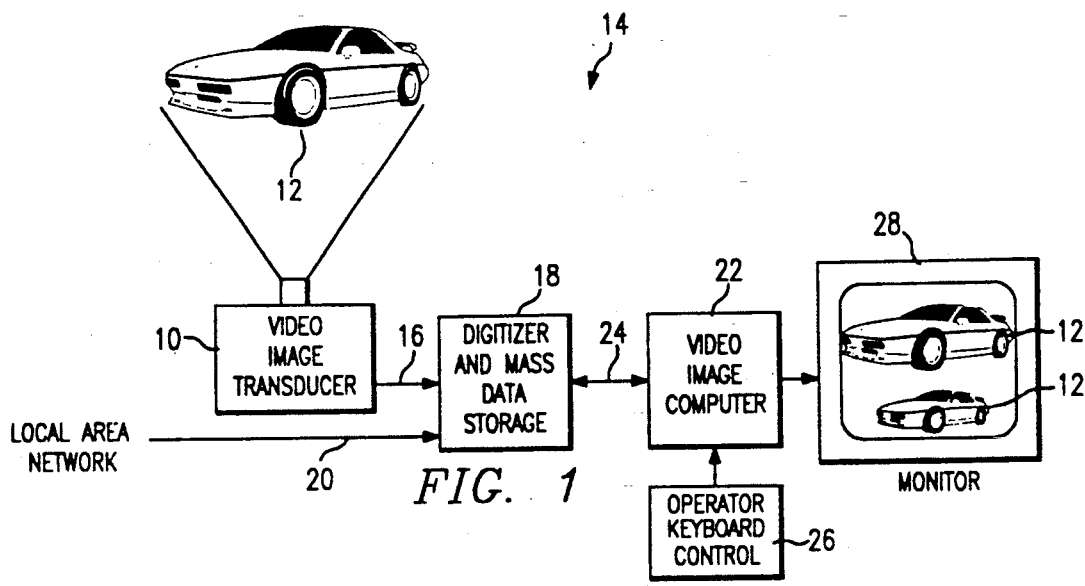
FIG. 1 illustrates a typical application in which video image computing is applicable.

The understanding of the invention can be facilitated by referring first to FIG. 1 of the drawings where there are shown the rudimentary functions and image processing capabilities of the invention. An image transducer 10, of some type, may be utilized to capture sensory information and convert it into a form useable by the invention. In the example, the transducer is a video camera directed to a scene including an automobile 12 against a background 14. In accordance with conventional video camera processing techniques, the output thereof on cable 16 is an analog representation of the scene captured by the video image transducer 10. A digitizer and data storage system 18 receives the analog input of the scene via the video image transducer cable 16, or by other interface means. The digitizer and data storage system 18 is adapted to convert the analog information of the scene into a digital format for storage and for ease of processing by the invention. As one of many alternatives, the digitizer and data storage system 18 may receive an input from a local area network 20.

The image processor further includes an image computer 22 connected by a bidirectional bus 24 to the digitizer and mass data storage system 18. The image computer 22 is adapted for retrieving the image data within the storage system 18 and for processing the same according to various techniques and algorithms to produce desired effects on the image. An operator keyboard control 26 is coupled to the image computer 22 to provide interactive communications between an operator and the image computer 22 to select one or more of the algorithms for operating on the image data. A monitor 28 is also coupled to the image computer 22 for providing a visual display of the image as modified by the operator and the selected algorithms.

One of the many operations which may be carried out in accordance with the image computer 22 is the scaling of the image scene, as noted on the monitor 28. Also, the image seen may be modified so as to remove the background 14 and present only the object of interest, the automobile 12. The size of the automobile 12 may be scaled to the desired dimensions. Additional image modification may include zoom, rotate, warp, convolutions, edge detection and enhancements, image histogram generation and mask generation, color transformation and modification, anti-aliased lines and figures, as well as anti-aliased text.

An additional contemplated application of the invention involving the integration of graphics and image computing is the generation of displays for advertising matter. In this application, rather than performing a cut-and-paste procedure to assemble a preliminary result, the image processing system of the invention may utilize a video camera for converting all the necessary images into digital format for storage in the digitizer and mass data storage system 18. With a repertoire of image and graphics algorithms, an operator using the keyboard control 26 can manipulate both the image and the text and experiment to determine which combination and effect is the most desirable. The monitor 28 may be of the color type so as to enable the operator to also experiment with various color combinations which present the desired effect. While not shown, a plotter or other type of hardcopy equipment may be connected to the video image computer 22 for preserving in record form various images selected by the operator.

Figure 2:
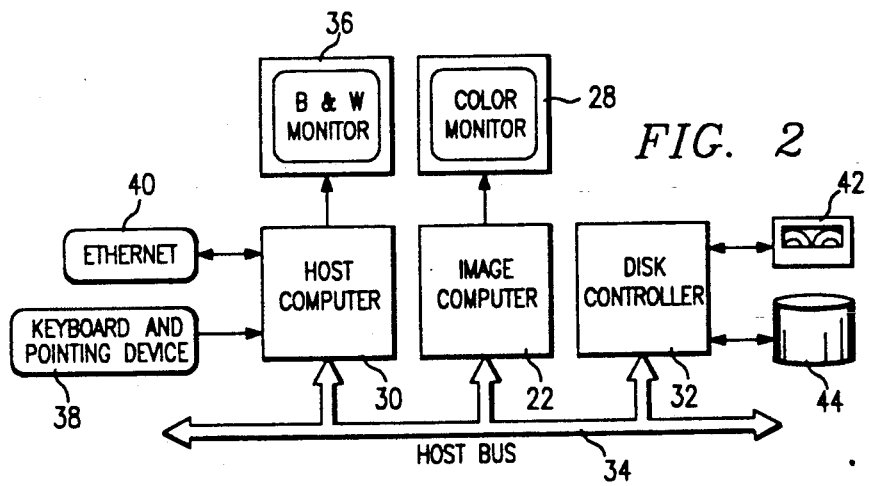
FIG. 2 illustrates, in block diagram form, the major components of an image computing system of the invention.

FIG. 2 illustrates in block diagram form the major components of the image processing system of the invention. In the preferred embodiment of the invention, there are provided a host computer 30, the image computer 22 and a disk controller 32 connected together by a conventional host bus 34. Operating in conjunction with the host computer 30 are a black and white monitor 36, a keyboard and pointing device 38, and a network interface connection such as the type for connecting to the Ethernet 40. As noted above, a color monitor 28 is utilized for presenting the results of images and graphics processed by the image computer 22. The disk controller 32 can be controlled by the host computer 30, via the host bus 34, for inputting image data into the system by magnetic tape mediums 42 or disk mediums 44. While not shown, the image data recorded on the tape or disk mediums 42 and 44 respectively is the result of the digitizing of an image by a video camera or other sensory transducer. In the preferred form of the invention, the host computer 30 may be of the type manufactured by SUN, and identified as type SUN3/160. Generally, the video image computer 22 can function as a stand-alone work station with a personal-type computer, or with a host computer of the type identified, or even as a terminal subsystem with most any type of general host or host bus. Because of the host bus structure, the architecture of the image computing system is open for expansion with other devices.

Image Computer

The image computing system of the invention is illustrated in more detail in FIG. 3. An image system controller 50 functions as a controller for the image computing system. The controller 50 includes an interface 52 for communicating with the various buses of the video image computer 22. The interface 52 may be of the type manufactured by Motorola, and identified as integrated circuit type MC68020. Connected by an internal bus 54 to the interface 52 is a memory manager unit 56 for controlling and managing the memory within the image system controller 50. A floating point processor 58 provides mathematical calculations and functions necessary to the operation of the image computing system. A dynamic random access memory unit 60 and a programmable read-only memory 62 are under the control of the memory manager 56 for storing information either temporarily, or permanently. The DRAM 60 may be used to store display lists, or other image-related or processing data. The programmable read-only memory 62 is effective in the initialization, memory tests and loading of the display controller program from the host bus 34. As noted above, the host bus 34 is also connected to the host computer 30 which functions as the computing platform for development purposes and as the host for higher end systems. In addition, the DRAM 60 is utilized for virtual storage of display lists, programs and other forms of data to be displayed on the screen of the monitor 28. As between the disk storage unit 44 and the DRAM 60, the memory manager 56 allows the less used segments of the display lists to be stored on disks in order that the high use segments can remain in the high speed memory. The image system controller 50 is shown only in general form, as other equipment, techniques and functions can be utilized to provide the image computer 22 with the necessary external control and data.

A host interface 64 provides an additional data and address communication control between the image computer 22 and the systems external thereto. Conventional protocol and control are used in connection with the host bus 34 to effect an orderly flow of information between the image computer 22 and either the image system controller 50 or the host computer 30.

In accordance with an important feature of the invention, the image computer 22 includes a number of interconnected circuits to provide a high speed and high density data processing system. Specifically, the image computer 22 includes an image algorithm processor 66 connected to an image memory controller 68. The image algorithm processor 66 is connected by an internal data bus 70 to a number of parallel image processors, generally designated as a set 72 of such processors. Particularly, individual parallel image processors 74-80 are each connected to the image algorithm processor 66 by the internal data bus 70. Moreover, each parallel image processor 74-80 is connected by a 64-bit image data bus to an image memory 82, including four image memory planes 84-90. The image memory controller 68 is connected to the image memory 82 by a memory address bus 92 carrying row and column addresses and other signals necessary for accessing the image memory 82. A writable control store 94 is associated with the image algorithm processor 66 by a dedicated instruction data bus 96, and an address bus 98 which is also extended to other writable control stores 100, each associated with a parallel image processor 74-80. The address bus 98 is also extended to a writable control store 101 operating in conjunction with an internal bus communication control unit 103. Dedicated instruction data buses 102 are connected between the respective writable control stores 100 and the parallel image processors 74-80.

The image algorithm processor 66 and the image memory controller 68 are interconnected by an address bus 104 which is also connected to a video processor 106 via a transceiver 107. The video processor 106 includes a number of individual processors 110-116, each connected by a 64-bit input data bus to a respective plane of the image memory 82. Each video processor 110-116 includes a respective output 118 connected to the color look-up table 108. Also connected to the input of the video processor 106 is the internal data bus 70, via a transceiver circuit 109. The output of the image computer 22 comprises an analog video raster signal output 120 having red, green and blue intensity information of the processed image.

The image algorithm processor 66 communicates with the host computer 30 via the host interface 64 and host bus 34. Communications can take place, for example, for allowing the host computer 30 to signal to the image algorithm processor 66 that an image is to be sent to the image computer 22. Also, the image algorithm processor 66 monitors the interface 64 to determine if data is available, and if so, to set up a transfer of the data from the interface 64 to the parallel image processor set 72. For transfers of image data from the host computer bus 34, the image algorithm processor 66 redirects the image data to the parallel image processor set 72 via the internal data bus 70. Concurrently, the image algorithm processor 66 generates addresses with respect to the location of the data to be written into the image memory 82. Data characteristic of the image is transferred from the host interface 64, under control of the image algorithm processor 66, a word at a time. More particularly, image data of a red color characteristic is transferred first to the respective parallel image processor 74 which is associated with the red image memory plane 84. Image data characteristic respectively of green and blue images is transferred subsequently to the associated parallel image processors 76 and 78 for storage in the green and blue image memory planes 86 and 88. Lastly, overlay information is transferred over the internal data bus 70 to the overlay image processor 80 for subsequent storage in the overlay plane 90 of the image memory 82.

Concurrent with the data transfer, the image algorithm processor 66 generates linear image memory (IMEM) addresses which the image memory controller 68 converts to row and column addresses for addressing the image memory 82. Thus, with the proper row and column addresses applied to the image memory 82, via the row and column address bus 92, the red, green, blue and overlay data is written into the proper image memory planes and at desired random access storage locations therein. Such an address and data arrangement utilized in loading the image memory 82 allows the data to be pipelined through the parallel image processor set 72 to the image memory 82, as addressed by the image algorithm processor 66.

The image algorithm processor 66 is a 32-bit microprocessor which carries out substantially all of the image and graphics address computations for providing data to the image computer 22. In this sense, the image algorithm processor 66 is the master controller of the image computer 22, providing addresses for the image memory 82 and thus data for the parallel image processor set 72 in carrying out data processing tasks. Addresses are generated in the image algorithm processor 66 as described above, and as a further example, addresses are calculated in the process of moving an image from one screen location to another, or in the process of convolving an image. As a further example, the image algorithm processor 66 may be programmed to generate addresses for lines, circles, arcs, ellipses, convolution and warping processes.

The image memory controller 68 includes circuits for managing and controlling the image memory 82 by providing master timing and generating all the necessary control signals for the image memory 82. The timing and control signals include the necessary clock signals and row and column addresses noted above for writing image data into the image memory 82. In addition, the image memory controller 68 generates the signals necessary for video blanking and synchronization necessary to the display of an image on a raster-type display monitor 28. The video signals can be generated in compliance with NTSC/RS-170 video format. This allows the output of the image computer 22 to be output to a video monitor 28, or placed on a video tape, or broadcast on a CATV network.

The image memory controller 68 provides the various video synchronization and blanking signals to the image memory in a timed manner with respect to the row and column addresses so that there is provided a constant output of pixels data to refresh the screen of the video monitor 28. An additional function of the image memory controller 68 is to receive from the image algorithm processor 66 linear addresses as input data, and to translate the same into the appropriate row and column addresses for accessing the image memory 82.

The image algorithm processor 66 is a microprogrammed processor with a sequencer and address calculation logic which generates addresses for output on the bus 98. The image algorithm processor and parallel image processor writable control stores 94 and 100, and the writable control store 101 of the internal bus communications controller 103 (IBCC), receive the same instruction addresses from the image algorithm processor 66. The writable control stores 94, 100 and 101 each comprise a memory addressable by the addresses on bus 98 for storing therein instructions which are read and transferred back to the image algorithm processor 66, and to the parallel image processor set 72, on the respective instruction data buses 96 and 102. In like manner, the instructions stored in the IBCC control store 101 are transferred to the internal bus communications controller 103. The IBCC 103 thus provides a coordinated control of the various buses of the image computer 22. The instructions stored in the image algorithm processor writable control store 94 relate to image algorithm processor operations, such as increment an x-pointer, increment a y-pointer, convert an address, etc.

As can be appreciated, the image algorithm processor writable control store 94 is necessary to the fundamental programmable operation of the image algorithm processor 66. The image algorithm processor 66 receives its instructions from the image algorithm processor writable control store 94 in the nature of 48-bit microcode words.

The same instruction address generated by the image algorithm processor 66 is converted in the parallel image processor writable control store 100 into a different instruction directed on bus 102 to the respective one of the parallel image processors 74-80. The parallel image processor set 72 further processes the instruction for carrying out a data operation with regard to data in the image memory 82. It can be realized from the foregoing that a single instruction address generated by the image algorithm processor 66 is translated in the respective writable control stores 94 and 100 to perform separate operations, namely, an instruction to the image algorithm processor 66 to perform an address-related function, and an instruction directed to each parallel image processor 72 for carrying out a data-related function. Importantly, the data stored in each writable control store 100 may result in different instructions directed to each of the parallel image processors 74-80. This allows each parallel image processor 74-80 the capability of processing the respective red, green, blue or overlay data differently. Address generating functions and data processing functions are thereby carried out independently by the image computer 22 in order to provide the necessary address and data management of the image memory 82 to realize high speed operation.

The parallel image processor set 72 comprises the data processing apparatus of the image computer 22. As noted above, the parallel image processor set 72 processes data representative of color value information of areas of the image. The particular areas may be characterized as picture elements, or pixels, which are identified as a predetermined number of data bits. Eight bits of data may, for example, represent the color value information for a particular pixel. Moreover, image color value data corresponding to red, green and blue colors are processed by the respective parallel image processors 74, 76 and 78. The overlay processor 80 processes data which may be superimposed upon the screen image generated by the color processors 74-78.

Each processor 74-80 of the parallel image processor set 72 is connected by a respective 64-bit memory data bus 83 to a respective image memory plane 84-90. In addition to writing image color data into the image memory 82, each parallel image processor 74-80 can receive image data from the memory 82 and process the same to, for example, replicate the pixels, perform ALU functions on the pixels, interpolate, convolve or perform other image processing calculations. In convolving an image stored as representative color data in the image memory 82, such memory 82 can also store convolving coefficients in an off-screen location in the image memory 82. Each parallel image processor 74-78 can then bring such coefficients back into the image processors 72 and, together with the image color data, convolve the data with the coefficients. The result can then be stored back into the active screen area of the image memory 82. It is significant to note that while image processing by the parallel image processor set 72 is occurring, the image memory controller 68 continues to access the image memory 82 to provide an output to the video processor 106 for refreshing and driving the video monitor 28 in an interlaced or non-interlaced format. In providing a constant raster stream of refresh data to the video monitor 28, the image memory controller 68 calculates addresses for driving the image memory address bus 92, which addresses are directed to the image memory 82 for enabling the image memory controller 68 to access the image memory 82. The image memory controller 68 then posts a cycle in an internal arbiter (not shown) indicating that the image algorithm processor 66 desires to access the image memory 82. If no other events of higher priority are required to be carried out, then on the next operating cycle the image memory controller 68 accesses the memory for providing an output to the video processor 106, and through the color look-up tables 108 to the video monitor 28.

The image memory 82 comprises a large number of high-speed video dynamic random access memories (VRAMs or Video DRAMs). As noted, the image memory 82 is constructed with individual planes 84-90 with random access storage areas for storing color data information corresponding to the respective red, green and blue colors, as well as overlay data information. In the preferred form of the invention, each image memory plane 84-90 includes a 4k × 4k storage area for storing color data information of an image. The image memory 82 is thus the main image data memory of the image computer 22 which is tightly coupled to respective address and data processors, i.e., the image algorithm processor 66 and the parallel image processor set 72. In contrast with prior image processing systems, the image memory 82 is not accessed through a general bus which is shared with many other system circuits, thus requiring consideration and circuits for overseeing the arbitration thereof. Hence, the image memory arrangement of the invention permits a high speed and high rate of data processing of image data.

The processing power of the image memory 82, in terms of transmission bandwidth, is enhanced by utilized dual port VRAMs. In such a memory, one port thereof is a bidirectional random access port, while a second port, termed a video port, has associated with it a shift register which allows serial data output at a high data rate. The first and second ports are independent of each other. By this it is meant that VRAMs can be randomly accessed for reading or writing image data therein, while the shift register can be simultaneously driven to shift out serial image data previously loaded therein from the random access section of the image memory.

The parallel image processor set 72 is further connected to the image algorithm processor 66 by an external mask/flag bus 85. The primary purpose for communications on the mask/flag bus 85 is to determine whether a process carried out on the image data results in other data which is within or out of a specific range, so that such data which may normally be located in the image memory 82 is made nonviewable on the video monitor 28. The parallel image processor set 72 includes circuits for performing data tests on the image memory data, and for outputting a code indicative thereof on the mask/flag bus 85. Mask and alignment information calculated by the image algorithm processor 66 may also be transferred to the parallel image processor set 72 via the mask/flag bus 85. In this manner, the parallel image processor set 72 is provided with information to manipulate individual pixels of a multipixel word.

The reliability of the system is further enhanced by the provision of error detection and correction of the image memory data. To that end, an error detection and correction circuit 105 is coupled to each 64-bit image memory data bus 83 for monitoring whether or not data read from the image memory 82 contains faults. As will be described in more detail below, the error detection and correction circuit 105 generates a number of check bits for each 64-bit memory word written into the image memory 82. The check bits are stored at corresponding addresses in a memory which comprises a part of the circuit 105. On reading the image memory 82, the error detection and correction circuit 105 monitors the 64-bit memory word thus read, and again generates corresponding check bits. The check bits generated on the read operation of the image memory 82 are compared with the check bits stored in the check bit memory during the write operation. On an affirmative indication of the comparison, the 64-bit data read from the image memory 82 is transferred to the parallel image processor set 72. There are two possible types of negative comparisons. The first, termed a "single bit" or "correctable" error, enables the error detection and correction circuit 105 to use the check bits to identify the bit in error and correct it prior to transferring the 64-bit data to the parallel image processor set 72. The second type of error, termed a "double bit" or uncorrectable" error, cannot be corrected by the error detection and correction circuit 105. This type of error can be dealt with by either executing a second read of the image memory 82, or causing the host system to regenerate the image data for again writing in the image memory 82.

The video processor 106 and the color look-up tables 108 comprise a video output section of the image computer 22. Essentially, the video output section of the invention receives digital frame data from the image memory 82 and generates corresponding analog video signals for driving the color display monitor 28. Each video processor 110-116 receives 64-bits of parallel color data information from the respective image memory plane 84-90. Each video processor 110-116 receives the 64-bits of parallel color data information and converts the same into eight parallel bits of high-speed digital video output data. The speed of the data output from the video processor 106 is faster by a factor of eight than the parallel color data input to the video processor 106. The video processors 110-116 employ 64-bit shift registers to accomplish the conversion of 64-bit parallel data to high speed 8-bit parallel data.

The high-speed data output from the video processor 106 is applied to the color look-up tables 108 for translation into output intensity data information. For example, the video processor 110 dedicated to processing image memory data having red color information is applied as 8-bits to a section of the color look-up table 108. The 8-bits of red color information corresponds to 256 intensity levels. As will be described in more detail below, the color look-up tables 108 receive the 8-bit data from each of the video processors 110-116 and convert the data into one of a possible sixteen million intensities. The result thereof is converted by a digital to analog converter (not shown) and output as an analog video signal to the color monitor 28.

Image Algorithm Processor

Figure 4:
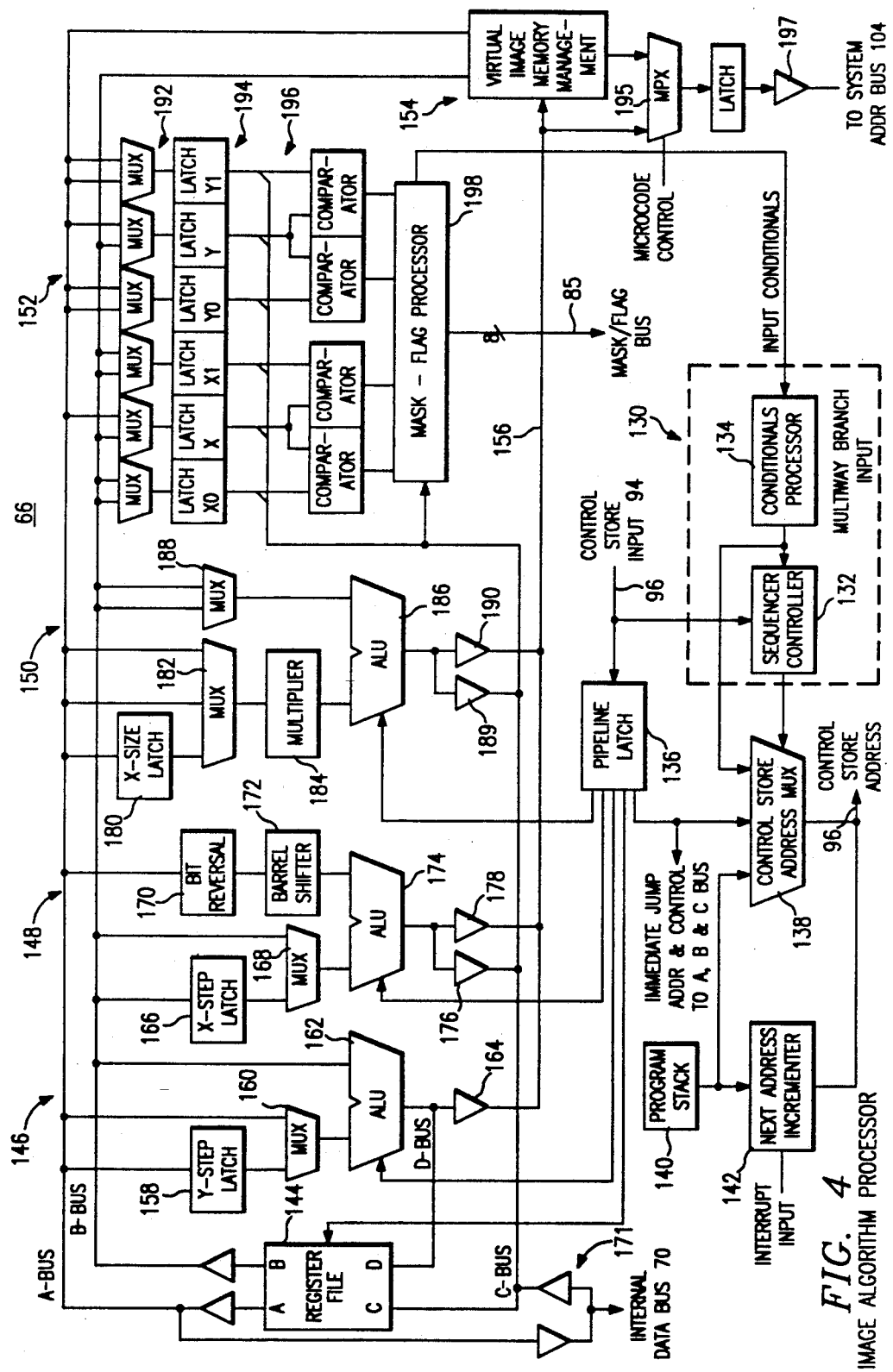
FIG. 4 is a detailed block diagram of the image algorithm processor of the invention.

FIG. 4 illustrates the major functional elements of the image algorithm processor 66 (IAP) of the invention. Shown is a sequencer and conditional logic circuit 130 for providing control of the image algorithm processor 66 as well as general overall control of the image computer 22. The sequencer and conditional logic circuit 130 receives microcode instructions from the IAP writable control store 94 via data bus input 96. As noted above, the sequencer and conditional logic circuit 130 receives address signals from the IAP writable control store 94 via the address bus 96. The primary functional circuits of the sequencer 130 comprise a sequencer controller 132 connected to a conditionals processor 134. The sequencer controller 132 has an input connected to a pipeline latch 136 which receives microcode instructions from the image algorithm processor writable control store 94. An output of the sequencer controller 132 is utilized to control a control store address multiplexer 138. The output of the multiplexer 138 is directed to the IAP writable control store 94 for address purposes. A program stack counter 140 also provides an input for sourcing addresses to the multiplexer 138. A next address incrementer 142 is interrupt driven for providing jump-type addresses to the IAP writable control store 94. The incrementer 142 receives address information from the program stack counter 140.

The image algorithm processor 66 further includes address calculation circuits, comprising a four-port register file 144, a Y-address ALU 146, an X-address ALU 148, a multiplier and ALU 150, a window clipping controller 152 and virtual image memory management unit 154. Each such circuit will be described in detail below.

In providing overall general control of the image computer 22, the sequencer 130 includes circuits for generating and controlling addresses transmitted to the three writable control store groups over the control store address bus 98. Also, the sequencer 130 is responsive to commands via the host bus 34 for providing handshake functions between the image computer 22 and the host system 50. Various instruction conditional functions from the image memory address calculator section of the image algorithm processor 66 are also handled by the sequencer 130. In addition, the sequencer 130 includes registers for stack management of subroutines, as well as circuits responsive to immediate address data input. In the preferred form of the invention, the sequencer controller 132 may be an integrated circuit identified by type SN74AS890, manufactured by Texas Instruments. Those skilled in the art may refer to data sheets pertinent to the noted sequencer controller 132 for further details of the construction and operation thereof. When integrated into the image algorithm processor 66, as described in more detail below, the sequencer controller 132 is capable of supporting subroutine calls, conditional and unconditional absolute jumps and input interrupt signals. The conditional section of the sequencer controller 132 receives flags from the address calculator section of the image algorithm processor 66 and the host interface unit 64. The conditional processor 134 performs logic functions on groups of flags in order that on the next cycle a decision to branch may be executed. In this manner, multi-branching can be supported by the sequencer controller 132 for high speed host handshaking functions, loop operations, data dependent addressing, etc. Immediate data from the IAP writable control store 94 is input to the sequencer controller 132 from a pipeline latch 136, whereupon the data output therefrom is utilized as immediate branch addresses.

The sequencer 130 is also coupled to internal multiconductor buses directed to other circuits of the image algorithm processor 66. Particularly, the sequencer 130 is connected through buffers (not shown) to an internal A-bus, B-bus and C-bus. The address calculation function of the image algorithm processor 66 includes the four-port register file 144 which functions to store data temporarily during the calculation of addresses ultimately used to address the image memory 82. The register file 144 has two read ports and two write ports. Register files suitable for use with the invention are identified as integrated circuit type AM29334, manufactured by Advanced Micro Devices. The A-bus and the B-bus are 32-bit buses which are connected to the read ports of the register file 144 and which function to transmit Y and X address data to other circuits of the image algorithm processor 66. The C-bus and D-bus are also 32-bit buses which provide connections between the outputs of address calculation circuits of the image algorithm processor 66 and the write ports of the register file 144. After address data is calculated, or otherwise generated, such data is returned on the C-bus and D-bus to be written into the register file 144 for further processing. Communications between the internal data bus 70 and the image algorithm processor 66 are through the bidirectional buffer arrangement 171.

A Y-arithmetic unit 146 is a 32-bit circuit which has inputs connected to respective A-bus and B-bus and outputs which are connected to the D-bus, as well as branched through a buffer to an internal logical address bus 156. More particularly, the Y-arithmetic unit 146 includes a Y-step latch 158 connected to the A-bus. A multiplexer 160 has two inputs connected respectively to the output of the Y-step latch 158 and to the A-bus. The output of the multiplexer 160 is connected to one input of an ALU 162. The other input of the ALU 162 is connected to the B-bus. The output of the ALU 162 is connected through a buffer 164 to the logical address bus 156. Further, the ALU 162 is controlled by an output of the pipeline latch 136. To be discussed in more detail below, the logical address bus 156 is connected through a virtual image manager unit to the system address bus 104.

The Y-arithmetic unit 146 primarily calculates Y-type addresses used in external memory pointer calculations and in the generation of image memory addresses. The Y-arithmetic unit 146 provides a "Y+Ystep" output value which is coupled to the register file by the D-bus and stored therein. Moreover, the value can again be output by the register file on the B-bus, whereupon the Y-arithmetic unit 146 can receive A-bus and B-bus input information. In this manner, the registered Y-step or A-bus information can be added to a value on the B-bus. The Y-arithmetic unit 146 can thus add, subtract or pass the B-bus information. The output of the Y-arithmetic unit 146 is routed either to the logical address bus 156 or to port D of the register file.

Operating in conjunction with the Y-arithmetic unit 146 is an X-arithmetic unit 148 which functions primarily to calculate X addresses and perform general logic/arithmetic operations. The X-arithmetic unit 148 is also a 32-bit circuit which permits a high degree of precision to be maintained in the summing of products for various image arithmetic operations, such as B- splines, second order warps, etc. Much like the Y-arithmetic unit 146, the X-arithmetic unit 148 can provide X-step address data latched in a register 166 at its input, and includes a bypass multiplexer 168. In addition, the X-arithmetic unit 148 includes a bit reversal circuit 170 for reversing address bits, and a barrel sift circuit 172 supporting Fourier transform calculations. By processing data on the A-bus and the B-bus, the fast Fourier transform function can be utilized to convert spatial data into frequency domain data. The barrel shifter comprises an integrated circuit type 74AS8838, manufactured by Texas Instruments Incorporated. Lastly, the ALU 174 provides floating point arithmetic. The output of the ALU 174 drives buffers 176 and 178 respectively to place address information on the C-bus, as well as on the internal logical address bus 156.

Connected to the A-bus and B-bus is a 16-bit by 16-bit multiplier/adder 150 which is utilized for second and third order warp transforms and X−Y to linear address calculations. Address calculations in the nature of (X+Y * XSIZE) can be performed. Such address calculations are utilized for two dimensional transforms, B-splines and general polynomial address calculations. The multiplier/adder 150 is constructed with an X-size latch 180 for latching therein data from the A-bus. A bypass multiplexer 182 is connected to both the upper and lower halves of the A-bus, as well as to the output of the X-size latch 180. A multiplier 184 receives the output of the multiplexer 182 and provides an input to an ALU 186. Another input to the ALU 186 is provided by a second multiplexer 188 which has each input thereof connected to the half of the B-bus. The ALU 186 is controlled by an output of the pipeline latch 136. The ALUs 162, 174 and 186 can be integrated circuit types 74F381, manufactured by Fairchild Semiconductor. The ALU 186 has an output connected through buffers 189 and 190 to the C-bus and internal logical address bus 156.

A window clipper circuit 152 is also provided with various inputs connected to the A-bus and B-bus. Generally, the window clipping circuit 152 monitors the image memory addresses generated by the image algorithm processor 66 to determine if such addresses fall within a predefined window area. The window area is defined as a desired area of pixels within the image memory 82. If the image algorithm processor 66 generates a new address as a result of the processing by the noted address calculator circuits, and if such address falls within the predefined window, the address is passed on to image memory controller 68. On the other hand, if the window clipping circuit 152 determines that the image memory address falls outside the predefined window, the image memory controller 68 is prevented from further processing such address. Hence, the image memory 82 is not addressed by the out-of-bounds address.

The window clipping circuit 152 includes six two-input multiplexers 192 having various arrangements of connections to the A-bus and the B-bus. The output of each multiplexer 192 is connected to an associated latch 194. The six latches 194 are connected by various arrangements to four digital comparators 196. Also, the outputs of the latches 194 are connected to the C-bus and an IAP mask/flag processor 198. The IAP mask/flag processor 198 monitors the outputs of the comparators 196 and latches 194 to ascertain whether or not each address is within the pixel window area. Since the pixel window area can change, the IAP mask/flag processor 198 is dynamically programmable to have available the current pixel window area boundary. The output of the IAP mask/flag processor 198 is connected to the mask/flag bus 85.

Figure 5:
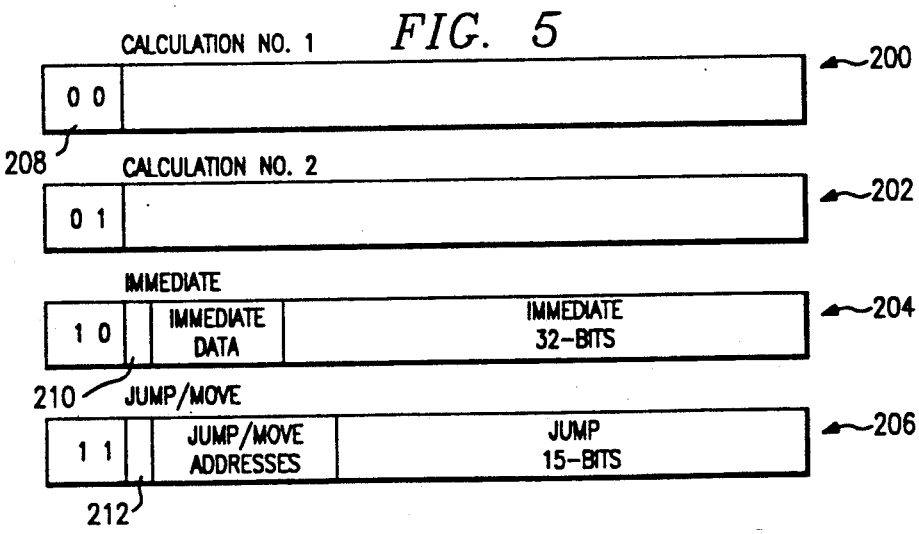
FIG. 5 is illustrative of the microcode instruction format utilized in the image algorithm processor.

FIGS. 5 illustrates the format of microcode instructions which are transferred from the IAP writable control store 94 to the image algorithm processor 66 for carrying out specified functions. Four general types of microcode instructions are provided. Table I in the Appendix hereof illustrates the format of the bits of the microcode instruction words and the decoded function. Each of the four primary types of instruction words is determined by the first two bits of the 45-bit microcode instruction word. Particularly, a calculation #1 instruction word 200 and a calculation #2 instruction word 202 are defined, as well as an immediate instruction word 204 and a jump/move instruction word 206. The two-bit field in the instruction words is identified, for example, as reference character 208 in instruction word 200. A sub-mode bit 210 and 212 is associated with the immediate instruction word 204 and the jump/move instruction word 206 for further defining two types of immediate mode instructions and jump/move instructions.

The calculation #1 instruction word 200 includes additional bits for controlling the apparatus of the image algorithm processor 66 to carry out a parallel equation. The calculation #2 instruction word 202 is utilized for controlling the X-arithmetic unit 148 and the multiplier circuit 150 to process image memory addresses. The immediate type of microcode instruction word 204 is the mechanism by which immediate values are transferred from the IAP writable control store 94 for use with constant values in processing image address data in the image algorithm processor 66. Lastly, the jump/move microcode instruction word 206 permits the sequencing of instructions and the moving of image address data from one location to another within the image algorithm processor 66.

The remaining fields of each of the microcode instruction words include additional data fields which are specified in Tables I-V of the Appendix. The four-port register file 144 is controlled by a 6-bit word associated with each such port. However, only three 6-bit words are necessary, as ports B and D are addressed with the same bit configuration of the instruction word. The sequencer 130 of the image algorithm processor 66 is controlled by a 6-bit field, the functions of which are defined in Table I. It is to be noted that the sequencer fields may vary in size, depending on the particular microcode instruction word mode of interest. For example, calculation #1 mode includes only a 2-bit sequencer control field, while calculation #2 mode is specified by a 4-bit sequencer control field. The jump/move #2 mode is characterized by a 5-bit control field, while the jump/move #1 mode is characterized by the full 6-bit sequencer control field. The sequencer instructions are arranged such that the truncated control fields are the corresponding upper bit positions shown in Table I.

Table II illustrates the microcode instructions for controlling the arithmetic circuits of the image algorithm processor 66. The Y-arithmetic unit 146 is controlled by a 2-bit field which defines four states corresponding to the passing of the data on the B-bus, adding A-bus data and B-bus data, incrementing B-bus data, or decrementing B-bus data.

The X-arithmetic unit 148 provides more functions than the Y-arithmetic unit 146, and thus is characterized by a larger field which specifies more functions. The X-arithmetic unit 148 is controlled by a 4-bit field shown in Table II. The sixteen functions specified by the 4-bit field of the X-arithmetic unit 148 are noted in the table. In the immediate #2 mode, the X-arithmetic unit 148 is controlled by only a 2-bit field which is shown in Table IIC. As noted, the X-arithmetic unit 148 includes a barrel shift circuit 172 and bit reversal circuit 170 which is controlled by a 3-bit field as specified in Table III. While not shown, a barrel shift count occupies 5-bits of a microcode instruction field.

As noted, the image algorithm processor 66 includes an interface 171 to the internal data bus 70 (IDB). The interface 171 is controlled by a 1-bit field defined in Table IV. Additional image algorithm processor buses include the address bus 156 and the mask/flag bus 85. Control of the address bus 156 is shown in Table IV(B) and (C). Table IV(C) relates to an address field in which one of the modes requires only a single microcode instruction word bit.

The mask/flag bus 85 operates external to the image algorithm processor 66. A single bit of the microcode instruction word specifies whether or not the mask/flag bus 85 enables an output on the bus. The mask/flag bus 85 is of the pipelined type, wherein the data value output onto such bus occurs one cycle after the control is issued in microcode.

The C-bus of the image algorithm processor 66 is complex in nature, and thus requires a 5-bit field. As with other fields in the microcode instruction word, the C-bus field is dependent on the instruction mode. Five control bits are utilized in the immediate #1 mode and the jump/move #2 mode. Three control bits are used in the calculation #1 mode and the calculation #2 mode. Two control bits are used in the jump/move #1 mode and one control bit is used in the immediate #2 mode. Table IV illustrates the functions of the 5-bit C-bus field. Table IV-B, C and D illustrate respectively the three, two and one-bit fields of the C-bus utilized in the modes noted above.

Various other bits in the microcode instruction words input to the image algorithm processor 66 from the IAP writable control store 94 function to exercise control over other circuits of the image algorithm processor 66. Particularly, Table V(A) illustrates a 4-bit input select field that defines the nature in which the inputs on the A and B-buses are distributed to the arithmetic units. By use of the input select field, the Y-arithmetic unit 146 and the X-arithmetic unit 148 can be controlled using bits on the A and B-bus. In like manner, various latches can be controlled by the 4-bit microcode instruction field shown in Table V(B). This field, an X-Y register latch field, defines the latch selection for X-Y registers which are loaded from the A and B-buses of the image algorithm processor 66. Six of the registers included in the window clipping controller 152 are designated as x-min, x-max, x-address, y-min, y-max, y-address. Other controlled registers include y-step, x-step, and x-size as part of the y-adder, x-alu and of the multiplier/adder 150, respectively.

Table V(C) indicates the X-Y register latch functions which are available in those modes for which only one bit of register latch control is provided.

Table V(D) illustrates a status/immediate select control bit which determines whether the data on the A-bus originates from an immediate data field of an immediate #2 mode instruction word, or from the address generator status registers of the image algorithm processor 66. In addition to the status register, the constant register is also presented on the A-bus. Table V(D) also illustrates the bit positions of the status and constant registers as presented on the A-bus. The bit value of zero is effective to select the immediate data field, while a value of one selects the status/constant register. Also, the status/select control bit determines whether data presented on the A-bus originates from the A-port of the register file 144, or from a status/constant register. A bit value of zero is effective to select the A-port, while a value of one selects the status/constant register. This control bit is utilized in a jump/move #2 mode instruction. An interrupt acknowledge control bit is also provided in the microcode instruction word for clearing any pending interrupt flag if the field has a value of one. This control field resides in a jump/move #1 mode instruction.

Having described the structure of the image algorithm processor 66, the detailed operation will now be described. Communications by way of microcode instruction words to the image algorithm processor 66 are achieved through the pipeline latch 136. The pipeline latch 136 includes a number of outputs corresponding to the various word fields for controlling the circuits of the image algorithm processor 66. The various circuits of the image algorithm processor 66 include decoders (not shown) for decoding the mode bits and the field bits of the instruction words to determine the function to be carried out. The pipeline latch 136 includes a register for storing the instruction words in response to a clock pulse for providing a current instruction to the circuits of the image algorithm processor 66. The sequence controller 132, comprising part of the sequencer 130, also receives instructions from the IAP writable control store 94. The sequencer controller 132 operates in conjunction with the program stack register 140, the next address incrementer 142, the control store address multiplexer 138 and the conditional processor 134. The program stack 140 is effective to store the return address when a subroutine call instruction is executed. The control store address multiplexer 138 controls whether an address stored by the program stack 140 is output to the IAP writable control store 94, or whether the next address incrementer 142 outputs an address to the IAP writable control store 94. The sequencer controller 132 is provided with a single bit input from the conditionals processor 134 for reading the IAP writable control store 94 with the next sequential address if a condition is not true, or executing a jump address if such a condition is true. The conditionals processor 134 is provided with multiple inputs for encoding such inputs and producing a single output flag to the sequencer controller 132.

As noted above, the 4-port register file 144 has two read ports and two write ports. The A and B-ports comprise read ports, while a C and D-port comprise write ports. Each such port is connected to a 32-bit bus designated by the same alphabet as that of the register file port. The register file 144 is thus operative to simultaneously receive three addresses for simultaneously executing data write operations on the C and D-ports, and data read operations on the A and B-ports. Importantly, data read from the A or B-ports can be processed by the image algorithm processor 66 and written back into the register file 144, via the C or D-ports, in a single clock cycle. The writing of data can be written into the same register file location during such cycle.

The register file 144, Y-arithmetic unit 146 and X-arithmetic unit 148 function together to generate image memory addresses for addressing the image memory 82. Vector addresses are converted into raster addresses by causing the register file 144 to output an X-vector address on the A-bus and a Y-vector address on the B-bus. The XSTEP and YSTEP parameters are thus prestored in this operation. The XSTEP and YSTEP output of the respective multiplexers 160 and 168 comprise inputs to the respective X and Y-arithmetic logic units 162 and 174. The output of the Y-arithmetic logic unit 162 is a 32-bit word comprising $Y = Y + (YSTEP)$. The output of the X-arithmetic logic unit defines the vector address $X + (XSTEP)$. Thus, as the X and Y-vectors are output by the register file 144, the same vector addresses are incremented by respective XSTEP and YSTEP to provide the noted vector addresses. The vector addresses are also made available on the A-bus and B-bus to the window clipping circuit 152. Indeed, the address is clipped when the window clipping circuit 152 finds that such address is outside of a predefined window, and thus should not be used to address the image memory 82. The window clipping circuit 152 is necessary to define those addresses which pertain to a portion of the desired image size which could be offscreen.

In accordance with the present invention, the physical size of the image memory 82 is much larger than the displayable part of the image memory 82, and thus the addresses generated must correspond to a window which defines the desired portion of the image to be viewed. Of course, the window of viewable area can be moved about by changing the programmable parameters of the window clipping circuit 152.

The multiplier/adder 150 of the image algorithm processor 66 is connected to the A-bus and B-bus for generating addresses according to the following equation Logical Address = $(X + (Y*Xsize))$. As can be seen, the multiplier/adder circuit 150 includes an X-size latch 180 for latching the size of one raster line therein. The multiplexer 182 has two inputs, each connected to the A-bus. This allows an upper 16-bits of the A-bus to be processed separately from a lower 16-bits of the 32-bit A-bus. The output of the multiplexer 182 is connected to a 16-bit multiplier 184 which performs the calculation $Y*X$ size. The multiplier/adder 150 also includes the second multiplexer 188 with a pair of inputs connected to the B-bus for processing upper and lower order 16-bit words. The output of the multiplier 184 and the multiplexer 188 are coupled to respective inputs of the 32-bit arithmetic logic unit 186. The output of the 32-bit arithmetic logic unit 186 is coupled to the internal address bus 156 for providing physical addresses to the image memory 82.

As will be discussed in more detail below, logical addresses are first processed by a virtual image memory manager circuit 154 to provide physical memory addressing for the image memory 82. The internal address bus 156 and the output of the virtual image memory management unit 154 are coupled to a multiplexer 195. A microcode control selects which of the multiplexer inputs to output to a latch 197, and through buffers to the system address bus 104. The multiplexer 195 allows the image algorithm processor 66 to bypass the virtual image memory management unit 154 in those instances in which no memory management is required, for example, the on-screen memory is not managed by unit 154, and thus the internal address bus 156 is coupled to the system address bus 104, via multiplexer 195.

The window clipper 152 includes a number of 16-bit multiplexers 192 for directing 16-bit words from either the A-bus or B-bus into associated latches 194. The six latches correspond to two X and two Y coordinates for defining the window itself, plus an X and Y defining the pixel of interest.

Figure 6:
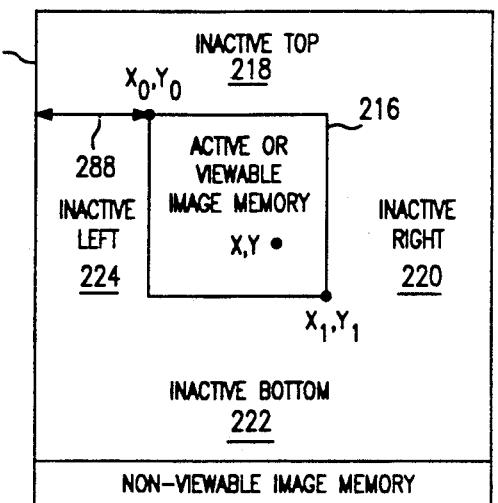
FIG. 6 illustrates the viewable and nonviewable areas of the image memory, and a window area monitored by a window clipping controller.

FIG. 6 illustrates the physical size of the image memory 82 of the invention. The physical size of the exemplary image memory 82, as noted by boundary 214, may be 4K pixels by 4K pixels. An image reduced to corresponding pixels can occupy a major portion of the physical size of the image memory 82. However, due to the size of present day display screens, not all of the pixels can be displayed as a single image on the display 28. Rather, only a window 216 of pixels is selected for viewing on the display 28. In order to accommodate conventional display screens, a minimum display size, or window 216, may be 256 pixels by 256 pixels. A high resolution display window may comprise 1280 horizontal pixels by 1024 vertical pixels. Other pixel display configurations may, of course, be utilized. The window 216 can be moved around within the physical display area 214, e.g., such as during panning or scrolling operations.

Assuming that the pixels within the window 216 are desired to be displayed on the video display 28, such window can be defined by the image algorithm processor 66 as an upper left corner, with coordinates $X_0, Y_0$ and a lower right corner defined by coordinates $X_1, Y_1$. A pixel of interest within the window is denoted as X,Y. The window clipper 152 operates to maintain the generation of addresses within the window 216, and provides a flag by way of the IAP mask/flag processor 198 to denote whether or not an image memory address falls outside of the window 216. The IAP mask/flag processor 198 is responsive to the outputs of the comparators 196 and latches 194 to provide out-of-window indications identifying whether the pixel of interest lies in an inactive top part 218 of the image memory 82, an inactive right part 220, bottom part 222 or left part 224. A portion of the image memory 82 which is not viewable is shown as reference character 226. Image processing data, such as coefficients, intermediate results or instructions can be stored in memory section 226.

By changing the $X_0, Y_0$ and $X_1, Y_1$ parameters, the window 216 can be moved about the physical image memory area 214 and thus display various portions of an overall image. In essence, the window 216 can be panned around the total physical memory 214 to view the entire image stored therein. The three pairs of X,Y coordinates correspond to the 16-bit latches 194 of the window clipping circuit 152. The output of the latches 194 are connected to certain comparators 196 for comparing whether the pixel of interest (X,Y) is within the bounds established by the coordinate $X_0, Y_0$ and $X_1, Y_1$. The first and second comparators compare respectively X with $X_0$ and X with $X_1$. The second set of comparators compare Y with $Y_0$, and Y with $Y_1$. It can be appreciated that if $X_0$ is less than X, and if $X_1$ is greater than X, the pixel of interest is located laterally within the defined window 216. Also, if $Y_0$ is less than Y, and if $Y_1$ is greater than Y, the pixel of interest is located vertically within the window 216.

In brief summary, the image algorithm processor 66 converts X,Y addresses into linear addresses. The linear addresses are then tested by the window clipping circuit 152 to verify whether the newly generated addresses are within the prescribed window area 216. The linear addresses are then converted into physical addresses for addressing the image memory 82. Importantly, all three of the foregoing actions occur in one cycle of the image algorithm processor 66. The manner in which the linear addresses are converted to physical addresses will be described in more detail below in connection with the virtual image memory manager 154.

Image Memory Controller

As noted above, the image memory controller 68 manages and controls the addressing of the video DRAMs of the image memory 82. FIGS. 7-14 illustrate in block form the major functions of the image memory controller 68. Master timing, video signals and all refresh signals required by the video DRAMs of the image memory 82 are generated by the image memory controller 68. Moreover, the image memory controller 68 receives the linear addresses from the image algorithm processor 66 and translates such addresses into appropriate row and column physical addresses for the video DRAMs of the image memory 82. The image memory controller 68 has a number of programmable parameters to provide a high degree of flexibility for allowing the independent two-port video DRAM devices to output a large number of pixels at a high rate. In accordance with an important feature of the invention, the image memory controller 68 is structured to control the video DRAMs of the image memory 82 so that the loading of the serial shift register thereof need not be coincident with horizontal video framing intervals, as was the case with conventional frame stores. In other words, the image memory controller 68 can reload the 256-bit shift registers of each of the video DRAMs on-the-fly, e.g., during the serial shifting of pixels to the output. This can be accomplished during any portion of the horizontal video scan, without any visual abnormalities occurring on the video display 28.

Figure 7:
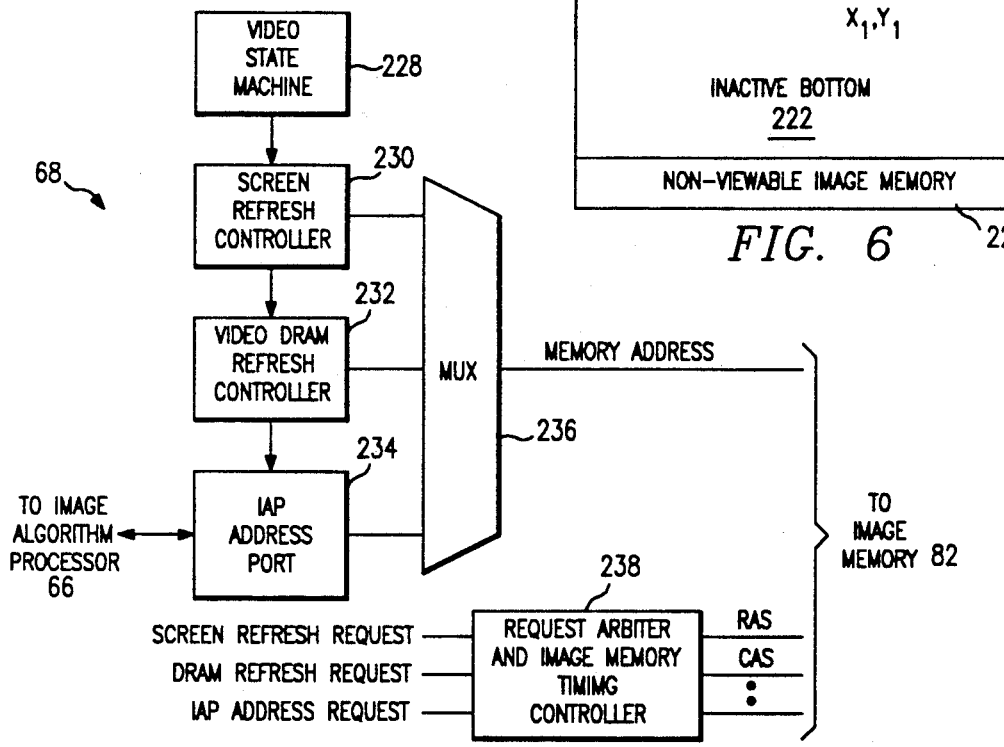
FIG. 7 is a block diagram of the image memory controller of the invention.

As illustrated in FIG. 7, the image memory controller 68 includes a screen refresh controller 230 controlled by a video state machine 228, a video DRAM chip refresh controller 232 and an image algorithm processor address interface port 234. The screen refresh and video DRAM refresh controllers 230 and 232, as well as the IAP address port 234 are connected to a multiplexer 236 for selecting which circuit is active for transferring addresses to the image memory 82. Shown also is an arbiter circuit 238 for prioritizing memory access requests from the controllers 230 and 232, and the IAP address interface port 234.

The screen refresh function is adapted to control the loading of the serial shift register portion of each video DRAM integrated circuit comprising the image memory 82. The DRAM refresh function is adapted to refresh the dynamic memory cells of the random access memory portion of each video DRAM. The image algorithm processor address interface port 234 allows address information to be passed between the image algorithm processor 66 and the image memory 82 to coordinate image memory access for reading and writing of the memory 82 using the data supplied by the parallel image processors 72.

More particularly, the video DRAM refresh controller 232 generates addresses and requests for refresh cycles to carry out the refresh operations of the video DRAMs of the image memory 82. Provided also is the screen refresh controller 230 which accounts for numerous parameters of the image memory, such as size, line width, starting addresses of a horizontal line, horizontal offset values, etc., so that the serial shift registers of the video DRAMs are sequentially loaded and shifted in a timely manner to provide raster scan pixel data for the monitor 28. Also, the screen refresh controller 230 monitors such parameters so that the serial shift registers of the video DRAMs can be loaded on-the-fly at any time during the horizontal scan. The image algorithm processor address interface port 234 provides an interface between the image algorithm processor 66 and the image memory controller 68 to pass address information therebetween.

The video state machine 228 generates timing signals necessary for the screen refresh operations of the screen refresh controller 230. In the preferred form of the invention, the video state machine 228 provides timing signals compatible with RS-170A video timing specifications. The multiplexer 236 and image memory timing controller 238 coordinate address information from the screen refresh controller 230, video DRAM refresh controller 232 and the image algorithm address interface port 234 for driving the image memory 82 accordingly. The image memory timing controller 238 arbitrates requests from the screen refresh controller 230, the video refresh controller 232 and the image algorithm processor address interface port 234 for access to the image memory 82. The image memory timing controller 238 is programmable in order to support different types and configurations of video DRAM devices, and different configurations of the image memory 82.

Figure 8:
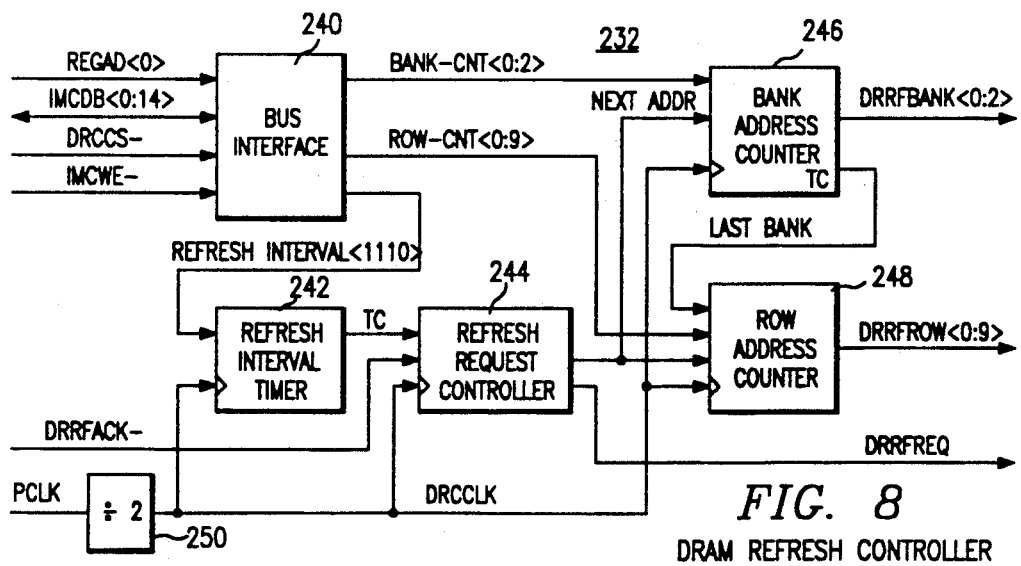
FIG. 8 illustrates in block diagram form the video DRAM refresh controller functions of the image memory controller.

The video DRAM refresh controller 232 is shown in detail in FIG. 8. The video DRAM refresh controller 232 includes a bus interface 240 having a number of programmable registers for defining the various timing constraints and operations of the controller 238. Also included is a refresh interval timer 242, a refresh request controller 244, a bank address counter 246, and a row address counter 248.

The bus interface 240 includes a number of registers which can be programmed to control the refresh parameters of the video DRAMs. The bus interface 240 is provided with a REGAD(0) signal bit for selecting which register is to be written with data, or data read therefrom. A 20-bit input IMCDB(19:0) bidirectional bus is provided for carrying data bits to be written into the bus interface registers or read therefrom. Also provided as an input to the bus interface 240 is a DRAM refresh controller chip select (DRCCS) signal for enabling data transfers to or from the programmable registers of the DRAM refresh controller 232. Whether the programmable registers are read or written is controlled by the signal IMCWE.

The parameters which are programmable within the DRAM refresh controller 232 include the number of image memory banks configured in the image memory 82 and the number of rows to be refreshed in each video DRAM device. Also programmable are the number of PCLK (processor clock) clock cycles between each refresh cycle, and the number of bits per video DRAM row, divided by 256. The last noted parameter is significant to determine the least significant address bit which will be significant for refresh request addressing. A value of one indicates that there are 256 bits in each video DRAM row for which refresh is required. The eight least significant bits of the refresh address are column addresses and are not transmitted to the video DRAMs of the memory 82 by the DRAM refresh controller 232.

The bus interface 240 provides an output 3-bit signal to the bank address counter 246 for designating which bank of video DRAMs is to be refreshed, and a 10-bit row count signal directed to the row address counter 248 for specifying the address of the video DRAM rows to be refreshed. A refresh interval signal is also output by the bus interface 240 to the refresh interval timer 242 to control the timing of the selected row and memory bank to be refreshed. Basic refresh timing (PCLK) is supplied to the DRAM refresh controller 232 by the video output section 106. A divide-by-two circuit 250 provides a basic 74.4 nanosecond clock pulse (DRCCLK) to the various circuits of the DRAM refresh controller 232. A DRAM refresh acknowledge signal (DRRFACK) supplied from a video DRAM timing controller 238 signals that a requested video DRAM refresh cycle is in progress.

It is important to realize that the screen refresh controller 230, the DRAM refresh controller 232 and the image algorithm processor address interface port 234 operate asynchronously, and thus each such circuit can request access of the image memory 82. Thus, an arbiter circuit is provided to determine the priority of the various requests, and service such requests in accordance with a predetermined priority scheme. According to the invention, the screen refresh function of the video DRAM shift registers is given a top priority, followed by refresh of the dynamic random access memory cells, and then address request from the image algorithm processor 66. The arbiter or priority encoder will be described below in connection with the video timing controller.

In any event, the video DRAM refresh controller 232 is programmed to request DRAM refresh memory cycles on a periodic basis, as programmed by a refresh-interval register in the bus interface 240. As specified by the programmable input parameter, the DRAM refresh controller 232 sequences through all the addresses and banks present in a particular configured image memory system 82. The programmed refresh interval must be selected so that all DRAM rows in all banks are accessed and refreshed within a refresh interval, as specified by the manufacturers of the particular video DRAM chips utilized. Normally, each row of each video DRAM chip must be refreshed on the order of about every four milliseconds.

In more detail, the refresh interval timer 242 includes timing means for generating the basic timing period for the DRAM refresh cycles. A 12-bit down counter is programmable with the refresh interval parameter in which, after a number of down counts, it reaches a terminal count. The terminal count (TC) output by the refresh interval timer 242 is input to the refresh request controller 244 for initiating a video DRAM refresh cycle. In response to the terminal count, and in accordance with a row-size parameter programmed therein, the refresh request controller 244 outputs a request to the video timing controller for a DRAM refresh cycle (DRRFREQ). Based on the row-size parameter, the refresh request controller 244 must account for address requirement changes based on the number of rows which must be refreshed in the particular video DRAM devices utilized. The bank address counter 246 and the row address counter 248 receive clock signals as well as outputs from the refresh request controller 244 and the bus interface 240 for generating 3-bit bank address refresh signals and 10-bit row address signals for refreshing the selected video DRAMs.

Figure 9:
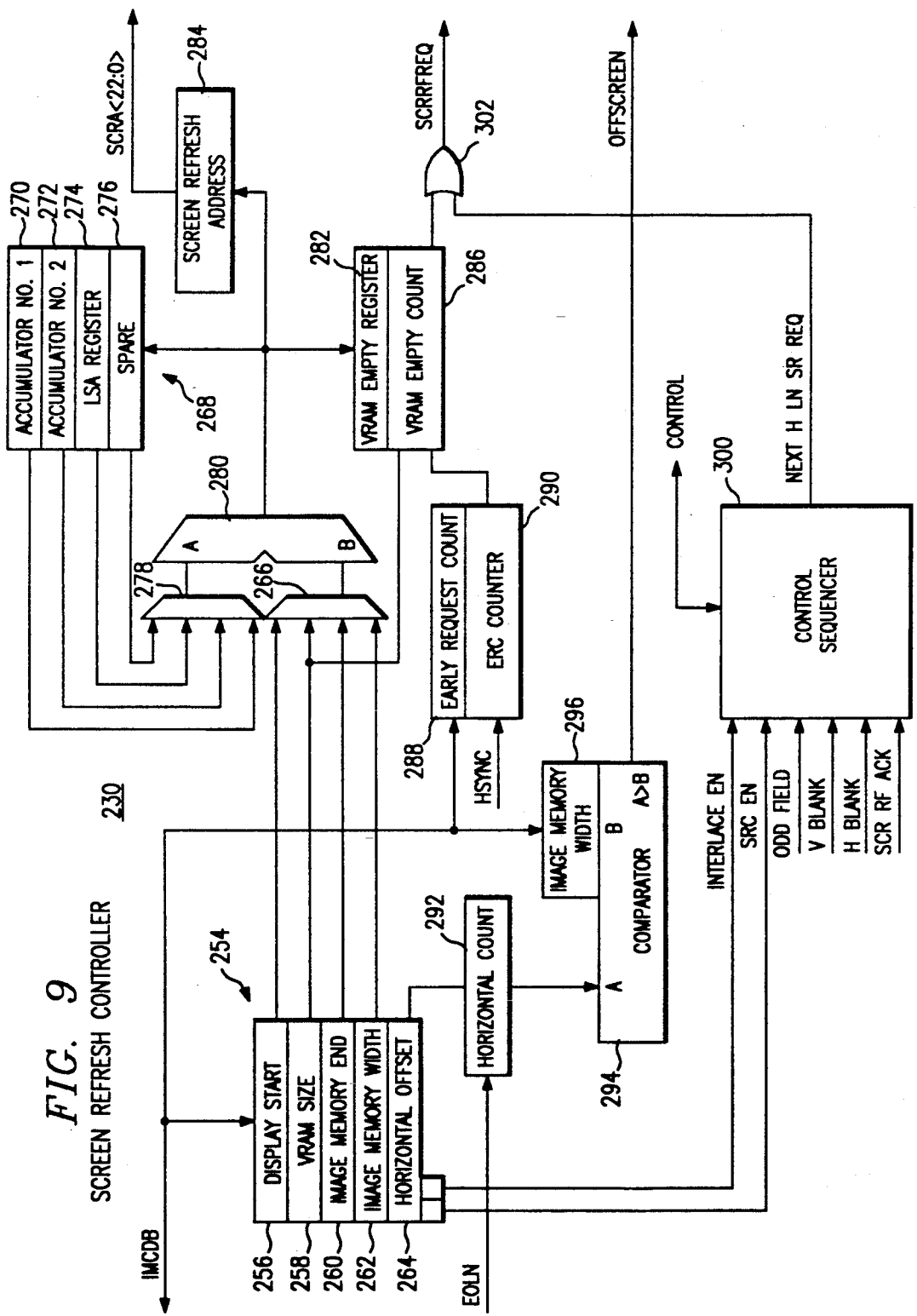
FIG. 9 illustrates in block diagram form the screen refresh controller functions of the image memory controller.

The screen refresh functions of the image memory controller 68 are shown by the circuit of FIG. 9. The screen refresh controller 230 includes a number of programmable registers for storing parameters, such as the starting address location in the image memory 82, which location is associated with an upper left corner of a display $X_0$, $Y_0$ (FIG. 6), the video DRAM size, the image memory address end $X_1$, $Y_1$, the image memory width, and the horizontal offset value. Certain of these parameters are illustrated in FIG. 6 which shows the active image memory in relationship to the viewable or physical image memory. As noted above, the viewable image memory may be as large as $4k \times 4k$ pixels with a smaller active image memory 216, corresponding to the screen size. Shown also is a non-viewable portion of the image memory 226 for storing coefficients and other data required for the various pixel transformations and processing. With regard to the viewable image memory, pixel $X_0$, $Y_0$ represents the base or starting point, while pixel $X_1$, $Y_1$ indicates an image memory end.

The screen refresh controller 230 of FIG. 9 illustrates a number of programmable registers 254 which can be programmed via a 24-bit input bus IMCDB. The group of registers 254 comprise a display start register 256, a VRAM size register 258, an image memory end register 260, an image memory width register 262 and a horizontal offset register 264. Each register 256-264 has an output connected to multiplexer 266. A second group 268 of programmable registers comprises an accumulator #1 register 270, an accumulator #2 register 272, a last start address (LSA) register 274 and a spare register 276. The output of each register of group 268 is coupled to respective inputs of a second multiplexer 278.

The outputs of multiplexers 266 and 278 each have a 24-bit bus connected to an input of an arithmetic logic unit (ALU) 280. Input port A of ALU 280 is associated with the register group 268, while input port B of the ALU 280 is connected to the registers of group 254. The output of the ALU 280 is connected to a screen refresh address register 284, as well as to a VRAM empty register 282. The screen refresh address register 284 provides a 23-bit output signal (SCRA) to a VRAM controller. The contents of the VRAM empty register 282 can be loaded into a VRAM empty counter 286.

An early request count (ERC) register 288 can be loaded from the IMCDB bus. The contents of the early request count register 288 can be loaded into an associated ERC counter 290. A horizontal count register 292 is loaded via the end of line (EOLN) input bus. Fourteen bits from the horizontal count register 292 can be loaded into input A of a comparator 294. Associated with input B of the comparator 294 is a register 296 which holds the parameter identifying the width of the image memory 82. An Offscreen output is provided from the comparator 294 to the video output section of the image computer 22. A control sequencer 300 provides control over the circuits shown in FIG. 9. A logic OR gate 302 has inputs connected to the control sequencer 300 and to the VRAM empty counter 286 to provide a screen refresh request (SCR-RFREQ) to the VRAM controller. The basic timing supplied to the screen refresh controller 230 for the counters and registers is SCLK.

The active portion of the image memory 82 includes an area of pixels representative of the desired image to be displayed. The pixel identified by $X_0, Y_0$ defines a display start parameter which is stored in the display start register 256, and which defines the first pixel in a row of pixels of the first raster scan line to be displayed on the video display 22. The image memory width, which in the example, is 2k pixels, also defines a parameter stored in register 262. The horizontal offset defines the horizontal displacement of the left edge of the active image memory with respect to the left edge of the viewable image memory. The offset parameter is shown in FIG. 9 as stored in register 264. The VRAM size, or shift register length, characterizes the type of video DRAMs utilized, and in the example is programmed with the number 255 which represents one less than the length of the memory shift register device. The type of video DRAMs identified below have 256 serial shift register cells for storing and shifting 256 bits of image data. The pixel location $X_1, Y_1$ defines an image memory end location which is stored in register 260.

As can be appreciated, by programming different values or parameters within the registers 254, the active image area can be moved around so as to make viewable generally an portion of the total image which resides in the 4k×4k viewable portion 214 of the image memory 82. Particularly, the display-start and horizontal-offset parameters in the associated registers 256 and 264 correspond to scrolling or panning functions.

As noted, the five programmable registers 254 can be read or written via the image memory controller data bus IMCDB. The multi-bit output of each of the programmable registers 254 is input to the multiplexer 266, the output of which is provided as a 24-bit input of the adder or arithmetic logic unit 280. The other input to the arithmetic logic unit 280 is the 24-bit input comprising the output of multiplexer 278 which has inputs derived from register group 268. The multiplexers 266 and 278 are under control of the sequencer 300.

As noted previously, the horizontal counter 292 is provided with an end of line input which is supplied by the video state machine, and is utilized to start the early request counter 290. The output of the horizontal counter 292 is coupled to the comparator 294, while the memory width parameter is latched and provided as another input thereto. The comparator 294 compares the image memory width parameter with the length of a pixel line which constitutes a video display line, and provides an output when an active image memory boundary is encountered. An offscreen indication is produced when the pixel line width is greater than the image memory width, thereby indicating that the corresponding out-of-bounds linear addresses should no be coupled to the image memory, but rather the video display will be caused to display a black edge. This occurs when, for example, scrolling or panning of the active image memory extends beyond the 4k×4k boundary of the viewable portion 214 of the image memory 82.

The early request count register 288 is programmable to function with the early request counter 290 for providing an advance indication to the image memory controller arbiter (not shown) that a priority event, e.g., the loading of the video DRAM shift registers, is imminent. The ERC counter 290 includes a horizontal sync as an input, while the early request count register 288 can be loaded from the image memory controller data bus IMCDB. The output of the ERC counter 290 is coupled to the video VRAM empty counter 286. The video VRAM empty counter 286 can be preset from the register 282 which is loaded from the output of the arithmetic logic unit 280. The video VRAM empty counter 286 indicates when the serial shift registers of the video DRAM chips are empty, that is, when the last bit has been shifted out of the 256-bit serial shift register. The output of the video VRAM empty counter 286 is logically combined by a logic OR function with the next horizontal line shift register request output of the control sequencer 300. As a result, a screen refresh request output is provided to the video DRAM controller to request a screen refresh cycle. The output of the arithmetic logic unit 280 is latched in the screen refresh address register 284 which provides a 23-bit output defining a screen refresh address. This address is output to the video DRAM controller to provide the addressing for screen refresh cycles. In essence, the screen refresh address allows addressing of an 8k×8k memory space when the image computer 22 is operating in an 8-bit per pixel mode.

The control sequencer 300 controls all the operations of the screen refresh controller 230 circuits. The control sequencer 300 includes a register, a programmable read-only memory, and a test condition multiplexer (not shown). The multiplexer has a number of inputs comprising the inputs to the control sequencer 300. The output of the multiplexer is connected to the read-only memory which provides data output to the register. The register has three groups of outputs, two groups of which are coupled respectively to control the multiplexer and to the input of the read-only memory to provide sequencer state information. The other output group of the register provides the output of the sequencer 300. Importantly, the control sequencer 300 functions to control the generation of addresses for providing interlaced and noninterlaced raster scan data to the video display 28. Provided as inputs to the control sequencer are an interlace enable, a screen refresh enable signal, an odd field active flag from the video state machine, a vertical and horizontal blanking signal from the video state machine, a sign bit output from the ALU, video screen refresh cycle acknowledge and a video empty request from the video VRAM empty counter 286.

While shown only in general, the outputs of the control sequencer 300 include a 5-bit signal for selecting the ALU 280 function to be performed, a 2-bit signal for selecting the register file 268, two other signals for selecting the A and B input to the ALU 280, a signal for writing to the register file 268, a video DRAM empty counter load and a video DRAM empty register load, a signal for setting the video DRAM screen refresh request, and a signal for loading the screen refresh address register 284. With the foregoing input and output functions of the screen refresh controller sequencer 300 identified, the operation of the sequencer can be appreciated from the flow chart of FIGS. 11a and 11b.

The screen refresh controller 230 is adapted to provide two types of screen refresh requests to the video state machine. A first screen refresh request, identified as "next-h-line-sr", is generated at the start of each horizontal line screen refresh.. A second screen refresh request identified as "VRAM-empty-sr", is generated when the serial shift registers of the video DRAMs of the image memory 82 are empty. The next-h-line refresh request occurs before each horizontal line is displayed. Particularly, the next-h-line refresh request is executed during the horizontal blanking period, whereupon the serial shift registers of the video DRAMs are loaded with pixel data for the start of the next horizontal scan. Calculation of the new screen refresh cycle address begins when the horizontal blanking signal is received from the video state machine.

Because the present invention provides for a memory storage area which is much larger than that required for displaying an image, and because the shift register length of each video DRAM may not correspond to the length of a display line, certain provisions are made for controlling the reloading of the video DRAM shift registers on-the-fly. By this it is meant that the various video DRAMs may have shifted the last pixel during the scanning of a display line, whereupon such registers are required to be reloaded with new pixel data before the next shift register clock cycle. Synchronizing the loading of the video DRAM shift registers between the time the last pixel is shifted and when new pixel data is loaded requires coordination in two respects.

First, the video DRAM shift register clock (SCLK) has a period of about 74.4 nanoseconds, thus requiring the reloading to occur between two clock cycles. It should be remembered that on the rising edge of one clock cycle the last pixel bit is shifted out to the output video section, and on the rising edge of the next clock cycle the first new pixel bit is required to be shifted. As a result, the reloading of the video DRAM shift registers is transparent to the user in that the scan lines on the video display continue uninterrupted. A second consideration in reloading the video DRAM shift registers is that a video DRAM memory cycle requires considerably more time than the shift register clock cycle, thus necessitating the advanced coordination of a shift register reload in order to assure that such reloading can occur exactly at a predetermined clock cycle. Since the video DRAMs can also undergo refresh of the random access portion, as well as conventional reading and writing thereof, such types of cycles must be inhibited during the video DRAM shift register load cycle. The manner in which the priorities between the various video DRAM cycle types are prioritized is discussed below in connection with the video DRAM timing controller.

Figure 10:
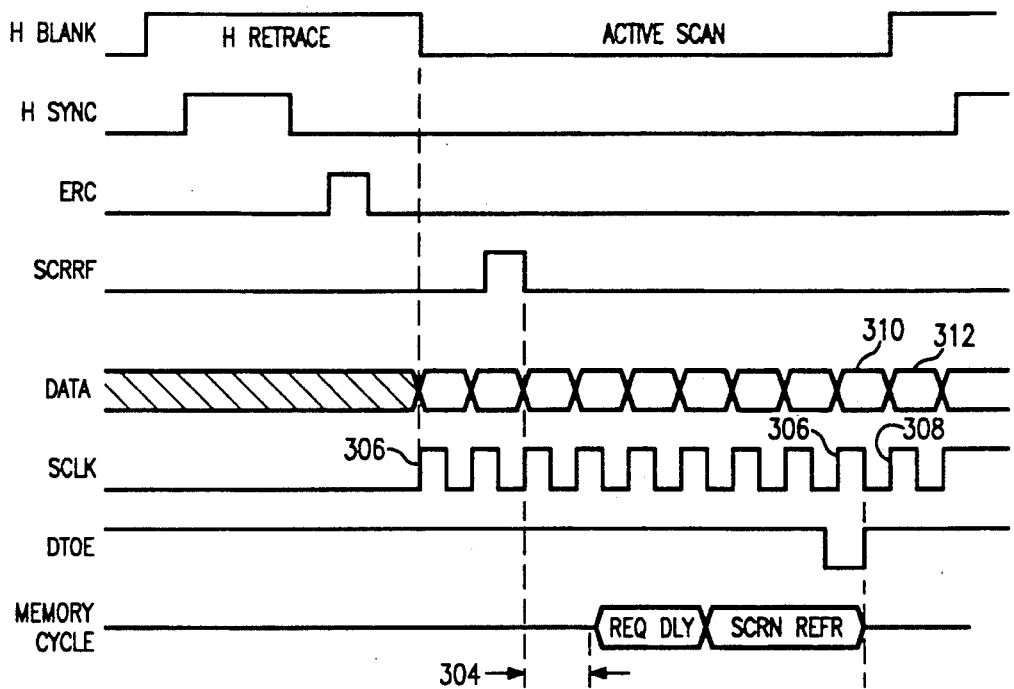
FIG. 10 depicts a series of waveforms illustrating the loading of the VRAM shift registers on the fly.

The feature of the invention by which the video DRAMs are loaded on-the-fly is shown graphically in FIG. 10. As will be described below in connection with the image memory 82, the internal serial shift registers of the video DRAM devices hold 256 bits each, with four such chips holding about 2K of pixel bits. As can be appreciated, this capacity is generally more than needed to accommodate a video horizontal scan trace. However, while the serial shift registers of the video DRAMs need not be loaded at the beginning of each horizontal trace, such loading is conducted to provide an efficient utilization of the image memory 82. The loading of the VRAM shift registers at the beginning of each horizontal line scan, and with the provision of loading on-the-fly, the image memory 82 can be configured to obtain maximum utilization of any configurable viewable area within the 4K by 4K image memory 82. For example, with a viewable window or area of pixels less than the 4K width of the memory, those pixels on the right of the window are otherwise difficult to utilize. With the foregoing, however, the image memory 82 can be configured to be made contiguous such that the addressing thereof can be achieved so as to place the unused pixel area on the right of the window, beneath such window and thereby easily access the extra pixel area without resorting to complicated addressing schemes or circuits.

In order to accomplish the timing of the shift register loading at a predetermined SCLK clock cycle, a screen refresh request must be generated in advance, and other memory cycles must be locked out so that such other memory cycles cannot interfere with the reloading of the VRAM shift registers. With regard to FIGS. 9 and 10, there are illustrated the horizontal retrace period and the active period during which pixels are shifted out of the VRAM shift registers, processed and transferred to the monitor 28. The ERC counter 290 is loaded with a count which is fixed for a particular display format. The ERC count is related to the time when the shift register loading should occur, minus the overhead time required to generate the screen refresh cycle. The ERC counter is triggered on the rising edge of HSYNC, and after counting the number of counts initially preset therein, the ERC counter 290 triggers the VRAM empty counter 286. The VRAM empty counter is preset by the control sequencer 300 with a count which indicates the number of pixel words (eight pixels per word) which remain in the VRAM shift registers at the beginning of the horizontal retrace period. Since this value may change on every horizontal retrace cycle, the control sequencer 300 determines such value and loads the VRAM empty counter 286 with the appropriate count during each horizontal retrace or blanking period. After the VRAM empty counter 286 has completed its count, an output is provided through the OR gate 302 to generate the screen refresh request (SCRRFREQ) signal.

As noted in FIG. 10, and to be described in more detail below in connection with the memory cycle arbitration circuit, the SCRRFREQ signal initiates a delay 304 after which a request delay is generated. After the request delay, a screen refresh cycle is started, whereupon the VRAM data output enable (DTOE) signal is generated. The DTOE signal is timed so that the rising edge thereof occurs about midway between the desired SCLK cycles. Specifically, the rising edge of DTOE is caused to occur after the SCLK signal 306 which was effective to shift out the last pixel word, and before the next SCLK signal 308 which will shift out the first pixel word of the newly loaded serial pixel string. Preferably, the rising edge of the DTOE signal occurs on the falling edge of the SCLK signal 306. As can be seen in the example, pixel data 310 represents the last word in the VRAM shift register before the new pixel word 312 is loaded therein. It can be appreciated that there is no time lapse or discontinuity between the serial shifting of pixel data 310 and 312, and thus the on-the-fly loading of the VRAM serial shift registers is transparent to the user of the image computer 22 of the invention.

Figure 11A:
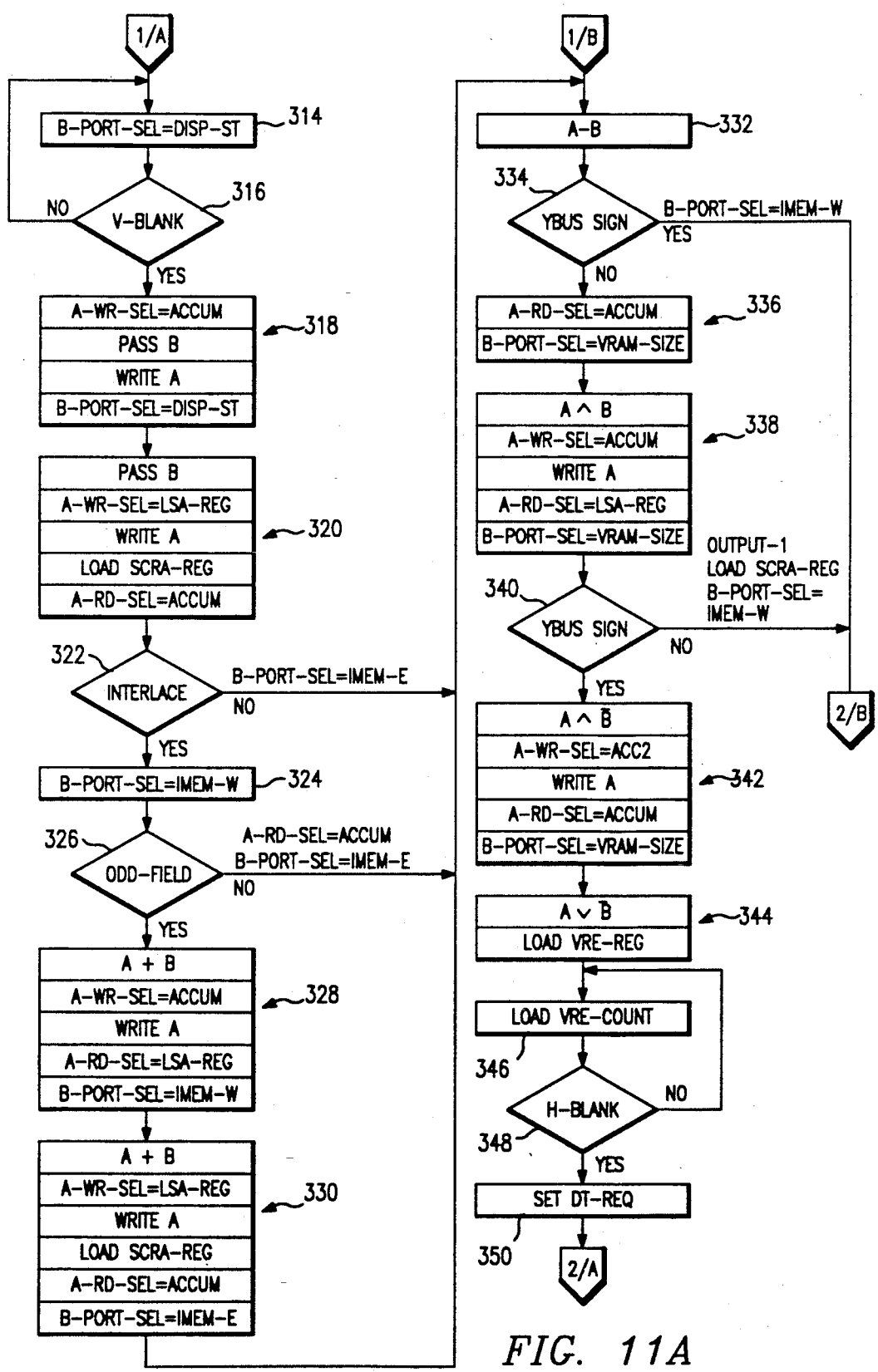

FIGS. 11a and 11b, illustrate the operations of the screen refresh control sequencer 300 in carrying out the screen refresh function in a timed manner so that video DRAM shift register loading can occur on-the-fly. With regard to the screen refresh controller flow chart, the sequencer 300 loads the B port of the ALU 280 with the display start parameter programmed into the B port register 256. This occurs during the vertical blanking period of the video display. The display start address relates to the pixel location address at the upper left part of the display area of the image memory 82. During the vertical blanking period the display start parameter is written through the ALU 280 into one of the accumulator registers of the A port register 268. During the next control sequencer cycle, the display start address is again read and passed through the B port of the ALU 280 for writing into the screen refresh address register 284. During this same cycle the last start address register 274 is loaded. This is the first address output on the SCRA output. In the same cycle, port A accumulator of the accumulator register file 280 is read, and the sequencer 300 proceeds to determine whether the system is of the interlaced or noninterlaced type. The foregoing sequence is illustrated in program flow blocks 314–322.

In a sequential noninterlace scan system, the sequencer 300 is directed from decision block 336 to the block 332. On the other hand, in an interlaced system where alternate even and odd lines are scanned during a vertical scan, the sequencer 300 reads the B port register 254 of ALU 280 to identify the image memory width from register 262. Program flow block 328 illustrates this step of the program. A test is next executed to determine if the line to be scanned is an even or odd line. For odd lines, the address selected is not the upper left corner of the display area, but rather the next line down. For odd fields, the sequencer 300 then adds the A+B ports of the ALU 280, which ports include the last start address and the image memory width. As a result, the ALU 280 provides an output address which is the starting point of the next line down the video display. The same calculated address is also written to A port register 268, in the last start address register 274. With the foregoing operations, the address of the left top portion of the screen is generated, and is ready for use in the next horizontal scan.

Continuing with blocks 332–338 of the flow chart, the control sequencer 300 next determines whether the newly generated address falls within the viewable area. In other words, the newly generated address may be offscreen to the left, right, top or bottom. To determine if the line is displayable, the last starting address is subtracted from the image memory end. The sign bit is then tested in black 334, and on an affirmative indication thereof signifying a nondisplayable line, the control sequencer 300 is branched to FIG. 11b. However, if the result of the test 334 is found to be positive, indicating a displayable line, the control sequencer 300 causes the last start address and the video DRAM size parameters to be loaded into the ALU 280. In the next two flow diagram blocks, the control sequencer 300 makes additional tests to determine if the address represents a displayable line.

Next, and as indicated in the program flow blocks 342 and 344, there is represented the operations in which it is determined the number of pixels remaining on the line. This is derived by utilizing the address and anding off the least significant bits thereof to derive the address identified in the video DRAM shift register, it being known that the shift register length has been programmed for a size of 256. Thus, everything above 256 is truncated, leaving only the 256 least significant bits. An address in the shift register is thus obtained. The address is then inverted to determine the number of pixels remaining in the shift register. The result is loaded into the VRAM empty register 282, as indicated by block 344. In like manner, the counter 286 is then set with the VRAM empty number. It should be understood that when the transfer does indeed occur, the number 256 is loaded into the VRAM empty register 282.

With regard to control sequencer operation of block 348, a loop is executed until the horizontal blanking signal is detected. When such a blanking period is detected, the control sequencer 300 sets a data transfer request indicating a request to load the video DRAM shift registers. The video DRAM shift registers will be loaded with the bits associated with the address previously calculated. Importantly, and based upon the video DRAM size and the last start address, a screen refresh request can be signaled sufficiently in advance so that other cycles which may be in progress can be completed. Also, a shift register load cycle can be executed after the last pixel bit has been shifted out, and before the next shift clock (SCLK) which will effect the shifting of the first bit of the newly loaded pixel data.

After the control sequencer 300 has received the acknowledgement 352 from the VRAM timing controller, the register in such sequencer 300 receiving such acknowledgment is cleared 354. Hence, the video DRAM shift register is now loaded, and the screen refresh address can be changed in the screen refresh address register 284. Particularly, the screen refresh address register 284 is loaded with the address for accomplishing a reload on-the-fly. This is calculated by adding 356 the video DRAM size from register 258 to the ALU 280. The complement of the address is taken and loaded into the VRAM empty register 282. Also, accumulator #2 register 272 of the A port file 268 is read, which includes information concerning the starting address of the previous shift register to determine where the pixel line boundary occurs. The video DRAM size parameter is then added to the parameter in accumulator #2 register 272. As noted in blocks 356 and 358 of the flow chart, the A port and B port of the ALU 280 are added.

Once the video controller has acknowledged the data transfer request, the control sequencer 300 clears such acknowledgment, causing the B port register 254 to be loaded with the VRAM size. As noted in block 358, the address of the screen refresh address register 284 is changed by adding the unit "1" to the A and B registers 268 and 254, writing to the register group 268 the result thereof, and then loading the screen refresh address register 284 with the new address. Importantly, the screen refresh address register 284 is not updated until it is known that the previous address loaded therein has been used. The address loaded into the screen refresh address register 284 comprises the address of the VRAM utilized in connection with the on-the-fly transfer. As noted from block 356, register group 254 includes data representative of the VRAM size. Register A contains the starting address of the previous shift register. In other words, the VRAM size is added to the starting address so that the correct address is loaded into the screen refresh address register is assured in advance, and thus after a number of (SCLK) cycles the VRAM shift register will be empty. This is utilized in connection with the noted on-the-fly transfer.

The sequencer actions identified in blocks 350–358 occur during raster scanning. Horizontal and vertical blanking periods are detected by the control sequencer 300 according to blocks 360 and 362. The entire procedure is repeated in the event an end of a scan line of the video monitor 28 is detected. If, on the other hand, the end of a memory page is detected, the starting address must be recalculated, otherwise, the image memory width is simply added to produce the address of the next horizontal scan line.

In the event a VRAM empty request is detected, an on-the-fly transfer of pixel data from the VRAM random access cells to the VRAM shift register is indicated. In such event, the starting address of the next VRAM empty cycle is calculated. This is noted in blocks 364, 366 and 368 of the FIG. 11b flow chart.

As noted in block 366, if there is an output from the VRAM empty counter 286 indicating a request for a screen refresh, the A and B ports are again added together with a unity value with the result thereof being loaded back into the register group 268. The screen refresh request address register 284 is then loaded with this result. Next, the request is cleared, as noted in block 368, and the last start address of the register group 268 is read, as is the register group 268 image memory end parameter. Return is made to the horizontal blanking decision block 364, and if the horizontal blanking period is in progress, control is directed to block 370. In blocks 370 and 372, the last start address and image memory width parameters are read from the respective A and B ports of the ALU 280 and added together (block 372), and result thereof written back into the last start address register 274. If the operational mode of the screen refresh controller is not in an interlace mode, control is branched to block 374 where the image memory end address is loaded from the register 360 into the ALU 280. If a vertical blanking period is in progress, the control sequencer 300 returns to the start of the program flow chart for traversal therethrough again. If no blanking period is in progress, control returns to entry point 1/B of the flow chart.

In the interlace mode, the image memory width is again added to the starting address of the current line to skip a line and generate the start address of alternate line numbers. This is accomplished in blocks 376 and 378, and thereafter the control returns to program flow entry point 1/A or 1/B depending on whether a vertical blanking period is in progress.

From the foregoing, there is disclosed the detailed operation of the screen refresh portion of the image memory controller 68 which controls the operation of the shift register section of the image memory VRAMs to assure that pixel data is always available for writing to the video display device 28. An important feature of the screen refresh controller 230 is that it maintains the various address parameters which are necessary to determine in advance when the serial shift registers of the VRAM devices will be empty and dynamic reloading thereof will be required. Importantly, with the foregoing technique, the video DRAM shift registers need not be loaded during video blanking intervals, but rather can be loaded on-the-fly during a horizontal line scan without leaving gaps of interruptions in the pixel transmission to the display. The advantage of this technique is that the number of shift register cells in the video DRAM shift registers can be independent of the number of pixels in a horizontal line of the video system. Thus, video systems with longer horizontal scan lines can be supported without requiring video DRAM with correspondingly longer shift registers. Also, this feature of the invention allows large image memories to be configured as contiguous blocks or pages of memory.

Figure 12:
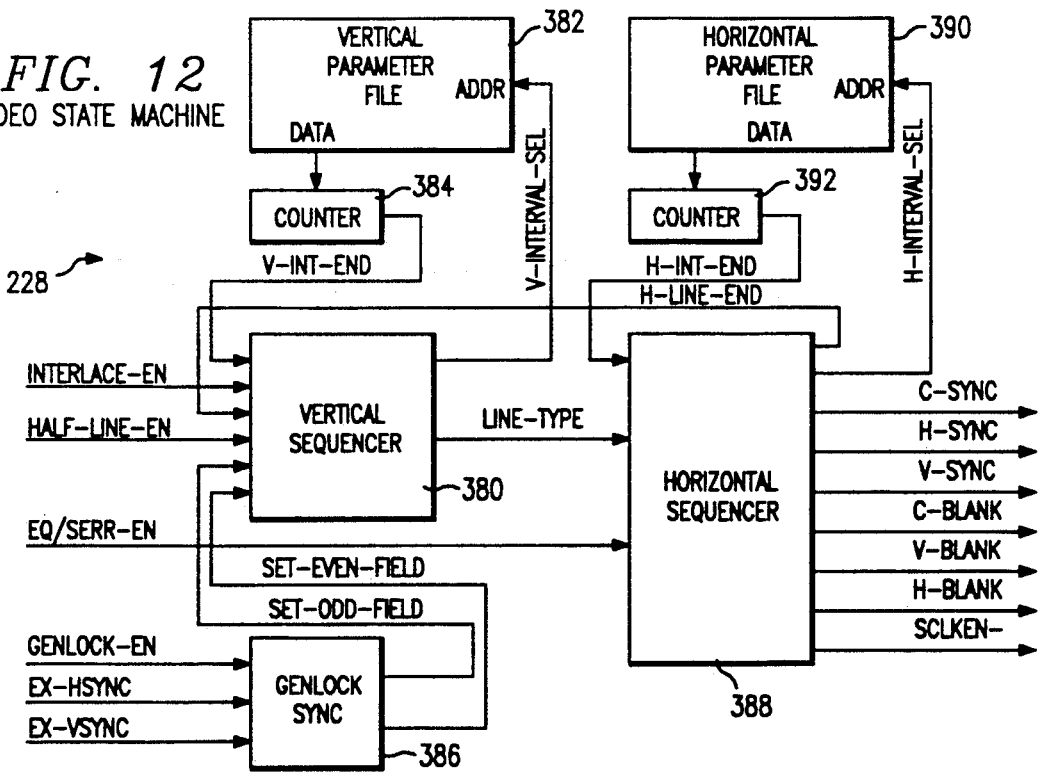
FIG. 12 is a block diagram of the video state machine of the image memory controller.

The image memory controller 68 also includes a video state machine 228, as illustrated in FIG. 12. The video state machine 228 functions to generate the timing signals necessary for the screen refresh controller 230. The video state machine 228 of the invention is programmable to support a number of video timing specifications, such as the RS-170-A, RS-330, and RS-343 formats. Because of the programmable nature of the video state machine 228, a great deal of flexibility is provided, and thus many other video timing specifications can be accommodated.

The video state machine 228 of the image memory controller 68 includes a vertical sequencer 380 connected by a 3-conductor line to a vertical parameter file 382. The output of the vertical parameter file 382 is an 11-conductor bus connected to the input of a counter 384. The counter 384 provides an output to the vertical sequencer 380 for controlling the cyclical operations of such sequencer 380. A genlock synchronization circuit 386 is connected to the vertical sequencer 380 for synchronizing the video state machine 228, if desired, and thus synchronizing the video circuits of the image computer 22 with external video equipment.

The video state machine 228 also includes a horizontal sequencer 388, a horizontal parameter file 390 and a counter 392 connected together in a manner similar to the like-identified vertical circuits of the video state machine 228. The horizontal and vertical sequencers 388 and 380 are connected together for signaling therebetween for providing output video sync and blanking outputs conforming to the noted video timing specifications.

As further noted in FIG. 12, the video state machine essentially comprises independent state machines functioning respectively as a vertical sequencer and another state machine functioning as a horizontal sequencer. The vertical and horizontal state machines cooperate to provide output video formats with various horizontal video line types, each of a given time period. Moreover, each line type comprises a sequence of output signal combinations which remain active for a period as determined by a horizontal subset of video timing parameters which are stored in various registers in the video state machine 228. A number of line types, such as sixteen line types, can be supported and selected by a 4-bit encoded signal supplied from the vertical sequencer 380 to the horizontal sequencer 388. The output of the horizontal sequencer 388 comprises a C-Sync signal which provides an RS-170 composite sync signal directed to the video output section for driving the video monitor 28. A H-Sync signal is also output, which signal is the horizontal component of the monitor synchronization signal. The H-Sync signal is produced once per horizontal line scan. A vertical-sync signal (V-Sync) is also output which is a vertical component of the monitor synchronization signal occurring at the beginning of each field of the video frame. The horizontal sequencer 388 provides a number of output blanking signals, including a C-Blank signal utilized by the video output section of the invention to disable the video output during horizontal and vertical retrace periods. A vertical-blank (V-Blank) signal identifies the vertical retrace interval and provides a trigger signal for reading or writing the look-up tables of the video output section during the vertical retrace intervals. A horizontal-blank (H-Blank) signal output by the horizontal sequencer 388 identifies the horizontal retrace interval. A timing signal denoted by SCLKEN is output by the horizontal sequencer to enable the clock signal (SCLK) to the video DRAMs to produce a shift clock signal for the video DRAM serial shift registers.

As noted above, the various features of each horizontal line of the desired video formats are stored in a register file in the video state machine 228. The various features, or line types, stored in the register file comprise a vertical back porch, an active line period, an equalization interval, a vertical sync interval, an end of odd field, a start of even field, a vertical sync start, a vertical sync end, last equalization, an end of odd field with no front porch, an end of odd field with an extra front porch, an extra vertical front porch, a vertical sync start with no equalization, and a vertical sync end with no equalization. Such a register file is located in the vertical sequencer 380. The vertical sequencer 380 steps through the horizontal line types in a predetermined pattern based upon a vertical subset of the video timing parameters which are also stored in the register file. The vertical sequencer 380 is responsive to the horizontal sequencer 388 to complete each line, and then sequences to the next line. An 11-bit counter is utilized in connection with each of the sequencers to control the length of each interval. Each counter is loaded with values from the associated register file under control of the associated sequencer. When a terminal count (TC) is reached by each such counter, the associated sequencer is triggered and advances to the next state.

The vertical sequencer 380 includes a programmable read-only memory for storing programs or routines which are selected and carried out in connection with the different video format specifications. The architecture of the vertical sequencer 380 is line oriented, in that it produces a horizontal line configuration according to a selected video format, and then is directed to another routine for deriving another line format should the video format change. Essentially, the vertical sequencer 380 supplies a 4-bit line type signal for each horizontal line type to the horizontal sequencer 388. This field is latched into the horizontal sequencer 388 at the end of each line interval and is utilized to generate the video timing outputs for the next horizontal line. In like manner, the horizontal sequencer 388 provides an output on the H-LINE-END conductor to the vertical sequencer 380 indicating the line-type signal has been received, and that the vertical sequencer 380 should determine the next line type. In the event a counter in the vertical sequencer 380 indicates a zero condition defining the last line of a particular vertical interval, the vertical interval counter will be reloaded with the number of lines in the next vertical interval.

More particularly, the routines stored in the ROMS of the vertical sequencer 380 define the various intervals of each video vertical signal, including the blanking periods, the sync periods, the vertical serration periods, etc. The vertical parameter file 382 and the counter 384 function to define each horizontal scan line and to signal the vertical sequencer 380 at the end of each such line. The output of the vertical sequencer 380 signals the horizontal sequencer 388 of the type of cycle required, and the particular routine within the programmed ROM of the horizontal sequencer 388 to access for producing the video signals conforming to the selected video format.

The horizontal sequencer 388 includes a counter and a ROM which is programmed with routines for defining the video signal components corresponding to the front porch, sync, back porch and active portions of the video signal. The horizontal sequencer 388 loads the horizontal parameter file 390 with data concerning the number of shift clock (SCLK) pulses which should occur during a sync interval, during the front and back portions of the video signal interval and during the active time of the video signal. The counter 392 is then loaded with the number of lines, and the end thereof is utilized to signal the horizontal sequencer 388.

At the beginning of each horizontal line interval, the line-type latch is loaded with a new line type, and the horizontal sequence counter is set to a predetermined value, such as nine. The line type and the sequence count are applied to a timing PROM in the horizontal sequencer 388, which PROM generates the appropriate output signals. The output signals are clocked through an output pipeline and distributed to the screen refresh controller 230 and the video output section. At the end of each horizontal interval, a signal on the H-INT-END conductor is generated by the horizontal interval counter. This signal decrements a counter in the horizontal sequencer 388, whereupon a new interval count is loaded into the interval counter. In the event an operation is occurring on the last interval of a line, the sequence counter is reloaded to the value (nine), and a new line-type is latched into the horizontal sequencer 388.

By providing a high degree of programmability in the video state machine 228, the intervals in the horizontal and vertical video signals can be chained together to provide essentially any type of pulse train satisfying the various and different types of video formats.

Figure 13:
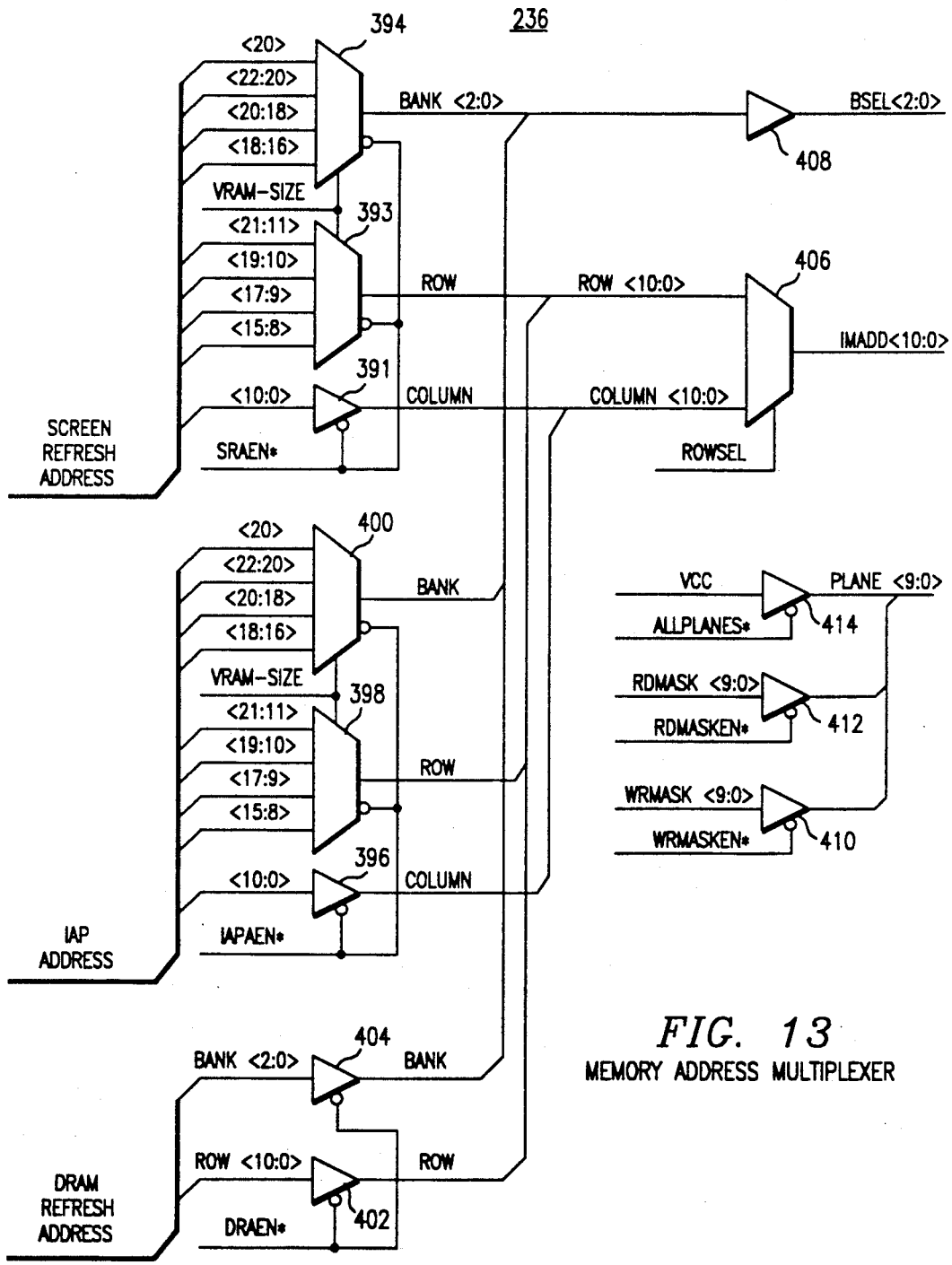
FIG. 13 is an electrical schematic drawing of the memory address multiplexer of the image memory controller.

FIG. 13 illustrates the address multiplexer 236 for coupling addresses from the screen refresh controller 230, the video DRAM refresh controller 232 and the image algorithm processor address interface port 234 to the image memory 82. The address multiplexer 236 operates to select the appropriate image memory address source based upon a predetermined priority assigned to each such address source. In addition, the address multiplexer 236 functions to separate the addresses into bank select, row/column addresses and plane for output to the image memory 82. According to the invention, the address multiplexer also provides a great deal of flexibility for supporting video DRAMs of various sizes, such as 256K, 1MEG and 4MEG. Image memory configurations of up to eight banks and up to ten planes of 64-bit memory words can be configured as either 8 or 16-bit pixels. Other nonstandard video DRAM configurations can also be supported.

Associated with the screen refresh addresses are three multiplexers. A first multiplexer 391 is provided with eleven screen refresh addresses (10:0) inputs for providing output column addresses. The column addresses are generated from the least significant bits of the screen refresh address. Screen refresh address bits (21:8) are supplied to a second multiplexer 393 which produces row addresses for the video DRAMs. Lastly, screen refresh address bits (22:16) are applied to a third multiplexer 394 which provides a 3-bit output defining a particular bank of image memory to be accessed. A screen refresh address enable signal (SRAEN) is supplied by the video timing controller for selecting the desired screen refresh address for output to the image memory 82. A signal representative of the video DRAM size (VRAM-size) controls the various multiplexers of memory address multiplexer 236 to select the desired row addresses based on the size of the VRAM devices utilized in the image memory 82.

A 23-bit address is also supplied to the memory address multiplexer 236 from the image algorithm processor address interface port 234. The 23-bit address is applied to a 3-section multiplexer similar to that described above in connection with the screen refresh address multiplexer sections. The multiplexer 396 is associated with the least significant bits, or column address. A second multiplexer 398 generates row addresses, while the third multiplexer 400 generates the band select signal. Similar to the screen refresh address multiplexer section, the multiplexers associated with the image algorithm processor address port 234 are controlled by a signal representative of the VRAM size. The column address multiplexer 396 is controlled by an IAP address enable signal supplied by the video timing controller, which signal selects the image algorithm processor addresses for output to the image memory 82.

A 12-bit address generated by the DRAM refresh controller 232 is applied to a two-section multiplexer comprising multiplexer 402 and multiplexer 404. Multiplexer 402 generates row addresses from DRAM refresh address (10:0), while multiplexer 404 generates bank addresses from the DRAM refresh bank address (2:0). The outputs of the screen refresh address multiplexer, the IAP address multiplexer and the DRAM refresh address multiplexer are applied to an image memory address multiplexer 406 and a bank select buffer 408. Particularly, the row and column addresses are applied to the image memory address multiplexer 406, while the bank select signals are applied to the bank select buffer 408. The image memory address multiplexer 406 is controlled by a row select (ROWSEL) signal supplied by the video timing controller, which signal selects either the row or column addresses to be output to the image memory 82.

A plane select multiplexer is also provided for accessing the image memory 82 to select which memory plane is to be accessed during each memory cycle. A 10-bit plane select signal is generated by a first multiplexer 410 having an input corresponding to a write mask address. This address is utilized to select which plane or planes are to be accessed during an IAP memory write cycle. Such address is held in a register in the bus interface unit of the image memory controller 68. The write mask address multiplexer 410 is controlled by a write mask enable signal generated by the VRAM timing controller for driving the write mask address on the appropriate address bus. A read mask address is generated in a comparable manner utilizing a multiplexer 412. The third image memory plane multiplexer 414 is enabled by an Allplane signal for driving the 10-bit plane bus with logic high levels during screen refresh and DRAM refresh cycles.

The output of the image memory controller address multiplexer 236 is applied to the image memory 82. Timing signals generated by the request arbiter and image timing controller 238 depicted in FIG. 14 are also supplied to the image memory 82. As noted above, various cycle types, such as screen refresh, DRAM refresh and IAP address requests, may be requested simultaneously, and thus must be prioritized in order to carry out the requests in an orderly manner. In the preferred form of the invention, the request arbiter and image memory timing controller 238 prioritizes requests in the following order: first, screen refresh request; second, DRAM refresh request; and third, IAP address read request and IAP address write request. Because of the provision of loading the video DRAM shift registers on-the-fly, a screen refresh request is given the highest priority. In order to maintain image data in the video DRAMs, a video DRAM refresh request is given the next highest priority. IAP read and write requests are given the lowest priority.

According to the schematic diagram of FIG. 14, the request arbiter and image memory timing controller 238 is provided with a programmable lockout delay circuit 420 and a request delay circuit 422 for providing serial delays to an input screen refresh request (SCRFREQ) signal. The output of the lockout delay 420 is applied as an inhibit input to a 3-gate NAND circuit 424. The video DRAM refresh request (DRRFREQ) signal, address read request (IAPRDREQ) signal and IAP write request (IAPWRREQ) signal are applied as request inputs to the respective NAND gates 424. The output of the request delay circuit 422, as well as that of the three NAND gates 424 is applied to a priority encoder 426. The internal data bus 70 of the image memory controller 68 is connected to the lockout delay 420 and request delay 422 circuits for programming therein delays of predetermined intervals. The output of the priority encoder 426 includes a cycle request and a cycle type signal applied respectively to a cycle controller 428 and a D-type latch 430. The cycle controller 428 is connected to the clock input of a cycle counter, which counter has an input register address (REGAD) conductor carrying bits for selecting which video timing controller register is to be accessed. The REGAD bits are generated in the bus interface unit of the image memory controller 68. The output of the cycle counter 432 comprises a 4-bit address bus connected to a timing RAM 434. The output of the D-type latch 430 is connected to a multiplexer 436. The 6-bit REGAD bus is also connected to the multiplexer 436 for providing two most significant bits to the address input of the timing RAM 434 for multiplexing read and write signals to such RAM. The timing RAM 434 is connected to the internal data bus 70 of the image memory controller 68 for providing a data input to the timing RAM 434. The output of timing RAM 434 comprises sixteen bits of data applied to the D input of register 438. As noted in FIG. 14, the register 438 produces sixteen different timing signals, ten of which are directed to the image memory 82. Produced also is a cycle complete signal (CYCCMP) which is connected to the cycle control circuit 428 for indicating the completion of a cycle. An error detection and correction (EDC) control signal is also generated for use in the EDC unit 105. A request acknowledge is generated by the register 438 to provide a handshake to the various sources for memory request cycles.

The request arbiter and image memory timing controller 238 includes an acknowledge circuit comprising a decoder 440, a NOR gate 442 and a multiple register latch 444. The decoder 440 has an input connected to the output of the D-type latch 430, and another input connected to one output of the register 438. Two outputs of the decoder 440 are provided to the corresponding two inputs of the multiple register latch 444, while two other outputs of the decoder 440 are coupled through the NOR gate 442 to the third input of the latch 444. The output of the latches 444 provides the screen refresh acknowledge, the video DRAM refresh acknowledge and the IAP address request acknowledge signals.

As noted above, the screen refresh request is assigned the highest priority as such cycles must be completed on a specific clock edge of the video DRAM shift clock (SCLK). Provided in accordance with the invention are means for locking out other requests for a prescribed interval prior to the beginning of a screen refresh cycle. To that end, and as briefly described above, screen refresh requests must be asserted by the screen refresh controller 230 at least two memory cycle times prior to the clock edge on which a desired screen refresh cycle must be completed.

The request arbiter and image memory timing controller 238 is provided with the lockout delay 420 and the request delay 422, each of which is programmable, in order to properly align the screen refresh request cycles. The lockout delay 420 is effective to prevent the immediate operation of video DRAM refresh requests and IAP read and write requests once a screen refresh request has been initiated. Particularly, the lockout delay circuit 420 is programmed so that after a predetermined number of processor clocks (PCLK) have transpired, the screen refresh request is effective to lockout the other noted requests. In this manner, memory cycles which are currently in progress will be completed without interruption. The request delay circuit 422, being triggered by the output of the lockout delay 420, counts down an additional delay time before passing the screen refresh request to the priority encoder 426. The output of the priority encoder 426 comprises an encoded 2-bit cycle type and a cycle request. The cycle type indicates the highest active priority, while the cycle request signifies a current request for access to the image memory 82. In the absence of a screen refresh request, the video DRAM refresh and IAP address requests are prioritized by the priority encoder 426. Such priority encoders themselves are well-known in the art and need not be further detailed.

The cycle control circuit 428 controls execution of the image memory cycles. The cycle control circuit 428 includes a cycle request input and a cycle complete input, both of which when active, clear the cycle counter 432 and initiate the next memory cycle.

The cycle counter 432 is a 4-bit counter which functions to provide sequencing of the states of each memory cycle. The cycle counter 432 is cleared by the output of the cycle control circuit 428 indicating the start of a new memory cycle. The four output bits of the cycle counter 432 are utilized to address the timing control memory which, in turn, provides output signals representative of the preprogrammed states within such memory. When the image algorithm processor 66 address request requires more than two SYSCLKs to complete a memory cycle, the clock signal SYSCLK must be stopped in order to maintain the pipelined information in the image computer system 22. In this event, the start clock (STARTCLK) output of the register 438 is made active to restart the SYSCLK in the SYSCLK generator. Since the last few clocks of a memory cycle may not require address and data inputs, the SYSCLK signal may be started a few clock cycles prior to the end of a memory cycle. A separate programmable output from the register 438 may be provided to allow adjustment of the timing of this signal for maximum image memory bandwidth.

The register 438 comprises a bank of random access memories which may be written via the internal data bus 70 during initialization of hardware parameters. The length of each cycle type and signal level of each output of the register 438 during each clock of the cycle is preprogrammed. This provides considerable flexibility in timing pulse generation. The signals output by the register 438 comprise conventional row address select (RAS), column address select signals (CAS), write per bit/write enable signals (WBWE), data transfer/output enable signals (DTOE), data processor output enable signals (DPOE) for enabling the data or mask outputs from the parallel image processor set 72 to the image memory 82. Further outputs of the timing unit include a shift output latch enable signal (SOLE) utilized by the image memory 82 to latch the bank select lines during a data transfer cycle, a mask/data select (MDATA) for selecting either the bit mask or data mask to be output from the parallel image processor set 72 to the image memory 82, a column select signal (COLSEL) for selecting column addresses directed to the image memory, and a restart signal (STARTCLK) as described above.

When a cycle start signal from the cycle control circuit 428 clears the cycle counter 432, the current cycle type output from the priority encoder 426 is decoded and latched. The decoded signals are output to the requesting circuit to indicate that the requested cycle is in progress.

Parallel Image Processor

The parallel image processor set 72 comprises the data processing part of the tree-structured parallel processing architecture of the invention. In the preferred form of the invention, four independent parallel image processors (PIPs) 74-80 comprise the parallel image processor set 72. A block diagram of one parallel image processor 74 is illustrated in FIG. 15. Each parallel image processor provides 64-bit access to an associated image memory plane 84. With a total of four parallel image processors 74-80 cascaded together, the image memory 82 can be accessed 256 bits at a time.

While FIG. 15 illustrates one of the parallel image processors 74, the others are comparably constructed and operate in a similar manner. The parallel image processor (PIP) 74 includes a PIP controller 450 connected between a respective one of the writable control stores 100 and the C-bus of the parallel image processor 74. The PIP controller 450 is also connected to a microcontrol bus 451 which carries control signals to all the units which are under microcontrol, such as the register file 452, the I/O controller 454, the alignment-/replicator 456, etc. Provided as an I/O to the I/O controller is the 32-bit internal data bus 70. A four-port register file 452 has ports A, B, C and D connected to a respective A-bus, B-bus, C-bus and D-bus. An I/O controller 454 is connected between the image memory plane 84 and the C and D-buses, as well as to sixteen conductors 455 for carrying bit and byte signals from the mask/flag processor 462 to the I/O controller 454. An alignment/replicator unit 456, a convolver 458 and an arithmetic logic unit 460 are connected between the A-bus, B-bus and C-bus, as well as to the internal mask/-flag bus 463. A mask/flag processor 462 is also provided in the parallel image processor 74 and is coupled between the C-bus and the internal mask/flag bus 463. Transceivers 459 provide bidirectional buffering between the internal mask/flag bus 463 and the external mask/flag bus 85. A mask/flag processor 462 is associated with each parallel image processor. Lastly, an internal data bus interface unit (IDBIU) 596 (not shown) is connected between the internal data bus 70 and the C-bus of the parallel image processor 74. In practice, the bus interface unit 596 is resident within the PIP controller 450.

Figure 16:
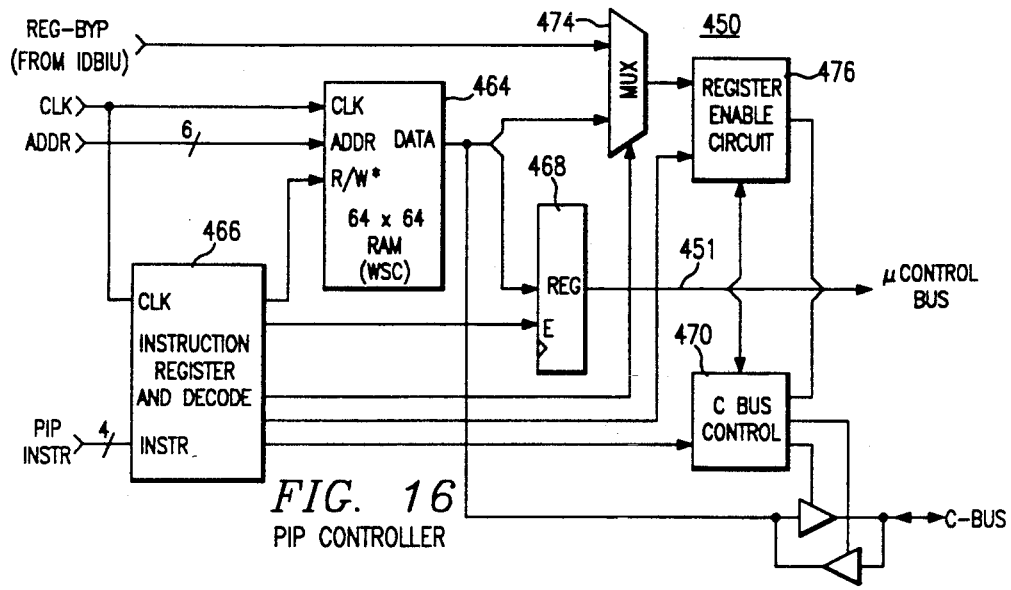
FIG. 16 is an electrical schematic diagram of the PIP controller of the parallel image processor.

FIG. 16 illustrates the PIP controller 450 for controlling the parallel image processor 74. The PIP controller 450 includes a 64×64 single port static random access memory 464 defining a writable control store in which microinstructions are stored. An instruction decoder 466 is provided for decoding microinstructions from the PIP writable control store 100 (FIG. 3). A 64-bit register 468 receives data from a writable control store 464 which functions as a microinstruction pipeline register. By indexing a 10-bit PIP global instruction (4-bit instruction and companion 6-bit writable control store address) into a 64-bit wide output microinstruction from the writable control store 464, a small pin requirement is achieved without sacrificing the performance and flexibility of a wide control word. The reduction of pin count makes the circuit more readily implementable into a single integrated circuit, as well as reduce cost and size of the chip. Because of the pipelined nature of the PIP controller 450, no time or cycle penalty is encountered in the double instruction architecture.

The output of the register 466 is connected in parallel to a register enable circuit 476, to a C-bus control circuit 470 and the 64-bit microcontrol bus 451. The microcontrol bus 451 extends throughout the circuits of the parallel image processor 74 for controlling such circuits via the microinstructions. A multiplexer 474 controlled by the instruction register and decode circuit 466 has one input from the PIP writable control store 100 and another input from the associated internal data bus interface unit 596. The output of the multiplexer 474 is connected to a register enable circuit 476. The C-bus control circuit 470 determines whether data is to be received or transmitted via the bidirectional 64-bit C-bus.

The writable control store 464 is provided with a 6-bit address for addressing 64-bit instructions residing therein. Reading or writing of the writable control store 464 is controlled by a decoded output of the instruction register and decode circuit 466. A 4-bit PIPINST word functions to select one of sixteen PIP instructions. A 28-bit register bypass (REG-BYP) signal permits overriding of the 28-bit register file control word, making possible more complex parallel image processor programs than could otherwise be provided by the 64-word writable control store 464. The (REG-BYP) signals comprise the lower 32 bits of the internal data bus interface unit 596 register. The microcontrol output bus 451 comprises a 64-bit, or wider, microcontrol word which is read from the writable control store 464 and distributed via the microcontrol bus 451 to the other processing units of the parallel image processor 74. While not shown, a 5-bit output enable bus comprises a line directed to align/replicator unit 456, a line to the convolver 458, a line to the ALU 460, a line to the writable control store 464, and a line to the IDBIU 596. The output enable lines originate from a decoder (not shown), thereby eliminating any possible contention with the C-bus of the parallel image processor 74.

The global operation of the parallel image processor 74 is accomplished by utilizing two levels of instructions; namely, a microinstruction in the form of a microcontrol word resident in the writable control store 464, and a parallel image processor global instruction, of which there are sixteen in the preferred embodiment of the invention. The parallel image processor instruction comprises two fields, a 6-bit address of the writable control store 464, and a 4-bit global instruction. The global instruction interprets the manner in which the addresses are utilized, e.g., execute a microinstruction at a defined address, load the address from the internal data bus interface unit 596, etc. This is accomplished by the instruction decode logic and instruction pipeline registers comprising the instruction register and decode circuit 466. This circuit 466 captures the parallel image processor instruction and decodes the same into appropriate control signals for the writable control store RAM 464 and other circuits of the parallel image processor 74. In executing a microinstruction, most of the control words read from the writable control store 464 are captured in a register, that is, all fields except the 24-bit register file control and a 4-bit shift control for the alignment unit 456. These signals are not captured as they are registered internal to the respective destination unit. It is important to note that the register file signals are multiplexed with the register-bypass signals. This facilitates the use as an override field for register addresses in the microinstruction, making it possible to fit microprograms, as noted above, in the writable control store 464 which might not otherwise be possible.

Table VI defines the meaning of the lower 32 bits of the IDBIU 596 during an "execute indirect" instruction. The "execute indirect" instruction conditionally overrides the register file addresses and enables on a port-by-port basis, as controlled by the most significant bit of each byte in the lower 32 bits of the IDBIU 596. If this bit is "1", then the enable and address are taken from the IDBIU 596 rather than from the control word. If the most significant bit of the byte is "0", then the microcontrol word values are used.

The register enable circuit 476 functions to disable all parallel image processor store elements during a "noop" and writable control store load/unload commands so that the parallel image processor 74 remains in quiescent state. Likewise, the C-bus control circuit 470 allows for selection of the appropriate unit during a particular global instruction, e.g., decoding the unit select field in the control word during microinstruction execution, or selecting the internal data bus interface unit 596 during writable control store load/unload commands. The writable control store 464 is loaded via the C-bus from the internal data bus interface unit 596. A control word can be written back to the C-bus as well. This facilitates testability and diagnostics of the circuits of the parallel image processor 74. To load the writable control store 464 from image memory 82, data must be first written through the register file to the internal data bus interface unit 596, whereupon such data is read back on the C-bus into the writable control store 464.

Figure 17:
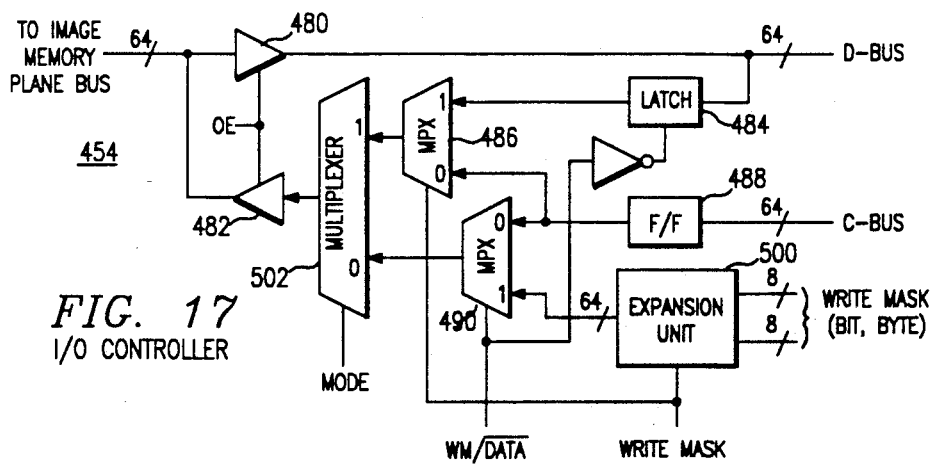
FIG. 17 is an electrical schematic diagram of the I/O controller of the parallel image processor.

FIG. 17 illustrates the details of the input/output controller 454, one of which is utilized in each of the parallel image processors 74-80. The I/O controller 454 includes an input buffer 480 for coupling 64-bit image data from the image memory 82 to the 64-bit D-bus of the parallel image processor 74. An output buffer 482 is effective to couple pixel data from the parallel image processor 74, back to the associated plane 84 of the image memory 82. Thus, communication of pixel data between the image memory 82 and the parallel image processor 74 is carried on through the I/O controller 454.

The I/O controller 454 further includes a 64-bit transparent latch 484 for coupling data from the D-bus to an input of a multiplexer 486. 64-bit C-bus information is coupled through another register 488 to the other input of the multiplexer 486, as well as to an input of a second multiplexer 490. An expansion unit 500 receives 8-bits of write mask bit information and 8-bits of write mask byte information from the mask/flag processor 462, and expands the same into a 64-bit mask word coupled to the other input of the multiplexer 490. The output of multiplexers 486 and 490 are coupled to respective inputs of a third multiplexer 502. The third multiplexer 502 is controlled by a mode select signal which, when at a low logic state, is effective to multiplex either C-bus pixel data or write-mask data through the output buffer 482 onto the image memory plane bus. This is the common mode of operation in which the multiplexer 502 operates. When the mode signal is driven to a logic high state, the multiplexer 502 is effective to couple C-bus information or latched D-bus data onto the image memory plane bus. The capability of driving the image memory plane bus with C-bus data or D-bus data allows read-modify-write operations. As noted, the D-bus latch 484 is controlled by the inverse of the signal which also controls the multiplexer 490. The write mask/$\overline{\text{data}}$ (WM/$\overline{\text{data}}$) signal, when at a logic high state, and when the mode signal equals "0", the image memory plane 84 is driven with write mask data. On the other hand, when the WM/$\overline{\text{data}}$ signal is driven to a logic low state, the image memory plane 84 is driven with pixel data present on the C-bus. With this arrangement, new pixel data, or old pixel data can be written into the image memory plane 84, based upon the write mask signal.

The write mask expansion unit 500 comprises a number of logic gates for expanding the 8-bit byte signal and the 8-bit bit signal into a 64-bit write mask word. Many arrangements of the circuits of the expansion unit may be devised by those skilled in the art; including eight circuits, each comprising eight two-input AND gates. One input of each AND gate would be connected in common to byte-0 signal, while the other input of each AND gate is connected respectively to bit-0 through bit-7. The next group of eight NAND gates would be similarly connected with regard to the bit inputs, but would be connected to the byte-1 signal. A similar group of AND gates would be associated with each of the byte-2 through byte-7 mask signals.

The I/O controller 454 is also utilized in initially loading the image memory plane 84 with pixel data from the internal data bus 70. As noted above, each parallel image processor includes an internal data bus interface unit 596 in the respective PIP controller 450, connected between the 32-bit internal data bus 70 and the C-bus which is, in turn, connected to the I/O controller 454. The internal data bus interface unit 596 includes a 64-bit register for receiving a sequence of two 32-bit image data words from the internal data bus 70, and for coupling the same to the C-bus. The mode signal and the WM/$\overline{\text{data}}$ signal can thus be driven by logic low states for coupling the pixel data from the C-bus for loading the image memory plane 84.

Figure 18:
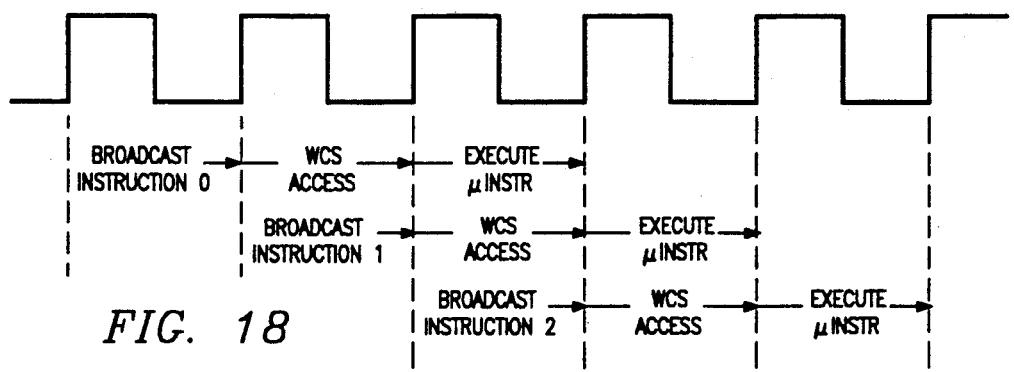
FIG. 18 is a waveform illustrating the cyclic operation of the image computer carrying out pipelined instruction operations.

FIG. 18 illustrates a 3-stage instruction pipeline for permitting concurrent or overlapping operation of three exemplary instruction words, each such word requiring three processor cycles. In the first cycle, instruction 0 is broadcast by the image algorithm processor 66 to the IAP writable control store 94 and the associated PIP writable control store 100. In the next cycle the writable control stores are accessed by instruction 0, while in the third cycle execution of the microinstruction 0 occurs. However, during the writable control store access of the first instruction 0, the second instruction 1 is broadcast. During the third clock cycle, the first instruction word 0 is executed, the second instruction word 1 is utilized for accessing the writable control stores and the third instruction 2 is broadcast.

As noted above, the instructions comprise a 4-bit control field and a 6-bit address field. The bits of the control field thus define sixteen possible modes of parallel image processor operation. The control field (0000) defines a no-operation of the current cycle during which no registers of the parallel image processor 84 are updated and no outputs thereof are provided. A control field (0001) defines a writable control store write mode of operation in which the 64-bit contents of the internal data bus port into the writable control store address is presented from the address field. This operation is utilized primarily during the power-up sequence of the parallel image processor 74. The control word (0010) defines a writable control store read operation in which the writable control store 464 is read and the output thereof latched into the internal data bus port. This instruction is used primarily for power-up test and context switching. The instruction control word (0011) defines an operation in which the data carried by the C-bus is loaded into the internal data bus port. Subsequent operations can be utilized to load the result value into the writable control store 464, send a portion of the result over the internal data bus 70, or use the lower 32 bits of the result to conditionally replace the register file addresses in the microinstruction during the execute relative (EXEC-REL) instruction.

The instruction control word (0100) defines an "idle" mode of operation which forces the parallel image processor 74 into an idle state. In such a state, the parallel image processor 74 ignores subsequent instructions until a "run" command is issued. The idle command is useful in writing generic subroutines that can be used on any plane, but where the actual plane that the routine is used will be unknown. Before the subroutine is called, the unused parallel image processors can be placed in the idle mode, and the on-line parallel image processors will then be utilized. At the end of the routine, the run command will be issued in bringing all the parallel image processors back on-line. The instruction control word (0101) defines a run mode of operation, as described above.

The (0110) instruction word defines an execute instruction which directs the parallel image processor 74 to execute a microinstruction at a given address. The (0111) instruction word defines the execute-relative operation for executing the microinstruction at the given address. However, instead of utilizing the register fields supplied in the microcontrol word, the value stored from a previous instruction in the internal data bus interface unit 596 is used instead. This feature of the invention allows either the parallel image processor 74 or the image algorithm processor 66 to supply an address to the register field based upon the stored values. This can be defined as a relative or indirect address. Increments or decrements and even convolutions can be conducted based upon such values. Additionally, the MSBs of the lower four bytes of the 64-bit internal data bus interface unit 596 are utilized in deciding whether or not to replace the field with the internal data bus stored values.

The instruction control word (1000) defines a mode of operation which causes the lower 32 bits of the IDBIU register to be enabled as output to the off-chip 32-bit system internal data bus 70. Such register will be described in more detail below in connection with the internal data bus interface unit 596. No microinstruction is allowed to be executed during such a mode of operation. The control word (1001) is similar to the (1000) word, except the high order thirty-two bits of the IDBIU register are enabled as output.

The instruction control word (1010) defines the mode of operation in which the contents of the internal data bus 70 are latched, and placed into the high order 32-bits of the IDBIU register. No instructions are allowed to be executed during such cycle. The instruction control word (1011) defines a mode whereby contents of the internal data bus are placed in the low order 32 bits of the IDBIU register. Like instruction word (1010), the instruction word (1011) does not permit instructions to be executed during such cycle. The instruction control word (1100) executes the microinstruction at the WES address specified and enables the lower 32 bits of the IDBIU register onto the internal data bus 70. The instruction control word (1101) causes the internal data bus port to enable the drivers such that the upper thirty-two bits of the IDBIU register are enabled and driven on the internal data bus 70. This address field contains the value which will be the address of the instruction to be executed. The instruction control word (1110) defines a mode of operation such that the contents of the internal data bus 70 are latched and placed into the lower-32 bits of the IDBIU register. This address field contains a value which will be the address of the instruction to be executed. Lastly, the instruction control word (1111) defines an operation where the contents of the internal data bus are latched and placed into the upper 32 bits of the IDBIU register. Again, the address field contains a value which will be the address of the instruction to be executed.

The pixel alignment and replicator unit 456 is connected to the A, B and C-buses of the parallel image processor 74 to rearrange pixel bits to provide specified functions. In particular, the pixel replicator 456 can duplicate the bits of a pixel to generate new pixels utilized in, for example, image zooming operations. The pixel replicator of the image computer 22 is illustrated in FIGS. 19 and 20. With reference to FIG. 19, the pixel replicator 456 receives four 8-bit pixels from the upper 32 bits of the pixel alignment unit 522 and provides eight 8-bit pixels to the 64-bit C-bus.

Eight substantially identical replicate circuits, such as identified by numeral 504, form the replicator 456, each circuit having a 4-bit input connected to different conductors of the upper 32 bits of the pixel alignment unit 522. The input conductor connection arrangement to each of the replicate circuits 504 is illustrated in FIG. 19. The eight replicate circuits 504 each operate on one bit of a pixel. This can be seen by understanding that the inputs to each replicate circuit 504 are selected from the upper 32 bits of the alignment unit 522 on a one-out-of-eight basis. In addition, each replicate circuit 504 is controlled by an 11-bit microcontrol word for controlling which bits of the pixel are to be duplicated. The 64-bit output of the pixel replicator unit 456 is multiplexed, via a multiplexer 505, with the 64-bit output of the pixel alignment unit 522 to produce a result which is buffered onto the C-bus. The sixty-four buffers 507 are of the type which can present a high impedance to the C-bus. The output enable (OE) signal does not comprise part of the microcontrol word, as such signal is controlled by the PIP controller 450. A "2-bit mode" field forming a part of a microinstruction is decoded by the PIP controller 450 to obtain control over the output enable signal of the multiplexer 505. As can be appreciated with the arrangement, the pixels are first aligned in the pixel alignment unit 522, and then input to the replicator unit 456 for replication. This series arrangement allows one to reduce the total number of cycles during a replicated zoom process. Also, loading of the C-bus is reduced and thus also the wiring complexity.

Each replicate module 504 includes eight outputs, forming a composite 64-bit output for input to the multiplexer 505. In practice, the pixel replicator 456 operates in conjunction with the alignment unit which is described below.

FIG. 20 schematically depicts one of the replicate circuits 504, the other seven of the unit being identically constructed. Each replicate circuit 504 includes three 2-input bit multiplexers 508-512, a pair of triple-input multiplexers 514 and 516 and a pair of quad-input multiplexers 518 and 520. The 4-bits of a pixel are connected to the various multiplexers in the manner indicated by FIG. 20. The 11-bit replicator control utilizes one bit for controlling the 2-input multiplexers 508-512, and two bits for controlling the 3-input and 4-input multiplexers 514-520.

In order to replicate pixels by a factor of two, with an A, B, C and D pixel bit input, the output would be AABBCCDD. For a replication factor of three, the microcontrol word would drive the replicate control to produce an output of AAABBBCC. Of course, to complete the tripling of the pixel bits, other replicator circuits of the pixel replicator 456 would complete the bit tripling operation. Those skilled in the art will realize that in order to provide complete replication of multiple pixels, a shift left or shift right operation is required.

Pixel shifting functions are carried out by the pixel alignment unit 522 shown in FIG. 21. The pixel alignment unit 522, often referred to as a "funnel shifter", provides a general purpose pixel shifter which functions to provide parallelism of eight 8-bit pixels of image memory data. Essentially, the pixel alignment unit 522 places two 8-bit pixels side-by-side, thereby forming a 16-bit pixel word. The alignment unit 522 then selects any eight consecutive bits from the sixteen bits to form a new 8-bit pixel.

The processing of pixel data is facilitated by the use of the pixel alignment unit 522, especially when moving an image from one image memory location to another. Suppose that an image is to be moved from one location to another in image memory 82. In a source location, pixel A (an arbitrary pixel in the image to be moved) is in the first pixel of a memory word, but in the destination location, it is to be in the third pixel of a memory word. Clearly, a simple memory move is inadequate; data must be moved within word boundaries, which is made possible by the pixel alignment unit 522. The pixel alignment unit 522 is further utilized in image convolution functions where data must be aligned with a kernel. As a convolution kernel moves across the image, the location that kernel coefficients have within a given word remain the same, and therefore require alignment. Generally, the movement of image data within memory boundaries requires support from the pixel alignment unit 522.

As illustrated in FIG. 21, the pixel alignment unit comprises eight substantially identical funnel shifters, one designated as reference character 524. Each funnel shifter 524 includes a pair of input ports, one connected to the A-bus and the other connected to the B-bus. Each funnel shifter circuit 524 is connected to a funnel shift control 526 which responds to inputs, including a four-bit shift control (SC), a clock signal (CLK), and source and destination register enable signals (SRCEN, DSTEN) and mask/flag (MF) signals. The shift control functions to determine how many pixels to shift. Two 64-bit data buses from the register file 452 are brought into the alignment unit 522, where any consecutive eight bytes are selected from the juxtaposed A and B buses. The four-bit shift value is taken from one of two registers, representing possibly a source value and a destination value. These registers are loaded from either a direct value in the microcode, or as the lower 4-bits of the mask/flag bus 85. If the mask/flag bus value is to be used, it must be on the mask/flag bus one cycle prior to the alignment instruction. If the direct value is to be used, the value occurs in the same instruction, since the PIP controller 450 manages the pipeline (register enables, mux selects, direct shift value etc.) automatically. The output of each funnel shifter 524 comprises 8 bits, the total forming a bus connected to the multiplexer 505.

Each funnel shift circuit 524 is associated with each bit of an 8-bit pixel word. Two pixel words from the register file 452 are presented to each funnel shifter circuit 524 on the respective first and second ports thereof. The bits of each pixel word are presented to the funnel shifter inputs starting with bit zero which is directed to the first funnel shifter circuit. Every eighth bit starting with bit one is directed to the second funnel shifter circuit, and so on. In effect, each bit of a pixel word is thus shifted by a uniform amount.

In operation, eight bytes of pixel data from the A-bus are juxtaposed with eight bytes of pixel data from the B-bus. The bytes from the A-bus form bytes 0 . . . 7, and the bytes from the B-bus form bytes 8 . . . 15. Eight consecutive bytes are selected and placed on the output C-bus, where the first byte is determined by the four bit value of the shift control signal. If the shift control signal equals binary "0", then data on the B-bus is passed directly to the C-bus output. FIG. 22A shows the shifting pattern as a function of the shift control inputs.

Figures 22B, 22C:
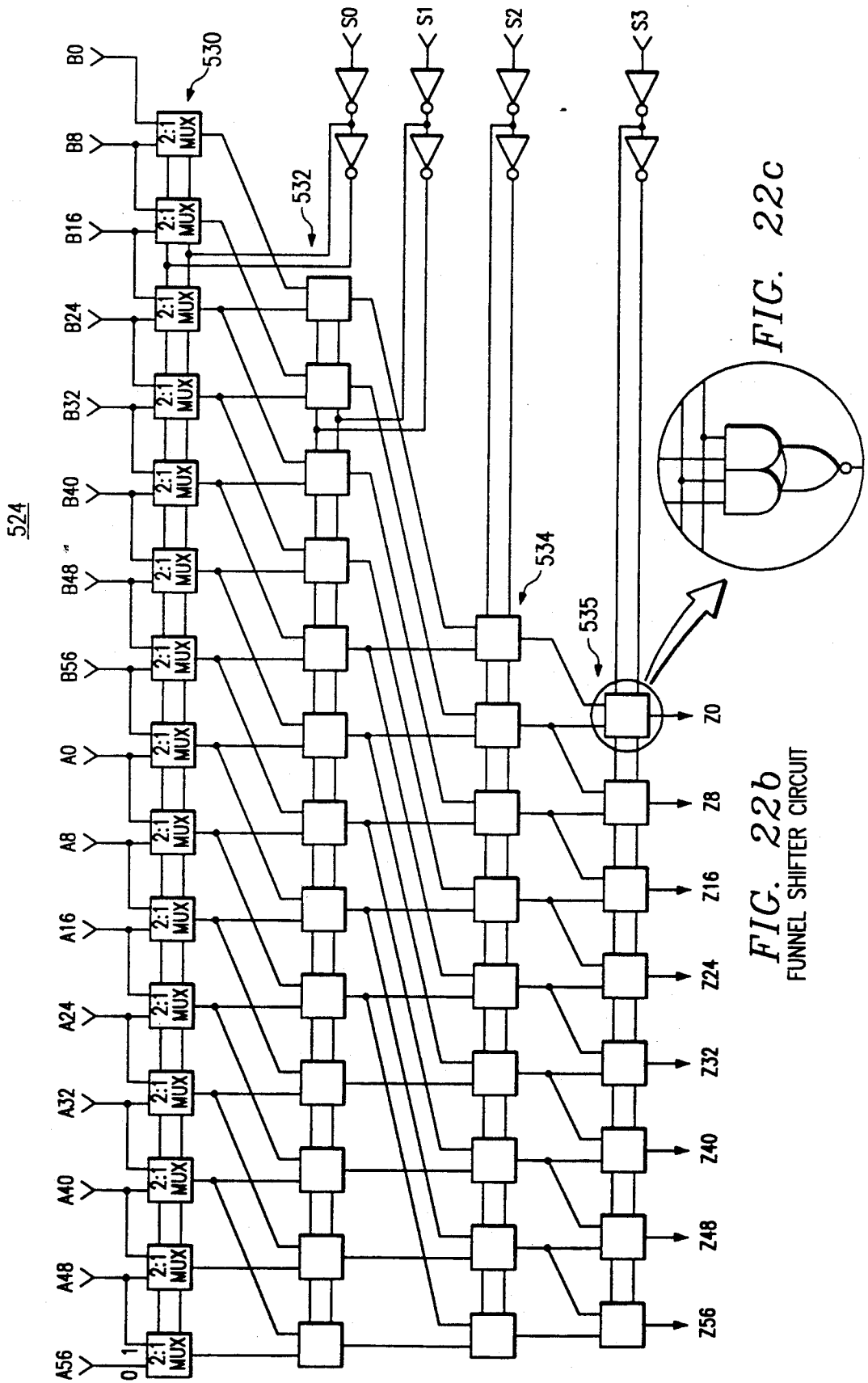
FIG. 22b illustrates in detail one pixel alignment circuit of the pixel alignment unit of FIGURE 21.

FIG. 22B depicts the circuit details of one of the funnel shifter circuits 524 of FIG. 21. The funnel shifter circuit 524 is constructed as a modified logarithmic shifter, base two, having four levels 530-535 of 2:1 multiplexers. Consequently, there are a possible $2^3 = 8$ shifts, plus one associated with the fourth level 535. Each level, except the fourth level 535, of the funnel shifter circuit 524 corresponds to a numerical weight defining the amount by which each pixel should be shifted. The fourth level 535 shifts by an amount $2° = 1$, which is the same amount shifted by level one 530. Four input signals S0, S1, S2 and S3 control the respective levels 530-535 of the 2:1 multiplexers. The outputs of the fourth multiplexer level 535, together with the outputs of the other similar funnel shifter circuits, provide a 64-bit result to the multiplexer 505. In the preferred embodiment, each 2:1 multiplexer is implemented as a CMOS complex gate integrating a pair of two-input AND gates feeding a two-input NOR gate, all integrated into a single structure.

Another pixel data processing circuit of the parallel image processor 74 comprises a convolver 458. The details of the convolver 458 of the invention are shown in FIGS. 23-27. The convolver unit 458 comprises the computational element of the parallel image processor utilized for convolving, blending and interpolation functions. The convolver unit 458 has dual inputs connected respectively to the 64-bit A-bus and the 64-bit B-bus. Hence, eight pixels or one data word can be processed with eight other pixels or a data word. The output of the convolver unit 458 comprises sixty-four outputs connected to the 64-bit C-bus. Various other control inputs are provided for controlling the functional circuits of the convolver unit 458.

Figure 23:
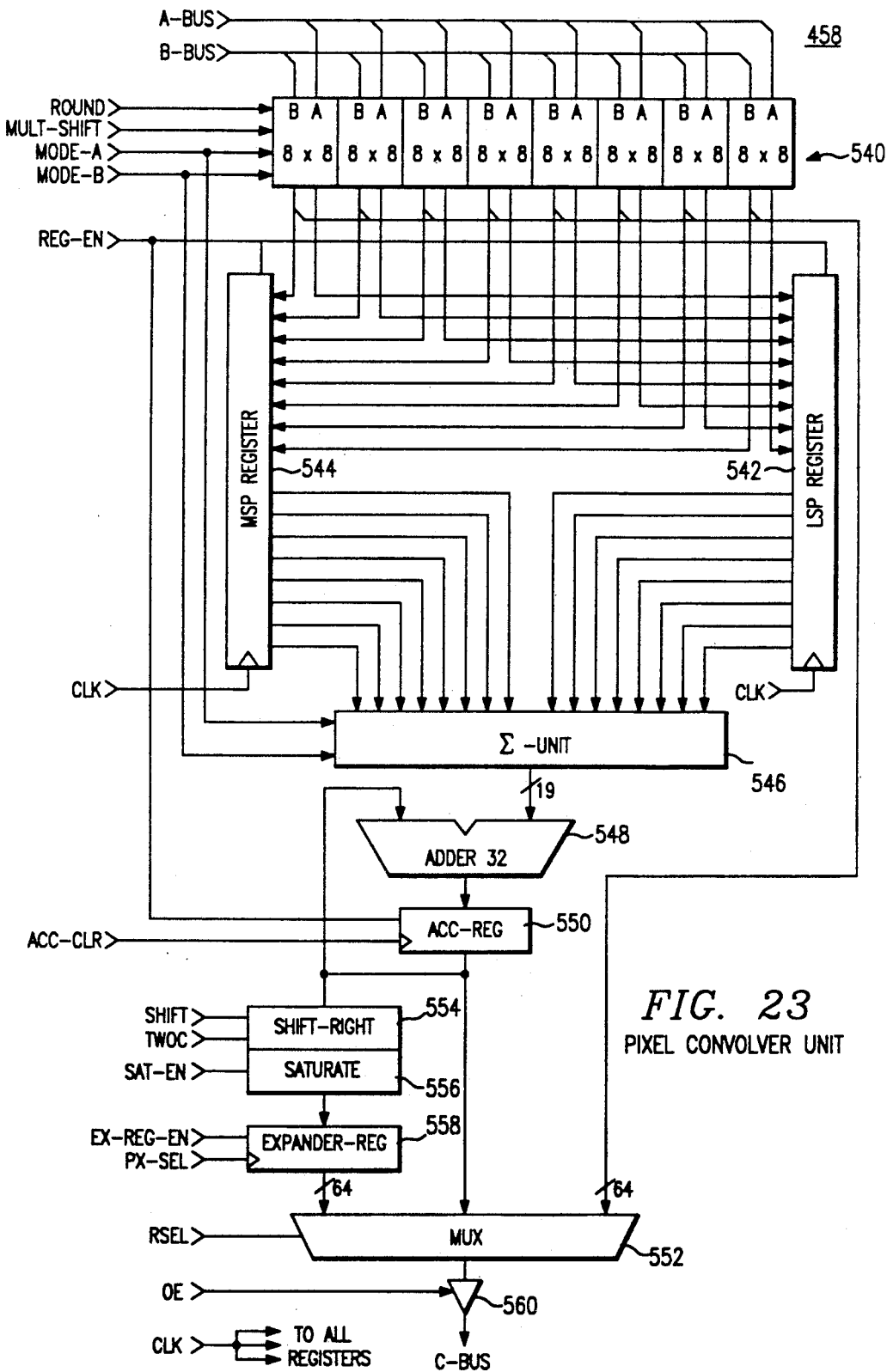
FIG. 23 illustrates in block form the pixel convolver unit of the parallel image processor.

As illustrated in FIG. 23, the convolver unit 458 includes eight $8 \times 8$ multipliers 540, each connected to A-bus and B-bus. Each multiplier 540 has a pair of 8-bit outputs, one connected to a least significant product register 542, the other connected to a most significant product register 544. The outputs of both registers 542 and 544 comprise eight 16-bit products connected as inputs to a summing unit 546. The output of the summing unit 546 is a 19-bit bus connected to one input of a 32-bit adder 548. The output of the adder 548 is connected to an accumulator register 550, and the output of the accumulator register 550 is connected to a 3-input multiplexer 552, where the 32-bit value is padded with "zeros" to the left to form a 64-bit word. The output of the multiplexer 552 provides 64-bits of buffered pixel data to the C-bus. The output of the accumulator register 550 is also connected to a shift-divide circuit 554 for providing division by a power of two (scaling) functions. The output of the shifter-divider circuit 554 is coupled to a saturate circuit 556 which provides one pixel of data (8 bits) to an expander register 558. The expander register 558 accumulates eight pixels of data (64 bits) before providing a 64-output to one port of the multiplexer 552. The other input of the multiplexer 552 is connected back to the output of the eight $8 \times 8$ multipliers 540.

The principal function performed by the convolver unit 458 is the multiplication of two vectors on a term-by-term basis and the summation of the resulting products, all in a two-stage pipeline. Hence, the high-speed convolver unit 458 of the invention provides an output of multiple pixel processing in fewer cycles than convolvers heretofore known. In a single cycle, eight 8-bit vectors, numerical constants or pixel data, can be input into the multiplier section 540 via the A-bus, while eight 8-bit pixel data can be input into the multiplier section 540 via the B-bus, and the combination multiplied. Such processing constitutes a first mode of operation in which eight pixels and eight associated coefficients are multiplied, and the resulting 16-bit products summed with an accumulated value. In a second mode of operation, the rounded most significant product 8 bits of the multipliers 540 are routed directly to the C-bus via the three-input multiplexer 552.

With regard to the first mode, or the convolving mode, the summation of the products is stored in the 32-bit accumulator 550 to be added, if desired, to other vector-product sums. In this way, the convolution computation comprises the sum of one or more vector-product sums in which each row of a kernel and data are the defined vectors. This is implemented by the convolver architecture through successive row calculations. In this manner, the dimension of each vector is eight, thus comprising an eight-by-one convolver. In addition, the precision of each term is eight bits which comprises the color information resolution of the image computer 22.

When the processing of the entire kernel is complete, the sum stored in the accumulator 550 is transferred to the register and thus to the shifter-divider 554. The shifter-divider 554 performs a division function by a term which is precalulated to be equal to a power of two. Normally, the results of the accumulator 550 are divided by the sum of the kernel coefficients to normalize the result. As will be discussed in more detail below, the saturate circuit 556 allows eight bits of the thirty-two to be passed to the expander register 558. In addition, the saturate circuit 556 takes into account the significant bits excluded by the eight of thirty-two selection. Seven additional similar operations are repeated to store eight 8-bit pixels in the expander register 558. When the expander 558 is fully packed with pixels, the 64-bit output thereof is placed on the C-bus via the appropriate control of the 3-port multiplexer 552.

The pixel convolver unit 458 of the invention provides two levels of parallelism to provide high-speed and high pixel data computational rates. A pipelined function results by utilizing the eight parallel multipliers 540 processing eight products per cycle concurrent with the summing of previously calculated products. In addition, the convolver unit 458 can support kernels of many different sizes, such as 3×3 up to 256×256. This is made possible by the 32-bit accumulator 548. The by-pass provision from the multiplier section 540 to the 3-port multiplexer 552 allows the product results to be written directly back to the C-bus, thus by-passing the summing 546 and accumulator 548 circuits. This provision is advantageous in blending operations. An additional feature of the convolver unit 458 is the pixel expansion, wherein eight result pixels are calculated and stored within the convolver unit 458 before the formatted 64-bit memory word is written back to the register file 452 via the C-bus, or output to the image memory 82.

With regard to the control signals for controlling the convolver unit 458, mode A and mode B control bits are supplied to both the multiplier section 540 and the summation unit 546. One mode of operation controls whether the multipliers 540 regard incoming data as 2's complement, and in another mode the incoming data is regarded as unsigned. Mixed mode arithmetic is thus allowed and results in 2's complement output data. A single bit round signal is applied to the multipliers 540 for rounding the 16-bit words in the most significant product outputs of the multipliers 540. A single bit format signal controls which of eight bits are output from the most significant product register 544. A binary "1" is effective to produce multiplier result bits of 15 . . . 8, while a binary "0" produces bits 14 . . . 7. Rounding operates in conjunction with the format control, such that a correctly rounded result is always produced. The most significant product bits are available directly as an output from the convolver unit 458 via the 3-input multiplexer 552.

A clock signal which is also common to the register file 452 synchronizes all circuits and registers of the convolver unit 458. A register enable signal enables the least significant product register 542, the most significant product register 544 and the accumulator registers 550. An accumulator clear (ACC-CLR) signal functions to synchronously clear the accumulator registers 550. A 5-bit shift signal provides thirty-two possible right shift positions to be performed by the shifter-divider 554. A TWOC signal is effective to cause the shifter-divider 554 to extend the sign bit if true, or to shift in zeros if false. This function is useful if the shifted number is presented in the 2's complement form to the convolver 458. A saturation enable signal controls the saturation circuit 556 such that if the output of such register would be negative, the output thereof is driven to all zeros, i.e., an intensity of zero and thus a black pixel location on the monitor 28. On the other hand, if the output of the shifter-divider would be a number greater than that which can be represented by eight bits, the output of the saturation circuit 556 is driven to a hexadecimal "FF", i.e., a saturated or white pixel location on the monitor 28. A register enable signal is provided to enable the expander register 558, while a 3-bit pixel select signal determines which pixel of the expander register 558 is to be written therein from the saturation circuit 556. A 2-bit RSEL controls the multiplexer 552 for allowing data to be entered therein from the accumulator 550 or expander 558, or from the multiplier section 540. The selected input is thus passed to the C-bus via the buffers 560. Tristate control of the buffers 560 is accomplished by an output enable (OE) signal.

In more detail, and with regard again to FIG. 23, there are illustrated two 8-bit operands, a multiplier A and a multiplicand B. Associated with each operand is the mode control signal, mode A and mode B. As noted above, these control signals determine whether the corresponding input operand is regarded as a 2's complement or unsigned. Any combination of the mode signals is permissible. In other words, both operands can be unsigned, both can be 2's complement, or one can be unsigned and the other can be 2's complement, i.e., a mixed mode which yields a 2's complement result. Although pixel values are contemplated to be unsigned integers ranging from 0–255 (decimal), the coefficient numbers may be positive or negative. Additional precision can be achieved with the multiplier section 540 by allowing unsigned representations for kernel coefficients if it is known that such coefficients will always be positive. This is the case in situations involving the filtering of video images by low pass filter techniques.

The rounding control of the multiplier section 540 and the multiple shift controls facilitate multiplication in 2's complement applications, as it is not necessary to utilize the top eight bits as the most significant product, i.e., bits eight-fifteen. Rather, bits seven-fourteen can be utilized, as the only time that bit fifteen is utilized is in those situations where the product $-128 \times -128 = 32K$ is calculated. Since this represents only one case out of $2^{16}$, additional precision can be had by shifting the most significant product downwardly one space. The shift signal determines which eight bits are thus used as a product. The round control signal is effective to add $\frac{1}{2}$ to the product so that when truncation occurs, the most significant product is correctly rounded to the nearest desired results.

The summing unit 546 is effective to sum the 16bit products calculated by the multipliers 540, and to add this result to the 32-bit accumulator 548. Full precision is thus maintained during the course of the calculation. The summing circuit 546 is constructed as a binary tree of Manchester Carry Chain adders. The accumulator 550 is implemented in two stages, the low 16 bits as a Manchester Carry Chain, and the upper 16 bits as a carry look-ahead adder.

Figure 24:
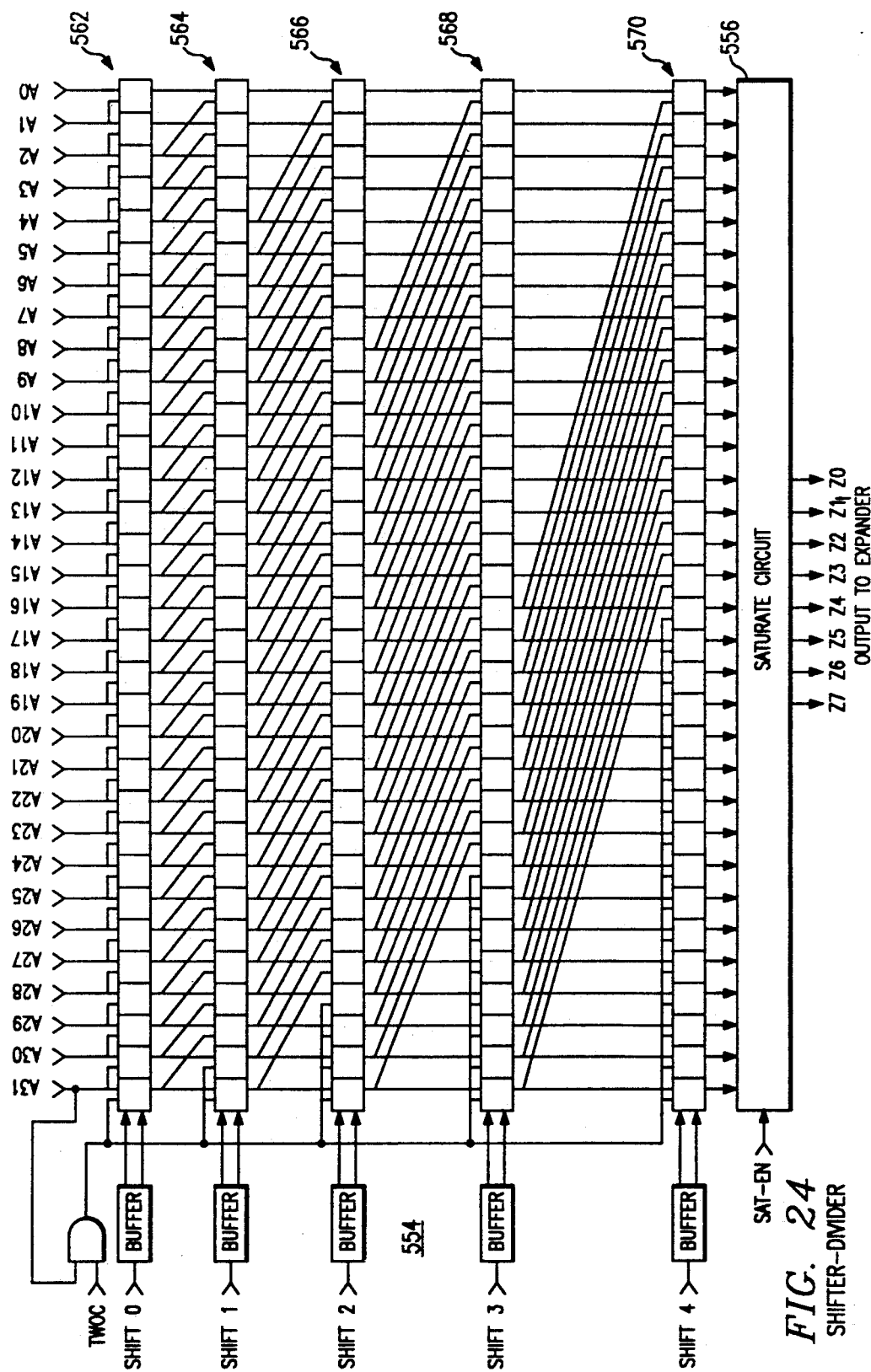
FIG. 24 illustrates a block diagram of the multiplier circuit of the parallel image processor convolver.

FIG. 24 depicts the shifter-divider 554 utilized to "divide" numbers stored in the accumulator register 550 by a power of "2". As can be seen, the shifter-divider 554 is a log(n) network comprising a 32-bit shifter requiring five logic levels. The logic blocks 562-570 comprise 2:1 multiplexers with a sign extend fill generated by the 2's complement (TWOC) signal. This provides a pixel value indicating a saturated result, the sign bit, and 23 additional significant bits of the shifted result are examined. If the sign bit is a binary "1", then the accumulated result is less than zero, and the saturated result is zero. If, on the other hand, a binary "1" occurs in any of the 23 high-order bits, and the sign bit is driven to a binary "0", then the saturation circuit 556 output is driven to a value greater than 256. In this situation, a hexadecimal FF is output to the C-bus.

Figure 25:
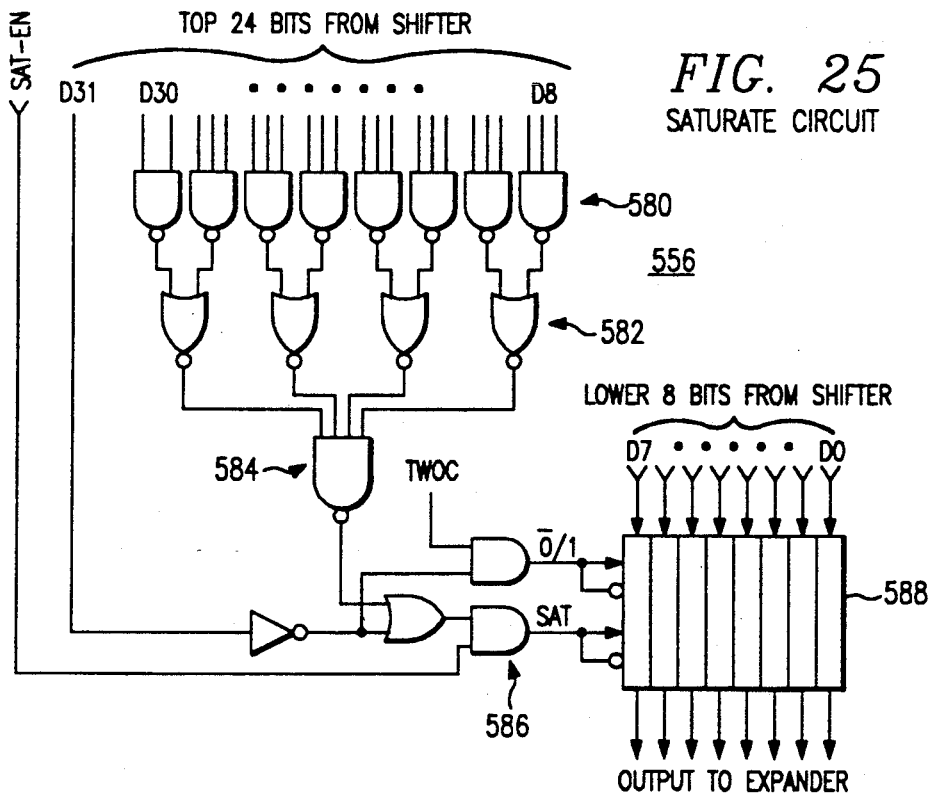
FIG. 25 illustrates in electrical schematic diagram form the saturation circuit of the pixel convolver unit.

The saturation circuit 556 in FIG. 25 is constructed of a number of logic gates to provide a Boolean OR function on the, top 24 bits of the 32-bit word provided by the shift-divider circuit 554. Hence, if any one of the top 24 bits comprises a binary "1", then the output register of the saturation circuit is driven to the hexadecimal FF value. More particularly, the saturation circuit comprises seven three-input NAND logic gates and a two-input NAND logic gate 580 for inputting thereto the top twenty-three bits from the shifter-divider 554 (D8-D30). The twenty-fourth bit (D31) is input to a logic circuit 586. The output of each NAND gate 580 is coupled to an input of four two-input NOR logic gates 582. The outputs of the NOR gates 582 are connected to the input of a four-input NAND logic gate 584. The output of the NAND gate 584 is coupled to additional logic circuits 586, which together with the SAT-EN signal provide the function described above. The outputs of the logic circuits 586 control the 8-bit register 588 to modify the lower eight bits from the shifter-divider 554 in the manner noted above.

The saturation circuit 556 is advantageously utilized when pixel data are multiplied by negative coefficients, and thus result in a pixel value of zero. Negative coefficients are often encountered in image processing functions involving LaPlacian functions.

The convolver unit 458 of the image data 74 processes pixel data according to the following expression:

$$\text{pixel-result} = \sum_{i=1}^{n} A_i * P_i \div \sum_{i=1}^{n} A_i.$$

In this expression, the term Ai comprises coefficients representing a kernel, and the term Pi represents pixel values. The accumulator 550 in the convolver unit 458 is effective to store intermediate 8-by-1 convolutions enabling the calculation of convolutions of other dimensions, such as 9-by-9 or 3-by-3, through successive cycles of the convolver 458. Interpolation involves the same calculation as that of convolution, however, the kernel coefficients are calculated differently. In addition, the term Σ Ai must be a power of two.

With regard to blending operations, such as utilized in the antialiasing of a line or curve on the video monitor 28, the convolver unit 458 is also advantageously utilized. Blending may involve forming the new image data C from a weighted sum of two other images, A and B. If the weighting factor, or blending factor, is defined as "a", the blending equation can be characterized as the following expression:

$$C = a*A + (1-a)*B$$

The expression can be further simplified as:

$$C = a*(A-B) + B.$$

In the simplified form, it is to be noted that the second equation involves only a single multiply operation which is desirable from a numerical precision standpoint since the multiply operation requires a rounding operation. Thus, two images can be blended on a pixel-by-pixel basis utilizing the second noted equation. In this calculation, the most significant eight bits of the multiplier products are routed directly to the C-bus, and thus to the register file 452. This avoids the time delays in passing such data through the summing unit 546 and the accumulator 550 which are used during convolution operations.

FIG. 26 depicts the expander register 558 of the convolver unit 458. The expander register 558 comprises a group of eight multiplexers coupled 590 to the input of an associated eight registers 592. The 8-bit output of the saturate circuit 556 is coupled to each input of the multiplexers 590, while the output of each register 592 is coupled back to the input of its associated multiplexer 590. A 3-of-8 decoder 594 controls the multiplexers 590 so that the 8-bit output of the saturate circuit 556 can be written into one of the registers 592. Particularly, the expander register 558 "packs" 8-bit pixels into a 64-bit image memory word. The pixel select input is effective to sequentially load each of the 8-bit registers 592 with an 8-bit pixel. When fully loaded with a 64-bit image memory word, the 64-bits of the expander register 558 are coupled through the three-port multiplexer 552 to the C-bus.

Figure 27:
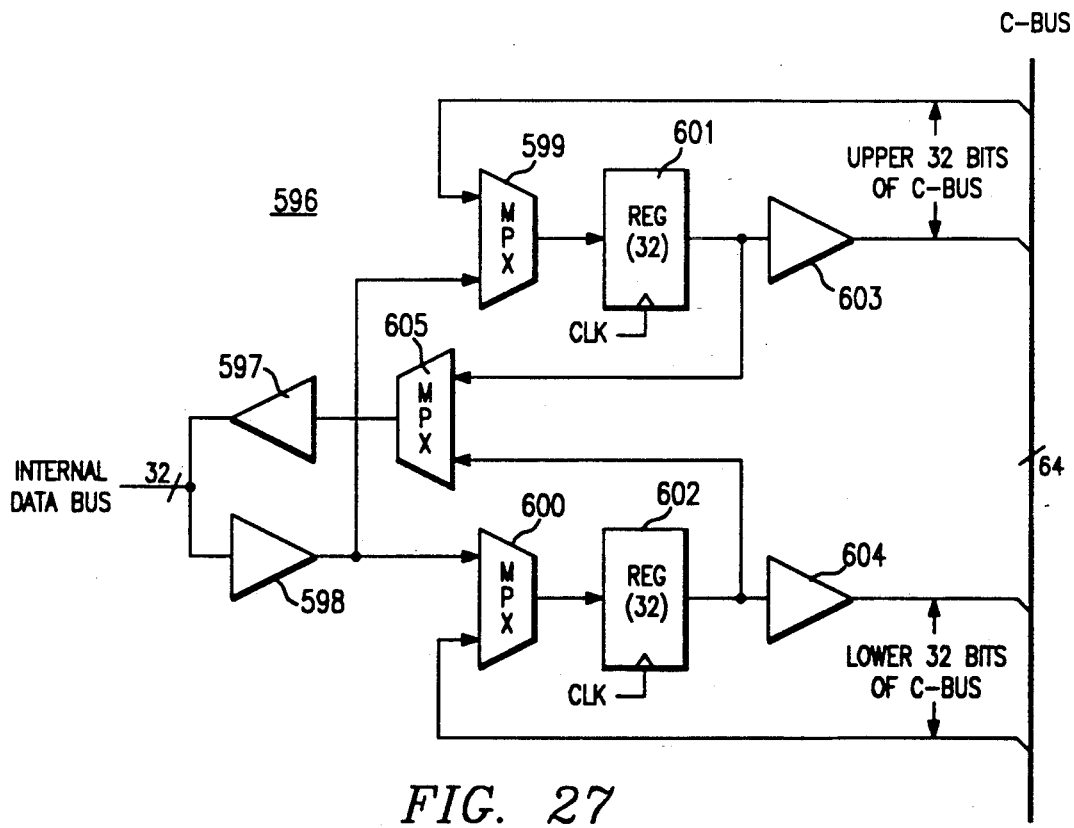
FIG. 27 is an electrical schematic drawing of the bus interface unit of the parallel image processor.

FIG. 27 is illustrative of the internal data bus interface unit 596 for interfacing the internal data bus 70 to the parallel image processor 74. With such an interface, data carried by the internal data bus 70 can be written into the parallel image processor 74 and onto the C-bus. From the C-bus of the parallel image processor 74, such data can be transferred to the register file 452, and output to the image memory plane 84. In addition, the internal data bus interface unit 596 can be employed to write the writable control store 464 with data.

The bus interface unit 596 is provided with input/output connections to the 32-bit internal data bus 70 by way of buffers, illustrated by reference characters 597 and 598. A pair of two-input multiplexers 599 and 600 are connected to couple data from the internal data bus 70 to a corresponding pair of 32-bit registers 601 and 602. The output of each register 601 and 602 forms a 32-bit word connected through respective buffers 603 and 604 to the C-bus. Register 601 stores the upper 32 bits of the C-bus, while register 602 stores the lower 32 bits of the C-bus. Data from the C-bus can be coupled to respective 32-bit registers 601 and 602 through multiplexers 599 and 600. The outputs of the registers 601 and 602 are connected to the inputs of a multiplexer 605 for coupling either the upper or lower 32 bits of the C-bus to the internal data bus 70, via buffers 597.

The various control signals for controlling the internal data bus interface unit 596 including enable controls for the two 32-bit registers 601 and 602, multiplexer controls, and enables for the output to the C-bus and the internal data bus 70, are decoded from the 4-bit PIP instruction input to the PIP controller 450.

The internal data bus interface unit 596 provides three principal functions. First, communications are enabled between the bus interface unit 596 and the register file 452. Secondly, communications are enabled between the bus interface unit 596 and the PIP controller 450. Thirdly, communications are enabled between the internal data bus interface unit 596 and the output register within the I/O controller 454. The bus interface unit 596 also couples data between the internal data bus 70 and the C-bus through an intermediate funneling to 32-bits. Sixty-four bit image memory words are coupled thereto by driving two series of 32-bit words on the internal data bus 70.

In loading the image memory plane 84, two consecutive 32-bit words are delivered to IDBIU 596 where the 64-bit image memory words are formed. The 64-bit image memory word is then passed to the parallel image processor output register where the 64-bit word is driven via a dedicated bus to the associate image memory plane 84. Since only one internal data bus is provided within the image computer 22, it is connected to all parallel image processors 74-80 on all image memory planes. Thus, only one image memory plane associated with each parallel image processor can be written at a time.

Another application in which the internal data bus interface unit 596 is utilized is to load the writable control store 464 within the PIP controller 450. A small instruction set is implemented within the PIP controller 450, one set of which relates to the loading of the writable control store with instructions. A "booting" of the parallel image processor 74 can thus be achieved. In order to load the writable control store 464 from the image memory 82, data must be first written into the bus interface unit 596 through the register file 452, and then subsequently read back onto the C-bus and into the writable control store.

The bus interface unit 596 also allows communications of data internal to the other circuits of the parallel image processor 74. For example, flags and masks generated within the parallel image processor 74 can be placed onto the C-bus and then read onto the internal data bus 70. It is thus possible to write data to the register file 452 via the C-bus, and hence to the internal data bus 70 by way of the bus interface unit 596.

Each parallel image processor 74-80 of the invention further includes an arithmetic logic unit (ALU) 460 for providing high speed arithmetic, logical and shifting operations involving pixel, mask and flag data. As illustrated generally in FIG. 28, the ALU 460 has inputs comprising the A-bus and the B-bus. The output of the ALU 460 is connected in common to the other noted data processing units of the parallel image processor 74 through the C-bus. As noted above, the C-bus is an input bus to the four-port register file 452. The ALU 460 has an 8-bit output to the internal mask/flag bus 463.

The ALU 460 of the invention is highly flexible in that parallel image processor instructions can be processed in one 100 ns cycle, and 8-bit or 16-bit precision arithmetic/logic operations can be performed.

With reference again to FIG. 28, the ALU 460 comprises eight parallel 8-bit sections, one such section identified as reference character 607. Each ALU section 607 has a pair of 8-bit inputs, one connected to the A-bus and the other connected to the B-bus. Control signals input to each ALU section 607 comprise ALSF0, ALSF1, a mode signal, a clear (CLR) signal, and a mask/flag enable (MFE) signal. Further, each ALU section 607 provides an 8-bit output connected to the C-bus, and a single bit output connected to the internal MF bus 463 which, in conjunction with the seven other ALU sections, comprise connections, to the 8-bit mask/flag bus 85.

Figure 29:
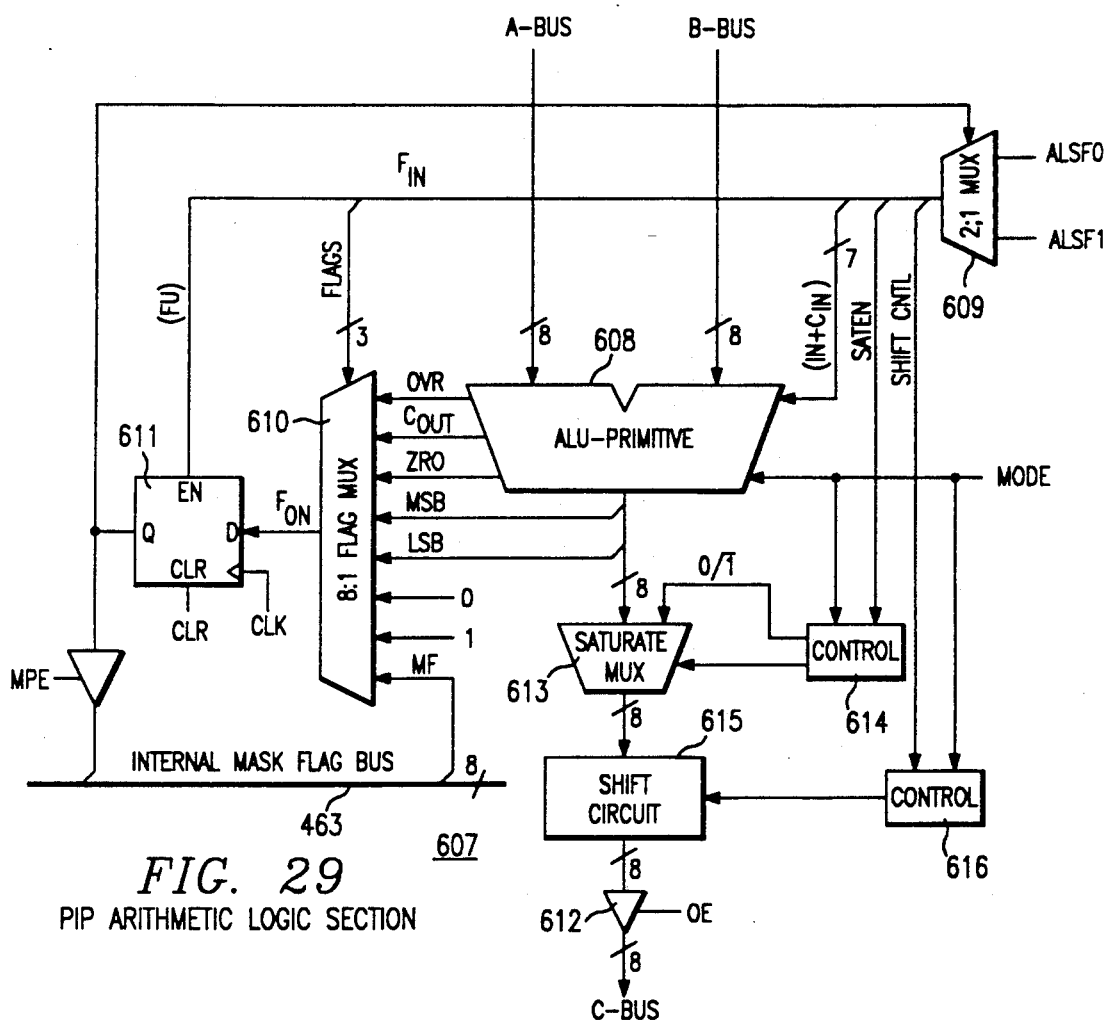
FIG. 29 depicts such unit in detail.

The details of one such ALU section 607 are shown in FIG. 29. The eight ALU sections may be bound together as pairs, thus facilitating 16-bit operations. Each ALU section 607 comprises, in major part, a two-input ALU primitive 608 having an A-bus input and a B-bus input. Provided as control to the ALU primitive 608 are six control lines plus a carry in ($C_{in}$), and a mode signal. Outputs of the ALU primitive 608 include an OVR signal, COUT and a ZERO signal. The ALU primitive 608 can perform any logical operation on the A and B inputs, as well as the arithmetic operations of addition, subtraction, increment by one and decrement by one. The primitive ALU section is a custom implementation of the functionally similar 74381 ALU standard chip, but where the instruction capability has been enhanced.

The ALU section 607 is provided with control inputs driven by a second 2:1 multiplexer 609. The 2:1 multiplexer 609 is controlled by a flag in ($F_{in}$) signal for controlling which of the ALSF0 or ALSF1 signals are coupled to the ALU section 607 for control functions. The ALU primitive 608 provides a number of flag signals, in conjunction with three other flag signals (0, 1, MF bus), all coupled to an 8:1 flag multiplexer 610 for providing a flag out ($F_{on}$) output. The flags 0, 1 are hardwired to the corresponding logic states, while the MF bus flag bit of each of the eight ALU sections is connected to a different one of the eight mask/flag bus 463 conductors. The 0, 1 flags are used for set and clear functions of the flag flip-flop 611. The set of the eight flag flip-flops of the eight ALU sections is referred to as the ALU flag register. The MF bus flag bit allows one to load a precalculated set of flags into the ALU flag register via the respective flag multiplexer 610. The flag multiplexer 610 is controlled by a 3-bit flag select signal, generated by the 2:1 multiplexer 609. The three control flags comprise segments of the currently selected ALSF instruction component, which bits thereof are components of ALU microinstructions, as defined below.

As can be appreciated from the foregoing, each ALU section 607 is organized as a stand-alone 8-bit ALU which can pass information to an adjacent partner ALU section, to thereby function as a 16-bit ALU. The function of each signal input to each ALU section 607 is set forth below. The mode (1) input controls the manner in which the data on the A-bus and B-bus are regarded, i.e., as $8 \times 8$ or $4 \times 16$ bit data. The CLR(1) input signal effects a synchronous clear of the flag flip-flop 611 when true. The MFE(1) input signal enables the ALU flag flip-flop 611 for driving the internal MF bus. This signal originates in the mask/flag processor 462 from a decoder utilized to select which source currently is writing data on the internal MF bus 463.

The ALSF0 (15:0) input signal is a 16-bit ALU instruction consisting of five sub-fields described below. This instruction is executed by one of the ALU sections 607 if the contents of its flag flip-flop 611 are defined as a logic low state. The ALSF1 (15:0) input signal is also a 16-bit ALU instruction consisting of five sub-fields. This instruction is executed by one of the ALU sections 607 of the parallel image processor if the contents of its associated flag flip-flop is a logic high state. The clock signal (CLK) is an input signal to all flag flip-flops in the ALU sections 607 utilized for triggering the register file 452 and all other parallel image processors. Lastly, the output enable (OE) signal enables the output bus interface buffers 612 for driving the C-bus. When enabled, the particular ALU section drives the C-bus and provides an input to the C-port of the register file 452, as well as to the output register 488 of the I/O controller 454.

As noted, the output of each ALU 460 comprises 64-bits of information which can be coupled to the register file write port, or multiplexed to the parallel image processor output. Other outputs of the ALU sections together are connected to the internal 8-bit mask/flag bus 463 for reading and writing flags from the ALU 460. The internal MF bus 463 is bidirectional in nature, for carrying transmit or receive information.

With reference again to FIG. 29, the ALU Section 607 further includes a saturate circuit which produces a result similar to that of the convolver saturate circuit. The saturate circuit 613 operates on the output of the ALU primitive 608 to bound the values from zero to the maximum representative value; 255 in the 8-bit mode and 65,535 in the 16-bit mode. The output of the ALU primitive 608 is the result of arithmetic and logic operations of data on the A-bus and B-bus which can be pixel data, coefficient data or intermediate results. The saturate circuit 613 includes a control circuit 614 to determine when the ALU primitive output should or should not be saturated. The control circuit 614 has a mode input which defines 8-bit or 16-bit operations. Also input to the control circuit 614 is a SATEN signal which enables saturate circuit operation. The control circuit 614 is further controlled by a carry-out flag of the ALU primitive 608 and the 6-bit in field of the ALSF instruction component which is utilized to determine if an addition or subtraction operation is taking place.

The saturate circuit 613 itself comprises a 2:1 multiplexer with the 8-bit ALU primitive result as one input, and with an 8-bit computed saturate value (O/I) computed by the saturate control circuit 614. Hence, when the ALU primitive 608 performs a subtract operation and the result is negative, and saturation is enabled, the saturate control circuit 614 selects the 0/I path and 0/I is selected as zero. This would represent a block pixel on the display. On the other hand, if the ALU primitive add operation and the result was to overflow, then the saturate control circuit 614 would select the 0/I path, whereupon O/I would equal one. This would be viewed as a white pixel on the display.

The ALU Section 607 also includes a shift circuit 615 which is used in arithmetic operations such as division and multiplication, creation of logical masks and in image point operations which operate on a single pixel irrespective of its neighbors. In preferred form, the shift circuit 615 includes a 3:1 multiplexer associated with each of the eight outputs of the saturate circuit 613. Each of the 3:1 multiplexers is connected in such a manner to the saturate circuit 613 outputs as to select either a left shift of one position, a zero or nonshift, or a right shift of one position. The 3:1 multiplexers associated with leftmost and rightmost bit positions have special input circuitry to control the shift input of either a zero or one, so as to fill the vacant bit position during the shift, or to fill the other bit positions during a rotate operation or a 16-bit operation. A 16-bit operation requires a communication with one of its neighbors during a shift operation.

The shift circuit is controlled by a shift control circuit 616 which, in turn, is controlled by an encoded 3-bit field in the ALSF instruction component. Again, the mode signal determines whether 8-bit or 16-bit shift operations are to be performed. The 8-bit output of the shift circuit is coupled via buffers 612 to the C-bus.

Each parallel image processor can be characterized as a slave processor, in that no sequencing capability is provided. Thus, conditional statements are provided in the form of: if <[condition]>, then i1 else i2, where i1 and i2 are instructions. This format allows for conditional execution to be performed in a single parallel image processor instruction. The instruction format of the ALU 460 is defined as such:

inst:== <mode> <CLR> <MFE> <ALSF> <ALSF>
ALSF:== <LSB> <FU> <FLAG> <Shift> <SATEN>
<IN> <$C_{in}$>.

The "inst" instruction is primary to the arithmetic logic unit 460, and contains three sub-fields comprising the ALU mode and two ALSF components. Each ALSF field is a secondary instruction, the first of which is executed if the current flag is at a logic low state, and the second is executed if the current logic flag is at a logic high state.

The mode field determines the manner in which the ALU 460 regards the data input thereto. As noted above, a logic low or high state defines respectively eight parallel 8-bit operations, or four parallel 16-bit operations. The ALSF (arithmetic/logic/shift/flag) signal comprise seven sub-fields, the first of which is the LSB sub-field. When true, the LSB field causes the contents of the flag register to be placed in the output pixel least significant bits. This action occurs prior to the shifting or saturating functions of the ALU 460, thus requiring that the flag bit be placed in the most significant bit position via a rotate right instruction, or in the second bit position via a shift left instruction. Otherwise, the flag data could be inadvertently destroyed if the saturate enable (SATEN) signal were true. The flag update (FU) field is a single bit field which updates flag information, if true. The ALU section flag flip-flop 611 is constructed within each 8-bit section of the ALU 460. The flag flip-flop 611 output determines which ALSF command will be executed by the ALU section 607. The function of the flag flip-flop 611 is desirable in those cases where a current operation may be based upon past operations. Hence, the need to control updating of the flag flip-flop 611 is apparent.

The flag field is a 3-bit field which determines which of the eight flags are to be written into the flag flip-flop 611, via the multiplexer 610, and thereby be employed as a conditional for later instructions. The 3-bit shift field is operative to determine the type of shift, and by how much, e.g., shift or rotate, or shift by −1, 0, +1. The shift field and function is further defined in Table VII set forth in the Appendix hereof. The shift signal also determines the manner in which the empty bit position is filled if a left or right shift is performed. The saturate enable (SATEN) signal enables the ALU circuit to perform saturating arithmetic functions.

The IN field comprises six bits for selecting minterms to be employed in developing an arithmetic or logical instruction. The lower four bits of this instruction are used for logical functions, as well as the carry propagate term, while the upper two bits are used for the carry generate term. In essence, the logical function generated via the combination of minterms determined by the lower four bits is exclusive ORed with a carry bit. If a logical function is desired, the carry will be "0", thereby allowing the logical function to be propagated to the output, unaffected. This is especially the case if the upper two bits of the IN field are at a logic low state. In general, only one of the upper two bits of this field is true at a time so that the generation of arithmetic functions progresses in a logical manner. Table VII of the Appendix further defines the IN field of the ALSF instruction.

The $C_{in}$ field is utilized for subtraction functions, when true. When false, the $C_{in}$ field is effective to cause the ALU 460 to perform decrementing during subtraction. If $C_{in}$ is true during addition, then the result is incremented by one. If $C_{in}$ is true during a logical operation, e.g., the logical AND operation, then the result thereof would be defined by A and B+1.

There are numerous flags generated by each ALU section 607 of the parallel image processor ALU 460. The flags are generated and employed to determine instruction selection, generate masks, and can be output to the internal MF bus 463 and transmitted to other circuits of the image computer 22, one such circuit being the image algorithm processor 66. The eight flags capable of being generated by each ALU section 607 are as follows. A clear (CLR) flag sets the flag circuit to an output logic low state. A set flag sets the flag register to a logic high state. An MF flag is effective to load the flag register with data currently carried by the internal MF bus 463. An LSB flag places the currently generated less significant bit into the flag register, prior to shifting and saturating functions. Also, this flag can be used to communicate with the parallel image processor mask/flag processor 462, in conjunction with the LSB control signal.

A "0" (ZRO) flag is driven to a true state if the ALU section 607 result is zero, prior to shift and saturate operations. An MSB flag places the currently generated most significant bit into the flag register, also prior to shifting and saturating. A carryout (COUT) flag places the current carry-out value into the flag flip-flop 611. An overflow (OVR) flag places the current 2's complement overflow into the flag flip-flop 611 (OVR=CO EXOR C7), where C7 is the carry-in to the 7th stage, and CO is the carry-out of the 7th stage.

The saturating arithmetic function noted above is useful in graphics and image processing, in that such function allows numbers which overflow to be represented as a maximum unsigned value, e.g., all ones, in the 8-bit mode. Likewise, any number which would normally be calculated to be less than zero would be calculated as zero in the saturating mode.

As can be appreciated, the ALU 460 facilitates high speed arithmetic, logic and shifting operations involving pixel data and nonpixel data, such as coefficients, masks, etc. Also, raster operations are implemented in multicycle operations. Using the conditional capability, thresholding is easily implemented by passing A or B, based upon the flag resulting from the difference of A and B. High resolution (16 bit) image processing can be handled using the 16-bit data mode capability. The ALU 460 also participates in the generation of image memory write masks, and in general, the ALU 460 operates in conjunction with the multiple parallel image processors to pick up where their more specific functions leave off.

In brief summary, each ALU section 607 is an 8-bit stand-alone ALU which receives control signals from the PIP controller 450. Inside of each ALU primitive 608 are two general function generator circuits. One such circuit generates a logic function and the carry look-ahead "propagate" signal, while the other circuit generates the "generate" signal during arithmetic operations, and is at a logic low state otherwise. In conjunction with these operations, there is an 8-bit binary look-ahead network which generates carry signals internal to the ALU section 607 as well as the carry-out signal which is utilized as a flag and a carry-in to a higher order ALU for 16-bit mode operation. The ALU SAT signal in conjunction with the SAT CNTL signal provide for saturating arithmetic, while the ALU SHIFT signal and the SHIFT CNTL signal provide shifting capabilities. There are several multiplexers for flag selection, instruction selection and for supporting two modes of operation. Finally, a flag flip-flop which is one bit of the flag register, exists for capturing flag data.

Mask/Flag Operation

Mask/flag operation is provided in accordance with another feature of the invention to coordinate the signalling between independently operating processors, namely, the image algorithm processor 66 and the parallel image processor set 72. As noted above in connection with the image algorithm processor 66, the mask/flag bus 85 comprises an 8-bit open drain or collector type of bus interconnecting the image algorithm processor 66 with each of the parallel image processors 74-80. The mask/flag bus 85 is effective to communicate image memory write mask information from the image algorithm processor 66 to one or more of the parallel image processors 74-80, and then to the image memory 82. The mask/flag bus 85 also provides a mechanism for providing communications of processor flag information between each of the parallel image processors 74-80. The transistor open drain nature of the mask/flag bus 85 allows a wired-OR operation to be performed on flag information as presented on the bus 85 by each of the parallel image processors 74-80. The wired-OR operation performed by the bus 85 makes possible data dependent arithmetic operations. Data dependent operations can thus be evaluated in a minimum amount of time without requiring additional processor cycles.

The mask/flag bus 85 is utilized during image memory write mask cycles of the parallel image processors 74-80 to prevent the destruction of certain pixel data when other pixel data is written into the image memory 82. This function can be appreciated in view of the fact that pixel operations, including the processing thereof, and the reading and writing of the image memory 82, are carried out with eight pixels (one memory word) at a time. Hence, if it is desired to change the pixel data of only two pixels of the eight pixel image memory word, six of the pixels will be masked and thereby prevented from being rewritten, while the two pixel locations in the image memory 82 will be written with new pixel data. The video DRAM memory devices utilized in connection with the invention are adapted to provide for such write mask operations. Also, each parallel image processor 74-80 of the invention is adapted for providing masking of either bits or bytes of pixel data.

The image algorithm processor 66 is constructed with the flexibility to provide pixel operations such as window support, opacity, masking and single pixel operations. Because the parallel image processors 74-80 operate with eight pixels at a time, the noted masking operation allows certain pixel data words to be retained during a write operation, and not destroyed. While pixel data could be read from the image memory 82, processed, and rewritten as unchanged data, such a technique would be lengthy and would substantially decrease the throughput of the image computing system 22. The write mask cycle information is presented to the video DRAMs during the save cycle as pixel data is written therein, thereby requiring no additional processor cycles.

This feature of the invention provides for both a pixel byte write mask and a pixel bit write mask. The pixel byte write mask and the pixel bit write mask each comprise 8-bit fields, wherein the pixel byte write mask identifies which one or more of the eight pixels currently being processed should be modified. On the other hand, the pixel bit write mask identifies which bits to mask inside each pixel byte. With both an 8-bit byte write mask and an 8-bit bit write mask, the two 8-bit numbers can be used to generate a 64-bit wide write mask. A great deal of flexibility is thereby provided for masking certain bits of the numerous pixels. While pixel write mask information could be generated within the parallel image processor set 72, in the preferred embodiment of the invention, the image algorithm processor 66 generates such write mask information. Those skilled in the art may find it expedient in other situations to generate memory write mask information utilizing a flag register or less significant bit information of each of the 8-bit pixels carried on the internal 64-bit bus (C-BUS) throughout the parallel image processor set 72. In any event, the mask/flag bus 85 carries information which is expanded into a 64-bit word during the write mask cycles of the image memory 82.

As noted above, the mask/flag bus 85 is also utilized in connection with flag cycles for communicating processor flag information. Indeed, in processing image data, there are instances in which flag information present on the bus 85 is useful for generating the pixel write masks. In other situations, the flag cycles are utilized to coordinate activity between the separate or distributed parallel image processors 74-80. The shared bus structure of the mask/flag bus 85 allows more than one processor source to drive the bus, wherein a destination processor can then latch the information present on the bus 85. Indeed, more than one driving source may utilize the mask/flag bus 85 concurrently, wherein the information will be logically ORed. Data on the mask/flag bus 85 can also be stored in registers within each of the parallel image processors 74-80 for use in synchronizing computational operations occurring between the processors 74-80, or such data can be directed through internal byte registers for output into expansion registers without destroying the current flags. The apparatus for accomplishing this will be described in more detail below. The timing of the mask/flag bus 85 is derived from SYSCLK. The open drain outputs of circuits connected to the mask/flag bus 85 are driven on the falling edge of SYSCLK, and the result thereof is latched on the rising edge of such clock signal.

Processor flag information generated within the image algorithm processor 66 is also coupled to the mask/flag bus 85 for communicating flag information to the various parallel image processor set 72. Flag information generated within the image algorithm processor 66 indicates, for example, whether memory addresses generated therein fall within a specified area of the display 28, such as the viewable area.

Figure 30:
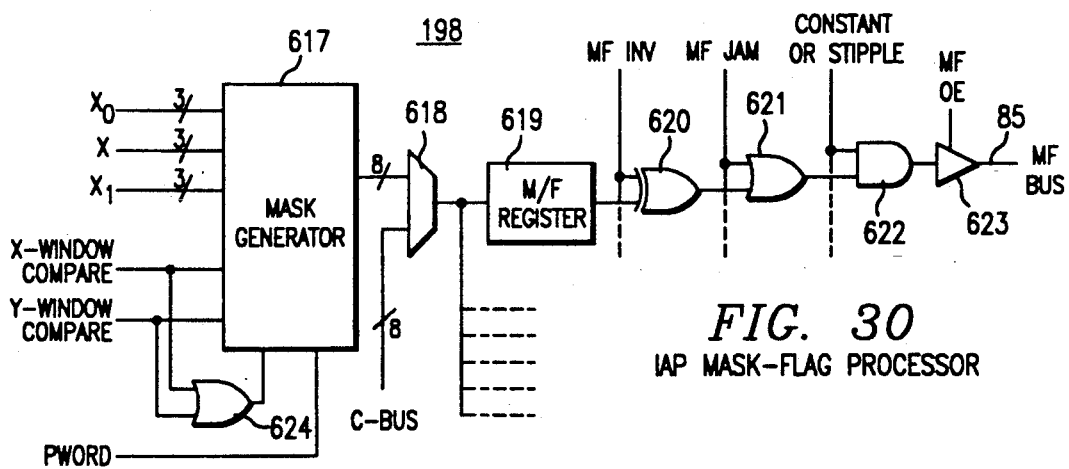
FIG. 30 is an electrical schematic diagram of IAP mask/flag processor of the image algorithm processor.

FIG. 30 illustrates the electrical details of the IAP mask/flag processor 198. The processor 198 includes a mask generator 617 having inputs coupled to the X and Y comparators 196 of the image algorithm processor 66, as well as other inputs coupled to the X and Y latches 194. With such information, the mask generator 617 can determine an out-of-bounds address generated by the image algorithm processor 66. The mask generator 617 is provided with an 8-bit output coupled to one input of a two-input multiplexer 618. The other input of the multiplexer 618 is coupled via an 8-bit bus to the C-bus of the image algorithm processor 66. The output of the multiplexer 618 is connected to a register 619 for storing 8-bits of mask/flag information. The output of the register 619 is connected to one input of a two-input exclusive OR gate 620. The other input of the EXOR gate 620 is driven by a mask/flag invert (MFINV) signal. The output of the exclusive OR gate 620 is connected to one input of a two-input OR gate 621. The other input of the OR gate 621 is connected to a mask/flag jam (MFJAM) signal. The output of the OR gate 621 is connected to one input of a two-input AND gate 622, the other input of which is connected to a constant or stipple signal. The output of the AND gate 622 is connected to the mask/flag bus 85 through a buffer 623. There are seven such other circuits connected to the output of the multiplexer 618 for driving the mask/flag bus 85 with mask or flag information.

The mask generator 617 comprises programmable array logic for generating write mask information for writing pixel data in the image memory 82. The mask generator 617 utilizes $X_0$ and $X_1$ image memory window data, as well as the four outputs of the comparators 196 to determine whether an eight pixel word is totally within the window, totally out of the window, or partially within the window. The mask generator 617 generates an eight-bit mask value, with each bit thereof representing whether or not the corresponding pixel is within the defined window. The OR logic gate 624 is connected to the outputs of the four comparators 196 and detects the case in which the pixel word is totally out of the window.

The mask generator 617 is constructed and programmed to operate in two modes, e.g., a memory word level and a single pixel level. In the pixel word level, which is the normal operating mode, the mask generator 617 determines which one or more of the eight pixels of a memory word are to be masked, without regard to the bits within each pixel thereof. An eight-bit mask word is thus generated, zeros defining unmasked pixels and ones defining masked pixels. The mask word is transmitted via the mask/flag bus 85 to be stored in a byte register of the appropriate parallel image processor 74-80. Where, for instance, four pixels of the word fall within the window, and the other four pixels fall outside the window 216, the mask word would be 11110000, or the inverse thereof depending on whether the pixel word occurred on the left or right hand side of the window.

In the single pixel mode, a bit mask word is generated to define which single pixel within a pixel word is to be changed. This mode is important for use in single pixel width windows, such as those used in generating graphical lines on the monitor 28. When in this mode, the X pixel position itself, rather than $X_0$, $X_1$, is used to define the narrow window.

Masking is advantageously used when the pixel words contain tag bits occupying certain bits of the pixels. Generally, the least significant bit positions of a pixel are used for tag bits so as to minimize the effect on the color information with which the pixel word otherwise represents. The tag bits are used in conjunction with the look-up tables 108 which are described below. In any event, when pixels having tag bits are processed, it is desired not to destroy the tag bit information. Thus, the tag bit positions of such pixels are masked in the single pixel mode and passed to the bit register of the proper parallel image processors 74-80.

The P-word input determines which of the noted modes the mask generator 617 operates in. With the microcode controlled nature of the image algorithm processor 66, a great deal of flexibility is provided in the generating of write masks for pixel data.

With reference back to FIG. 30, C-bus information is coupled to the multiplexer 618 so that standard values can be stored in the mask/flag register 619 to enable mask/flag values to be calculated. The mask/flag information or the standard value information input into the mask/flag register 619 is then coupled to the exclusive OR gate 620 which functions as a programmable inversion. The MFJAM signal is effective to force each of the eight output bits of the IAP mask/flag processor 198 to a logic high state, e.g., a hexadecimal FF. This feature is advantageous when it is desired to utilize a constant value, such as the stipple input to the AND gate 622, and pass the result to the parallel image processor set 72, via the mask/flag bus 85. The stipple signal is employed for producing a stipple characteristic when overlaying one image on top of another. When utilizing the IAP mask/flag processor 198 to generate stipple patterns, the 8-bit output thereof is passed, via the mask/flag bus 85, to a byte register of the PIP mask/flag processor to be described below. With this arrangement, various selected data would be masked, while other data coupled to the image memory 82 would not be masked. Accordingly, a stipple pattern can be produced.

Another example of the generation and utilization of mask information is given below. Write mask information may be generated as a result of the processing, alteration or display of an image. For example, assume a red object is displayed on a monitor, together with a background, and it is desired to replace the background. A checking range is provided to each parallel image processor 74–78 associated with the RGB color memory planes 84–90. The overlay image memory plane 90 is forced to output ones in order that interference with such operation is eliminated. Consequently, the region checking circuit of the overlay image memory plane 90 will provide false outputs. The region bound information is passed from the image algorithm processor 66 to the parallel image processor set 72, via the mask/flag bus 85, as well as through the internal data bus 70. Single destination cycles are utilized to provide write and read timing for each parallel image processor 74–80. If, for example, the number range 15-255 is chosen for the noted color red, 0-75 for blue and 0-75 for green, the range 255-0 is supplied to the overlay image memory plane 90 in order to provide a condition which is always false. Once the bounds are provided, a read cycle is issued to each parallel image processor 74–80. All planes of the image memory 82 are thus selected. After the eight pixels have been input into each of the parallel image processors 74–80, the high bounds are checked. The resulting flags are stored in the register file of each of the parallel image processors 74–80. The low region is also tested, and the flags are combined to determine if the pixel which has been selected satisfies the boundary condition. All pixels must satisfy the boundary condition. An output is then presented to the mask/flag bus 85 and wire-ORed to determine if any of the pixels are in the noted color range. The reading of data on the mask/flag bus 85 yields the eight pixels which should or should not be associated with the write mask information.

At this point in the generation of the write masks, the programming of the respective parallel image processors 74–80 diverges. The overlay image processor 80 is provided with a different instruction than the other parallel image processors 74–78 associated with the respective RGB image memory planes 84–88. The overlay image processor 80 expands the flags into the less significant bit positions of the eight pixels, and performs a write operation of the image memory 82. Only a certain bit field may be involved in such write operation. The write operation is not required to be constrained to the overlay image processor 80, but rather the other parallel image processors 74–78 may be responsible for saving the resultant write mask information.

The foregoing process of generating write mask information requires two cycles for the read operation, two cycles for the write operation and two cycles for testing if the current data paths are allowed. As a result, a pixel processing rate of at least 600/8 or 75 nanoseconds per pixel is all that is required.

Figure 31:
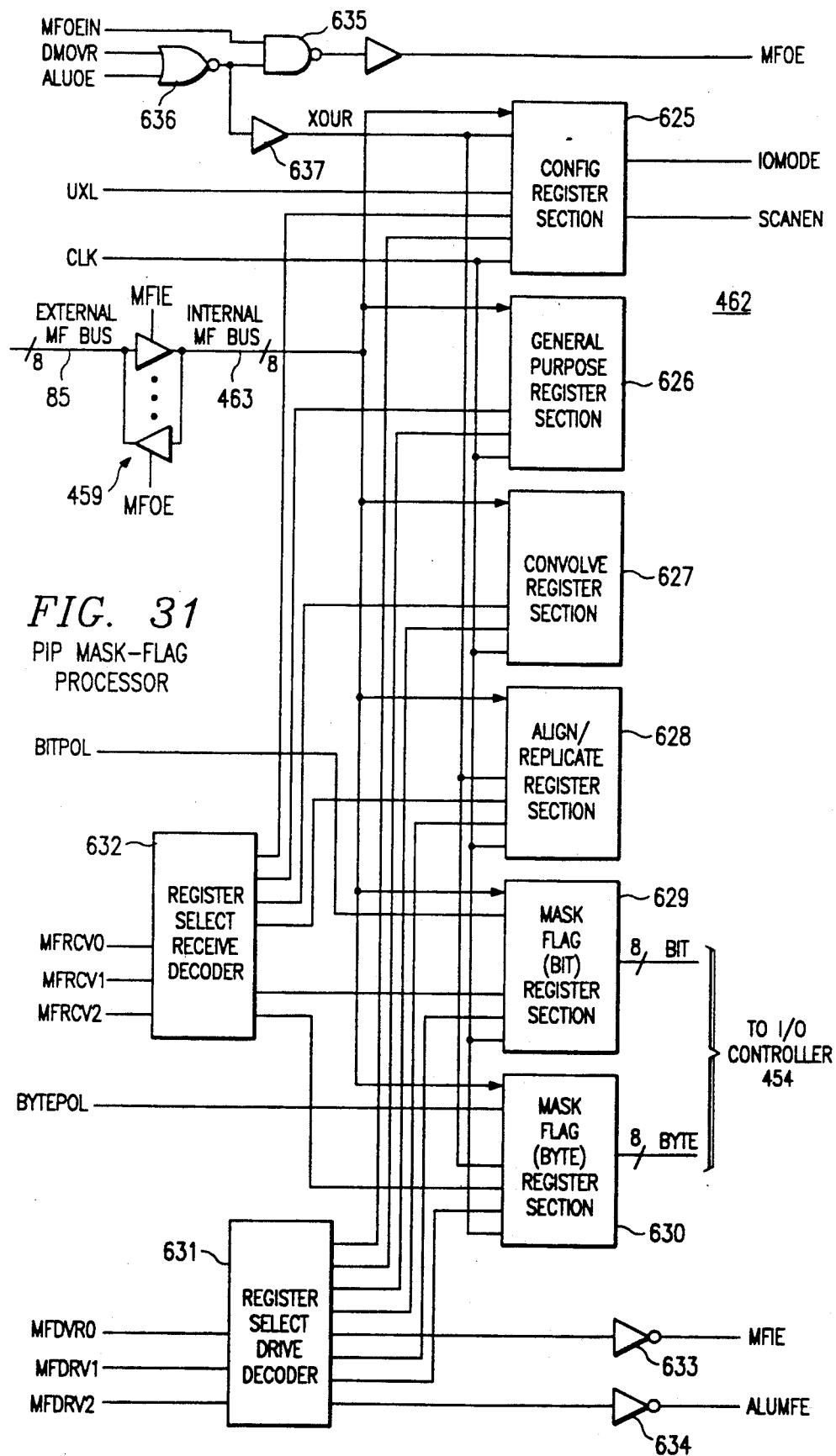

The mask/flag processor 462 associated with each parallel image processor 74–80 is illustrated in FIG. 31. The mask/flag processor 462 typically comprises six register sections 625–630, each of which is effective to drive write mask data on the internal mask/flag bus 463, or read similar data therefrom. As noted previously, bidirectional transceivers 459 are provided to couple transmit and receive mask/flag information between the external mask/flag bus 85 and the mask/flag bus 463 internal to each of the parallel image processors 74–80.

Each of the noted registers 625–630 is associated with a particular function in the masking operation, as will be described in more detail below. A decoder is provided to avoid contention between the registers 625–630. Contention is avoided by the provision of a register select drive decoder 631 which is utilized to select one of eight circuits of the parallel image processor for driving the mask/flag bus 85. The eight circuits comprise the six registers 625–630, an ALU flag register (not shown) and an off-chip data circuit, also not shown. Data output to the ALU flag register by the mask/flag processor 462 is via the ALUMFE signal output. Data output by the mask/flag processor 462 to the off-chip data sources is by way of the MFIE output.

Other functions of the mask/flag processor 462 include the indirect control of the pixel data processing circuits of the respective parallel image processors 74–80. Particularly, one of the six registers 625–630 can receive data, as specified by the MFRCV input signals, in conjunction with an independent operation of driving off-chip circuits via the MFOE output. Also, the mask/flag processor 462 can write data to an ALU flag register (not shown) which is controlled by an ALU instruction bit. Although the MFDRV control signals are present in all parallel image processor microinstructions, the MFRCV field cannot be utilized during ALU instructions, as such bits are required by the ALU instruction.

The operation of the mask/flag processor 462 in placing data on the internal mask/flag bus 463 is carried out by placing one of the eight noted sources into operation, and to receive data by one of the six register sections 625–630, and/or the ALU flag register and the off-chip buffers to the system mask/flag bus 85. Data which is placed on the internal mask/flag bus 463 may be utilized to control the shift value of the alignment, replicate unit 456 of the respective parallel image processor 74–80 or to control the expand and shift circuit in the convolver unit 458.

In accordance with the mask/flag processor 462 of the invention, there are six storage sections comprising a configuration register 625, a general purpose register 626, a convolver unit register 627, an alignment/replicate register 628 and two mask/flag registers 629 and 630. The mask/flag registers comprise a bit mask register 629 and a byte mask register 630. The configuration register 625 comprises two registers connected in parallel, while the other register sections 626-630 comprise eight registers connected in parallel.

Figure 32:
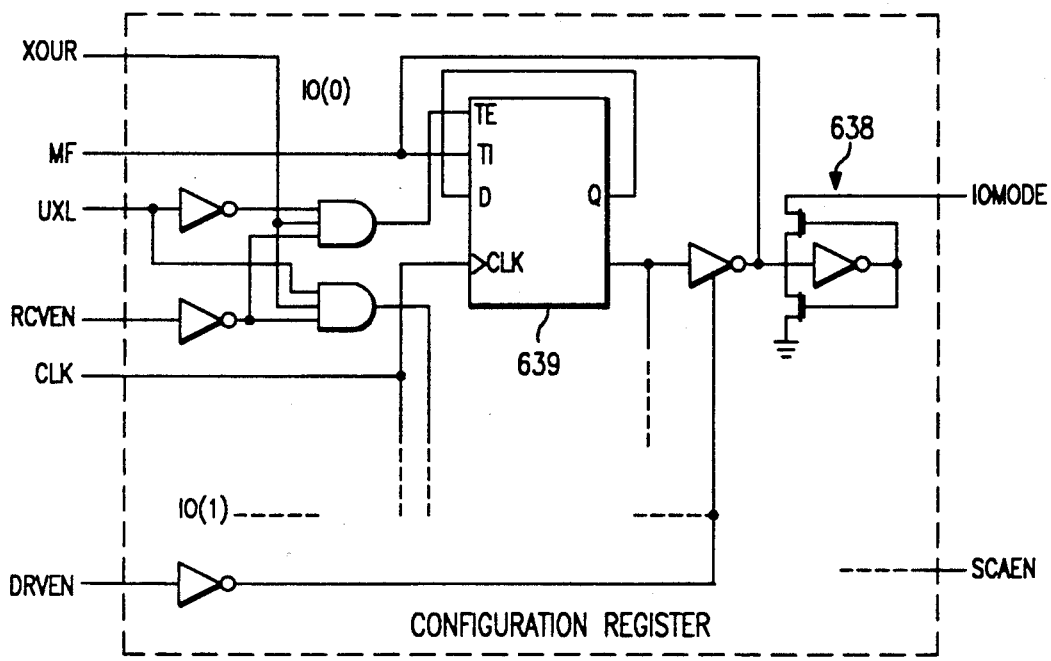
Figure 33:
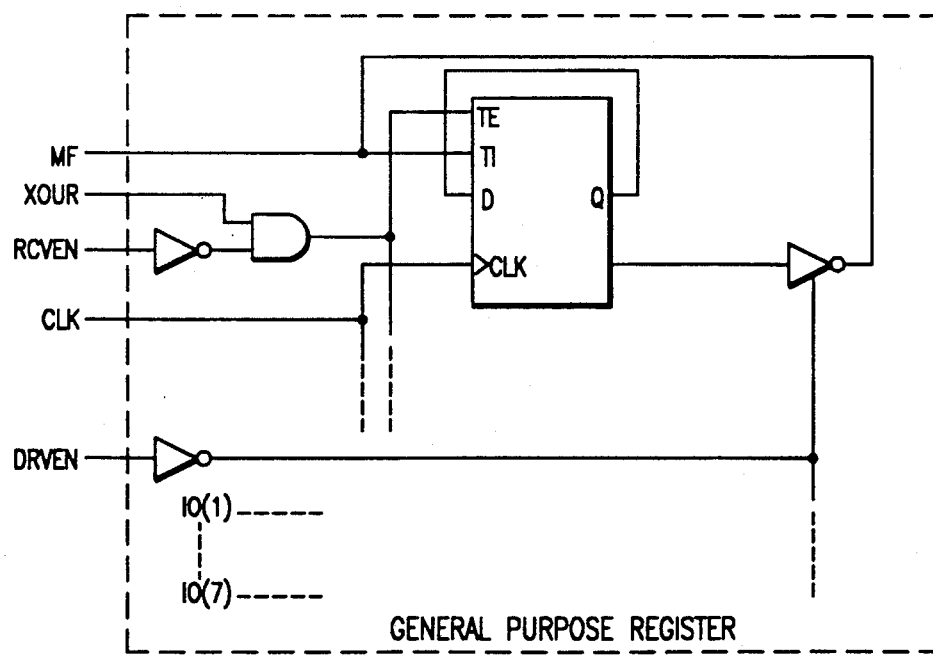

FIG. 32 illustrates one exemplary register of the two-register configuration 625, while FIG. 33 illustrates one exemplary register of the eight-register general purpose section 626. FIG. 34 illustrates a typical register circuit of the convolve register section 627 which is also exemplary of the arithmetic alignment/replicate section 628. Lastly, FIG. 35 illustrates one register of the eight-register mask/flag section 629 and 630. The internal eight bit MF bus 463 is common to each of the register sections 625-630 and provides input and output buses to such registers. A first decoder 632 is provided with a three-bit address input for providing six outputs, each such output adapted for enabling the respective register sections 625-630 to read data from the internal MF bus 463. A second decoder 631, also provided with a three-bit address input, provides six outputs for enabling the respective register sections 625-630 so that data stored therein can be driven on the MF bus 463. The output of the second decoder 631 provides two additional outputs through respective inverters 633 and 634, providing MFIE and ALUMFE outputs. The MFIE signal enables input buffers 459 for inputting data from the external mask/flag bus 85 to the internal mask/flag bus 463. Each parallel image processor 74-80 is comparably equipped.

With regard to signal inputs of the mask/flag processor 462, there is shown the internal eight-bit mask/flag (MF) bus 463 which is employed as a communication medium throughout the mask/flag processor of each parallel image processor 74-80. The three-bit MFRCV signal is utilized to determine which register section is selected for receiving mask or flag data from the MF bus 463. A three-bit MFDRV field is utilized to determine which section of the six register section is to be selected for driving data onto the MF bus 463. An MFOEIN signal is coupled to one input of a two-input NAND gate 635 to derive an MFOE output signal for driving off-chip circuits. The MFOEIN signal is derived from other signals to be described below. A DMOVR signal is coupled to one input of a NOR gate 636 and is used in a delayed mode override, when at a logic high, to place the mask/flag processor 462 in an "idle" mode or when executing a NOP. An ALUOE signal is also coupled to the NOR gate 636, the output of which is buffered by a buffer 637 to gate each of the register sections 625-630, and to override the MFOE signal. When the ALUOE signal is a logic high, such state provides an indication that the current microinstruction is in the ALU mode, i.e., denoting that the ALU output controls the C-bus within the respective parallel image processor. This signal is also utilized to gate off the MFOE signal and thus inhibit the register sections 625-630 from being written. The purpose of this is realized when it is understood that the upper bits of the control word which are normally utilized to control the register sections 625-630 are required to control the ALU of the respective parallel image processor.

The UXL signal input to the mask/flag processor 462 is used to selectively write to either upper or lower ports of selected register sections. The two-port registers comprise the alignment replicate register 628, the convolve register 627 and the configuration register 625. When UXL is at a logic low level, the lower portion of such registers is written. When UXL is at a logic high state, the upper portions thereof are written. The UXL signal does not affect registers other than those noted above. In the case of the alignment register section 628, the register is divided into an upper and lower four bits. For the extended precision arithmetic unit register section 627, there is an upper three bits and a lower five bits division. With the two configuration registers 625, the lower portion is identified as bit "0", while the upper portion is identified as bit "1".

A clock signal is common to each of the register sections 625-630 for clocking the respective registers. A BITPOL signal is coupled to the mask/flag bit register section 629 for controlling the polarity of the register contents, as transmitted to the I/O controller 454 and as written to the MF bus 463. A logic low state implies a noninverted bit, while a logic high state implies an inverted bit.

A BYTEPOL signal is applied to the byte register section 630 for controlling the polarity thereof in a manner similar to that of the bit register section 629.

With regard to the outputs of the mask/flag processor 462, there is provided an eight-bit output bus BIT (7:0) which defined the output of the bit register section 629. Such bus is directed to the I/O controller 454 for generating image memory write mask information in conjunction with the byte register section 630. An eight-bit byte bus BYTE (7:0) is effective to transfer the output of the byte register section 630 to the I/O controller 454 to generate image memory write mask information, also in conjunction with the bit register section 629.

The MFOE signal, as noted above, is effective to enable the open drain circuits of the off-chip driver circuitry 459. An IOMODE signal is output from the bit "0" part of the configuration register section 625. In a logic high state, the IOMODE signal indicates that the chip is in an ECC mode, while in a logic low state, a nonECC mode is indicated. Output from the bit "1" position of the configuration register section 625 is a SCANEN signal. When in a logic high state, the parallel image processor instructions CF (hexadecimal) are identified as scan instructions, while if in a logic low state, then parallel image processor global instructions are defined.

As noted, the MFIE output signal is effective to enable off-chip MF bus 85 onto the parallel image processor internal MF bus 463. As also noted above, the ALUMFE output signal enables the ALU flag register onto the parallel image processor internal MF bus 463.

The configuration register, shown in detail in FIG. 32, includes an output hold circuit 638 to prevent those bits of the internal MF bus 463 from being driven to the output. The D-input of the register 639 is used to determine the manner in which the parallel image processor I/O circuits function. That is, mode=1 allows the I/O circuits to support a read-modify-write based error detection and correction function, while mode=0 causes the I/O circuitry to function in a different manner. Bit-1 of the configuration register 625 is used to place the parallel image processor into a scan mode. In this mode (bit-1=1), instructions C-F which normally perform the four execute-with-IDB instructions, are transferred into scan instructions. The parallel image processor scan ring consists of an expanded precision arithmetic unit accummulator, a pipeline register and the internal data bus interface unit. If the scan bit is set, and if any one of the four instructions C-F is issued, then all the bits in the scan ring are shifted one position. Bits "0" and "1" are written separately under control of the UXL signal, as described above.

The general purpose registers of FIG. 33 are for general use, including local storage of intermediate, temporary, or additional mask, flag or control data.

FIG. 34 illustrates the expanded precision arithmetic unit registers 627 in detail. Such registers temporarily store the expander control and shift value for the convolver unit 458 of the parallel image processor. The lower three bits store the expander control register value, while the upper five bits store the shift value. The upper and lower segments are written separately under control of the UXL input signal, as described above.

The alignment/replicate registers 628 are electrically similar to the registers shown in FIG. 34. Such registers function to store two 4-bit alignment shift values corresponding, in many instances, to source and destination values. This register section 628 is partitioned into upper and lower 4-bit segments, each of which is written separately under control of the UXL signal, as described above.

The mask/flag registers illustrated in FIG. 35 correspond both to bit and byte storage registers 629 and 630, the contents of which are combined to form the image memory write mask information of a parallel image processor 74-80. The special purpose nature of the mask/flag registers 629 and 630 reside in the ability to control the polarity of the output, via the POL control signal, and the highly buffered outputs which are used to drive all the I/O circuits of the parallel image processor.

In brief summary, it can be appreciated that the mask/flag processor 462 of each parallel image processor supports the storage, communication and manipulation of write mask functions, ALU flags and special control data. All register sections are constructed to be easily read and written, thereby supporting context switching. As noted previously, the internal MF bus 463 is connected external to the parallel image processors via 8-bit open drain or collector devices. However, by utilizing open drain outputs, a great deal of functionality is realized at the system level communication of flag and mask data. The open drain or collector outputs of all the parallel image processors are connected together, thereby providing the logical OR capability of all such processor outputs. This technique yields an efficient means for combining flag information generated by multiple processors, and for transmitting such information to the image algorithm processor 66 on the external mask/flag bus 85.

The special control function noted above implies parameter substitution in instructions, so as to avoid excessive instruction replication, or to provide for a convenient and efficient means for communicating instruction parameters calculated in the image algorithm processor 66 to each of the parallel image processors, via the external mask/flag bus 85. In particular, mask/flag bus 85 carries data information values for shifting purposes in the alignment/replicate unit (ARU) 456, and for expander control and shift values in the convolver 458. Two values are provided for the ARU final shifter since the mask/flag bus 85 is eight bits wide, and the ARU shift value is four bits in length. Such values represent the source and destination of two pixels being aligned or moved, the values being padded (with a "0") with the least significant three bits of the addresses of the two pixels.

A 64-bit write mask is formed in the parallel image processors by the logic AND function of the contents of the bits and byte registers 629 and 630 described above. A combination of the two mask values allows for any combination of eight pixel bytes to be masked, as well as the masking of any combination of bits within such bytes. Additionally, the polarity of the bit and byte registers 629 and 630 are individually controllable.

While the mask/flag processor 462 is not characterized as operating under its own mode, it is under general microcontrol of its associated parallel image processor. The control of the mask/flag processor 462 is carried out utilizing bits 51-60 of the parallel image processor instruction in all modes, except the ALU mode. Thus, the mask/flag processor 462 can operate concurrently with all functional units, other than the ALU 460.

Image Memory

Figure 36:
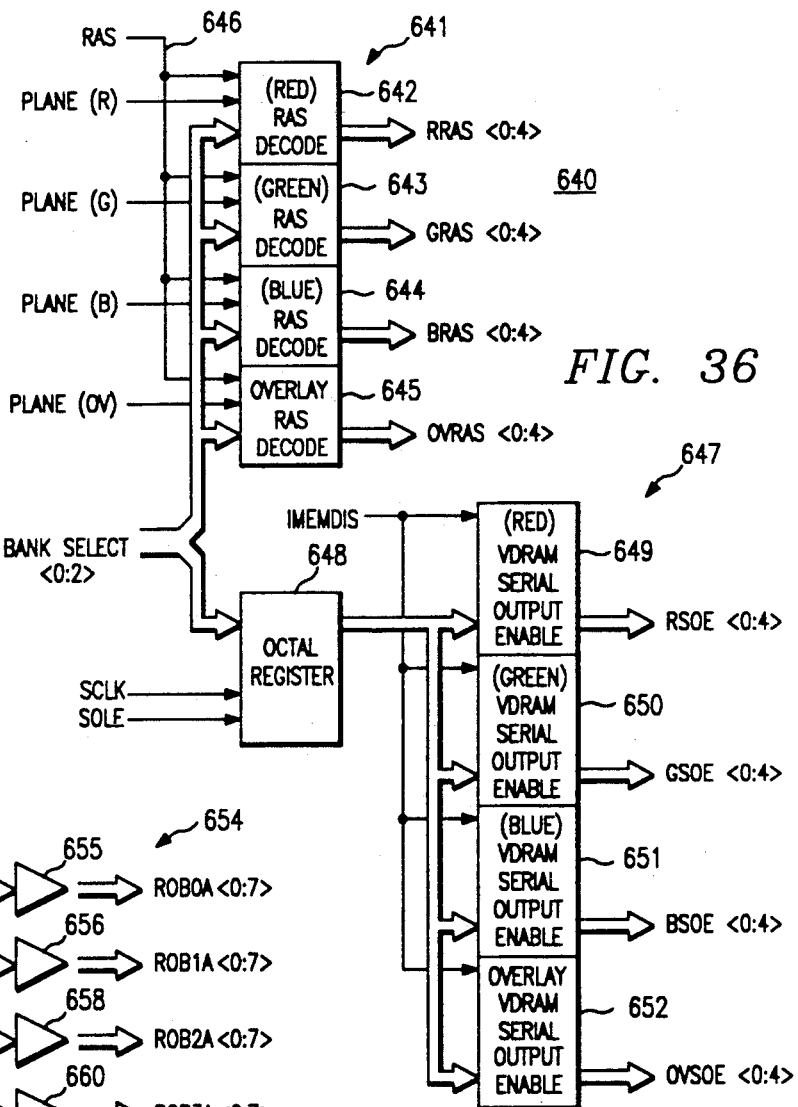
FIGS. 36-39 illustrate in electrical schematic form the access circuitry for the image memory of the image computer of the invention.

With reference to FIGS. 36 through 40, there is illustrated the detailed construction of the image memory 82. With reference to FIG. 36, there is shown the row address select (RAS) decoder and fan-out unit 640. The fan-out circuit 640 comprises a RAS fan-out section 641 having a RAS fan-out decoder circuit 642 coupled to the red memory plane 84, a RAS fan-out decoder circuit 643 coupled to the green memory plane 86, a RAS fan-out decoder circuit 644 coupled to the blue memory plane 88, and a RAS fan-out decoder circuit 645 coupled to the overlay memory plane 90. An input row address select signal is input to the section 641 on a RAS input line 646. The decoder section 641 includes four one-of-eight decoder circuits 642-645. Moreover, each decoder, and for example the red decoder 642, includes an output for driving each of the five banks of the red image memory plane 84. The green, blue and overlay decoders 643-645 have outputs similarly connected to drive their respective five banks of memories. The red RAS decoder 642 is enabled by a signal identified as plane(R). The green, blue and overlay decoders 643-645 are comparably enabled by the respective signals, plane(G), plane(B) and plane(OV). Further, each decoder 642-645 includes a bank select input comprising three signals for determining on which output the RAS signal should be coupled. The RAS decoder circuits 642-645 include output drivers having capabilities for driving a relatively large load capacity with high speed signals. Integrated circuit types identified as 74F138, obtainable from Texas Instruments, are decoders having suitable output drive capabilities. While not shown, the output of each RAS decoder 642-645 includes a thirty-three ohm resistor in series therewith to reduce any overshoot and ringing of the row address select signals. This concern can be appreciated in highspeed circuits as each RAS decoder output line drives sixteen video DRAM integrated circuit chips.

FIG. 36 also illustrates a decode section 647 for generating the serial output enable (SOE) signals for the red, green, blue and overlay planes of the image memory 82. The serial output enable signals control the high impedance state of each serial shift register output of each of the video DRAMs of the image memory 82. Thus, when the various serial output enable signals are active, the corresponding serial output of the memory chip is inhibited from producing serial data on its output.

There, bank select signals are connected to an octal register 648 which includes temporary storage for the bank select signal. The output of the octal register 648 is connected in parallel to four 1-of-8 decoders 649–652 corresponding to the three color and the overlay planes of the image memory 82. A shift clock (SCLK) signal is also input as a clock signal to the octal register 648, and a shift register output enable (SOLE) signal enables the operation of the octal register 648. Essentially, when the SOLE signal is active, the bank select signal is shifted from the input of the octal register 648 to its output on the occurence of the shift register clock signal.

Connected to each of the SOE decoders 649–652 is an image memory disable signal which is coupled to one of the outputs of each such decoder 649–652, depending upon the decoding of the bank select signal. With this arrangement, either one bank of each color memory plane will be enabled for output to the video processor 106, or the other bank will be enabled for output to the video processor 106.

Figure 37:
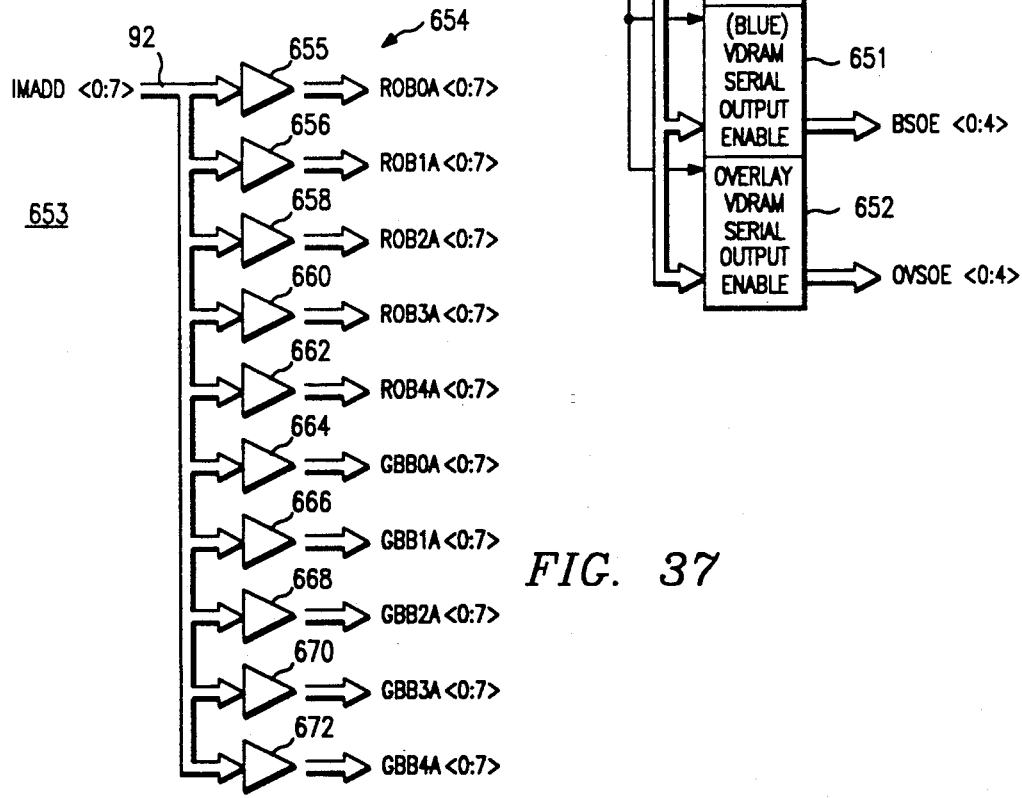

FIG. 37 illustrates a fan-out buffer circuit 653 provided for branching image memory addresses on the 8-bit image memory address (IMADD) bus 92 to ten corresponding 8-bit address buses 654 directed to the corresponding image memory planes 84–90. One group of five buffer-drivers 654–662 provides 8-bit memory addresses to the red and overlay memory planes. Buffer-driver 654 supplies memory addresses to bank 0 of the red and overlay memory planes. Buffer-driver 662 supplies memory addresses to bank 4 of red and overlay memory planes. In like manner, buffer-drivers 664–672 supply memory addresses to bank 0–bank 4 of the green and blue memory planes. Drivers suitable for driving the video DRAMs of the invention are identified as type AM2966, manufactured by Advanced Micro Devices.

Figure 38:
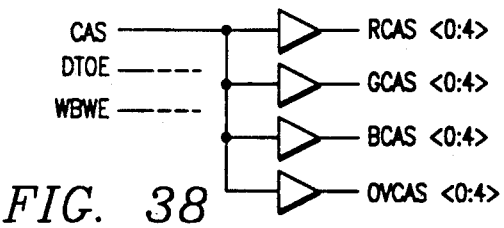

FIG. 38 illustrates a fan-out buffer section 674 for generating the red, green, blue and overlay column address select signals from a single column address select (CAS) input. The CAS driver section 674 generates column address signals for the five banks of the red memory plane 84. The column address signals for the five banks of the green, blue and overlay planes are comparably generated. A data transfer or output enable signal (DTOE) and a write bit/write enable (WBWE) signal are also connected to a fan-out buffer circuit 674 for driving the various banks of each of the image memory planes.

Figure 39:
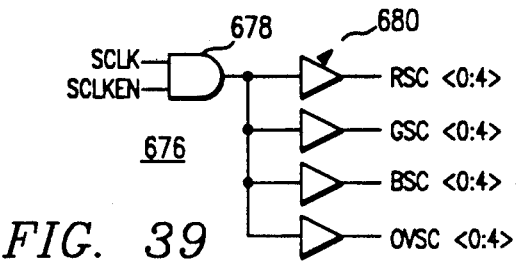

FIG. 39 illustrates yet another driver section 676 for driving the shift control inputs of the video DRAMs which form the image memory 82. An AND-gate 678 is connected to the input of the four drivers. One input of the AND-gate 678 is connected to a shift clock (SCLK), while the other input thereof is connected to a shift clock enable (SCLKEN) signal. In this manner, when the shift clock enable signal is active (low), the shift clock signal is transferred through the AND-gate 678 to the input of each of the drivers 680. Drivers of the type AM2966 are suitable for use in driving the shift control signals to the various video DRAMs. The output of one driver is connected to five banks of the red image memory plane 84 for providing shift register control of the video DRAMs within such section. The output of another driver is connected to the five banks of the green image memory plane 86 for providing similar shift register control to the video DRAMs associated therewith. Each of the five banks of the blue and overlay image memory planes 88 and are provided in a comparable manner for shift register control.

The integrated circuit memories forming the storage medium of the image memory 82 comprise video dynamic random access memories (VRAMs). In the preferred form of the invention, each VRAM comprises a memory having 256k storage cells. The memories are further characterized in that there are 64k addressable locations, each associated with a 4-bit word. Thus, whenever the VRAM device is accessed, four bits appear at its output. Video DRAMs suitable for use with the invention are identified as type MB81461-15, manufactured by Fujitsu. Other video DRAMs are available and suitable for use with the invention.

Figure 40:
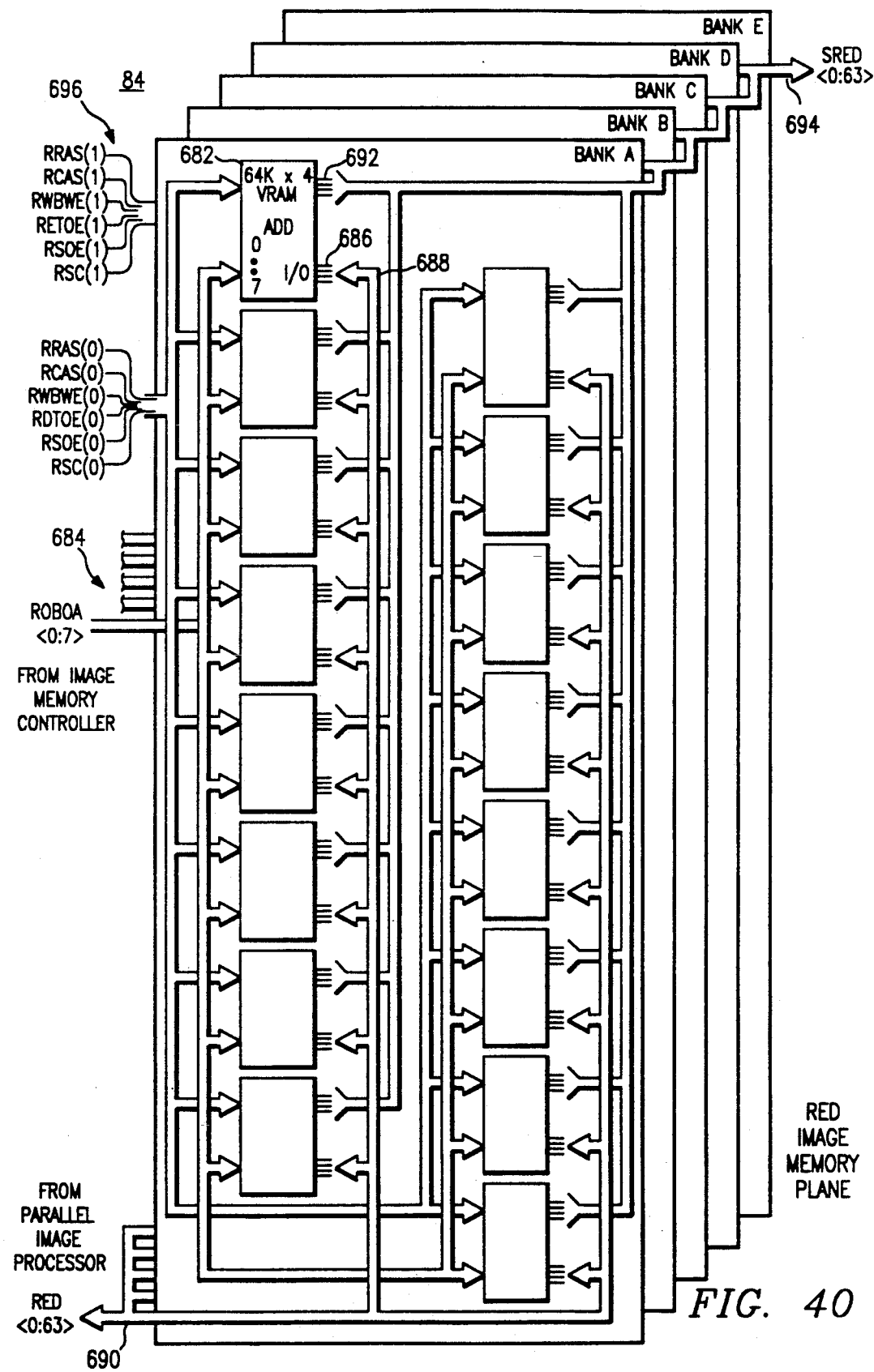
FIG. 40 illustrates the bus arrangement for connecting a number of video DRAMs together to form a memory bank, and the connection arrangement of five banks to form an image memory plane.

In FIG. 40, there is shown the image memory red plane 84, divided into five banks, i.e., bank A–bank E. The construction and interconnection of the memory circuit banks B–E are substantially identical to that shown in detail with respect to bank A. Banks A–E of image memory plane 84 include video DRAM memories for storing color information concerning red spectral colors of the image. Bank A includes sixteen video DRAM integrated circuits, one shown as reference character 682, for storing 256k bits of image color information. Each video DRAM includes a number of inputs for controlling the reading, writing, refresh and clocking of the integrated circuit. Each control input of bank A is connected in parallel to the corresponding control inputs of the other integrated circuit memory devices located on the bank. Each integrated circuit memory device 682 further includes an 8-bit address input 684 for receiving multiplexed column and row address information. Again, the address inputs 684 are connected in parallel to the other integrated circuit memory devices of the other banks B–E. The memory integrated circuit chips 682 of the type identified above include an input/output (I/O) 686 which is bidirectional for providing an input for writing image color data into the memory integrated circuit, or for providing an output so that when read, the parallel color data can be transferred to the respective parallel image processor 74.

As noted in FIG. 40, the integrated circuit memory devices 682 on the left side of bank A are shown with the respective I/O terminals 686 connected in common to the other I/O terminals of the eight memory devices on the right side thereof. The common bus is identified as reference character 688. The eight integrated circuit memory devices on the left hand side of bank A provide thirty-two I/O terminals, while the memory devices on the right of bank A provide the other thirty-two bits. Together, a 64-bit memory data bus 690 is provided. Bus 690 is connected to the parallel image processor 74. The four 64-bit buses extending from the image memory 82 to the parallel image processor 72 are noted in FIG. 3 as reference character 83.

Each video DRAM of bank A further includes four serial data outputs, generally designated by reference character 692. Each of the four outputs of the eight integrated circuit memories shown on the left of bank A comprise a 32-conductor output bus connected, in like manner, to the four serial data outputs of each of the integrated circuit memories shown on the right hand side of bank A. A 64-bit output serial data bus 694 is thereby provided. The 64-bit output bus of each of the other banks B-E is connected together, on a per bit basis, to form an output 64-bit bus 694 directed to the red video processor 110.

With regard to bank B of the image memory red section 84, a separate input control bus 696 is provided for driving the sixteen integrated circuit memory devices thereof. While not shown, banks C–E are similarly provided with separate input control signals. The 8-bit address bus 684 is also connected in common to the address inputs of each of the sixteen memory devices of each of the banks B-E. The 64-bit input/output RED bus of banks B-E are connected in parallel to the respective input/output terminals of bus 690. With this arrangement, image color information can be read or written to the memories in each bank A-E of plane 84.

It is to be noted that each 64-bit serial input/output bus, such as bus 690, of each memory plane, is connected to a respective parallel image processor. Each data output bus, such as bus 694, of each memory plane is connected to its respective video processor. Hence, there are provided four independent data processing sections, each processing different color information; and in the case of the overlay section, the processing of other data information.

Banks A-E of image memory plane 84 are arranged so that image color information is represented by a pixel having eight bits of color data. Hence, two integrated circuit memories are written by the parallel image processor 74 so that four bits of pixel color data are stored in one integrated circuit memory device, while the other four bits of the pixel color data are stored in another integrated circuit memory. Hence, the simultaneous 8-bit output of two of the video DRAMs represents a pixel with certain image color data. When Bank A is selected by the image memory controller 68 to be read, the 64-bit output thereof, comprising SRED (0:64) provides 8-bit pixels to the video processor 110 which processes the red spectral image data.

In operation, when it is desired to perform a data transfer of image color data from, for example, bank A of the red image memory plane 84, the image memory controller 68 causes the plane (R) signal to enable the red RAS decoder, and the appropriate bank select signal is applied thereto which, together with the occurrence of the RAS signal, provides an output RRAS (0) signal for providing a row address signal to bank A of the red image memory plane 84. Significantly, all memory cycles are controlled by the image memory controller 68, and are initiated on the falling edge of the row address strobe (RAS). An RRAS (1) strobe is not generated, thereby rendering bank B of the image memory plane 84 inactive during bank A accesses. The other necessary timing signals, such as the RCAS (0), RDTOE (0) and RSC (0) are generated for effecting an internal data transfer within each integrated circuit memory device 682 of bank A. Also, column address and row address information is multiplexed onto the ROBOA (0:7) bus for accessing a particular 4-bit memory location of each integrated circuit memory of bank A. As a result, data is internally read and transferred to a shift register internal to each integrated circuit memory device 682. The shift register clock (SCLK), as generated by the video processor 106, and the shift register output enable (SOLE), as generated by the image memory controller 68, are activated for shifting data onto the 64-bit SRED (0:64) output bus 694. The detailed timing of the addresses and control signals required to operate the video DRAMs can readily be determined by those skilled in the art by reference to the published data sheets of the particular type of memory device utilized. The foregoing memory operation is an important feature of the invention, in that the image memory 82 is under control of the image memory controller 68 for reading image intensity data into a memory shift register, internal to the VRAMs of the image memory 82. The internal shift registers are controlled by a clock (SCLK) provided by the video processor 106 for transferring the pixel color data from the shift registers to the video processor 106.

The input/output port 686 of each of the integrated circuit memory devices 681 can be utilized in conjunction with read and write operations for transferring image color data between the image memory plane 84 and the parallel image processor 74. During read operations of one of the banks A-E of the image memory section 84, image color data is transferred from the I/O output 686 to the output bus RED (0:64) 690 and then to the respective parallel image processor 74. During write operations of the image memory plane 84, wherein the input/output 686 is active, image color data is transferred from the parallel image processor 74 via the bus RED (0:64) 690 to the selected integrated circuit memory devices 682.

The video DRAM memories, being a dynamic type of memory, require a periodic refresh which is accomplished via the DRAM refresh controller 232 described above in connection with the image memory controller 68.

While the foregoing has been described in connection with a single parallel image processor 74 and associated image memory plane 84, the other similar processor and memory plane sections are substantially identical in construction and function. It is important to realize that when a pixel is to be displayed on the video monitor 28, the appropriate red, green and blue image memory planes will be accessed to provide image color data for reproducing either the original image or a changed image. Also, the overlay memory plane 90 is substantially identical in construction and function with that of the image memory color planes 84–88, and also operates with a dedicated parallel image processor 80 and video processor 116.

Error Detection and Correction

Figure 41:
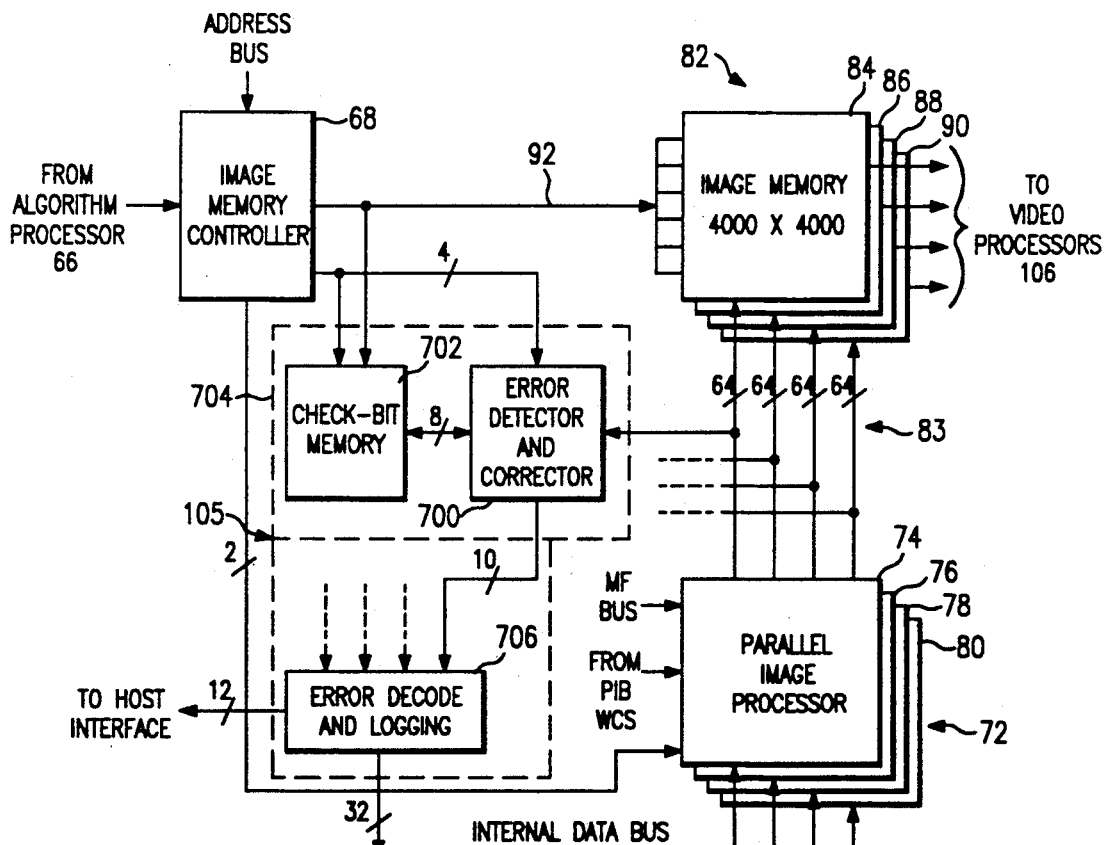
FIG. 41 illustrates in electrical schematic form the error detection and correction unit of the invention.

The error detection and correction (EDC) circuit 105 is shown in detail in FIG. 41. The EDC circuit 105 includes an error detector/corrector 700 and a check-bit memory 702 associated with each plane of the image memory 82. As noted above, the preferred form of the invention includes four image memory planes 84–90, each associated respectively with one of the four parallel image processors 74–80. Accordingly, four such error detector and corrector and check-bit memory circuits 704 are required. The EDC circuit 105 additionally includes a single error decode and logging circuit 706 operating in conjunction with the four noted circuits 704. With this arrangement, error detection and correction can be maintained over all of the 64-bit image memory words communicated between the image memory 82 and the parallel image processor set 72. As will be discussed in more detail below, error detection and correction is maintained over the entire contents of the image memory 82, including pixel data, coefficient data, instructions, temporary pixel data processing results, etc.

The illustrated error detector/corrector 700 of the EDC circuit 105 is connected by a 64-bit bus to an associated red image memory plane 84 and red parallel image processor 74. The error detector/corrector 700 is adapted to monitor any type of data communicated therebetween. The image memory controller 68 is coupled by a 4-bit control bus to the error detector/corrector 700, as well as to the check-bit memory 702. Information communicated on this bus from the image memory controller 68 to the EDC circuit 105 is in the nature of correct signals, output enable signals and latch enable signals. In addition, image memory addresses carried on the image memory address bus 92 are coupled to the check-bit memory 702. The check-bit memory 702 has a number of addressable locations equal in number to those of the image memory plane 84 associated therewith. Accordingly, the addresses which are employed to access the plane 84 of the image memory 82 are also utilized to access associated locations in the check-bit memory 702.

The error detector/corrector 700 comprises a pair of two 32-bit error detection and correction integrated circuit devices, cascaded together to provide a 64-bit unit. In the preferred form of the invention, the error detector/corrector devices comprise integrated circuit chips identified as IDT 49C460A, obtainable from Integrated Device Technology, Inc. The error detector/corrector devices are of conventional design adapted for generating eight check-bits corresponding to the 64-bit image memory word carried on the respective memory data bus 83. The check-bits are computed by the error detector/corrector 700 utilizing a modified Hamming code algorithm. The check-bits are communicated on an 8-bit bus to the check-bit memory 702, and stored therein at addresses associated with those of the image memory plane 84. The 8-bit bus is bidirectional so that check-bits read from the check-bit memory 702 can also be transferred to the error detector/corrector 700. Also provided by the error detector/corrector 700 are eight syndrome bits which are address related, one bit signifying a single bit error, and other bit signifying multiple bit errors which may have occurred. The composite ten bits are coupled to the error decode and logging circuit 706, as are three other 10-bits buses from the other three EDC circuits. The error decode and logging circuit 706 is a programmable array logic device, programmed for decoding the syndrome addresses, and latching the faulty data therein. A 2-bit output is provided from the error decode and logging circuit 706 to the host interface 52 for communicating information concerning faults in the data transmission between the image memory 82 and the parallel image processor set 72. A 32-bit bus is utilized to communicate data fault information, via the internal data bus 70, to other processors of the system.

In operation, when a write operation of the image memory 82 is initiated by the image algorithm processor 66, address information is caused to be transferred from the image memory controller 68 to the image memory 82, while data information is caused to be transferred from the parallel image processor set 72 to the image memory 82. Concurrently, address information is passed from the memory address bus 92 to the check-bit memory 702, while data information is passed from the pertinent image memory data bus 83 to the error detector/corrector 700. On the detection of memory write signals, such as RAS, CAS and WE, the error detector/corrector 700 generates a number of check-bits based upon the particular arrangement of data bits transferred from the parallel image processor set 72 to the image memory 82. The check-bits are transferred from the error detector/corrector 700 to the check-bit memory, and written therein at the address then existing on the memory address bus 92. For each location of each plane accessed in the image memory 82 on write operations, check-bits are stored at the corresponding addresses in the check-bit memory 702.

For read operations of the image memory 82, the addresses carried on the memory address bus 92 are also presented to the check-bit memory 702, while data output from the image memory 82 is presented to error detector/corrector 700. In response to image memory read operations, the error detector/corrector 700 initiates two actions. First, a second set of check-bits are generated from the data read from the image memory 82. Secondly, the check-bit memory 702 is read at the address corresponding to the accessed location of the image memory 82, whereupon the check-bits previously stored in the check-bit memory 702 are transferred to the error detector/corrector 700. The newly generated check-bits are compared with the stored check-bits to determine equivalency. On a determination of equivalency, the image memory controller 68 transmits signalling information to the parallel image processor 66 to latch therein the data read from the image memory 82. The error detection and correction functions are thus transparent to the parallel image processor set 72.

If, on the other hand, the comparison of the newly generated check-bits with the stored check-bits indicates a difference, circuits within the error detector/corrector 700 determine whether the error constitutes a single or multiple bit error. Also, the bank and plane in which the error was detected is noted. The location corresponding to the faulty data is defined in terms of a specific bank and plane of the image memory 82. Information concerning the address of the data believed to be in error, as well as single or multiple bit types of error indications, is transferred to the error decode and logging circuit 706. The error decode and logging circuit 706 further decodes the syndrome information coupled thereto in order to further define the bit(s) at which a data error was detected. The error decode and logging circuit 706 is programmed to provide the host interface with information concerning the nature of the data error. If the error is of a single bit error type, the error detector/corrector 700 computes the corrected data, and outputs the same on the image memory data bus 83 to the associated parallel image processor. As a result, the parallel image processor receives the corrected data. On the detection of multiple-bit errors, such condition will be conveyed to the host interface, via the error decode and logging circuit 706 so that appropriate action can be taken. Such appropriate action may be in the nature of another read operation of the image memory 82 at the same address to determine if such data is then correct. Other action may constitute the retrieval of data from a storage disk 44 to rewrite the image memory 82 therewith.

While the EDC circuit 105 of the invention is illustrated for purposes of example only, those skilled in the art may find it advantageous to utilize variations thereof. For example, by utilizing additional check-bits, data read from the image memory 82 having more than one bit in error may be corrected accordingly. In addition, error detection and correction schemes may be utilized in connection with image memory words of greater than or less than sixty-four bits.

In the preferred form of the invention, error detection and correction is conducted over every read and write operation of the image memory 82. Thus, other than image pixel data may be monitored to ascertain whether errors are present. Since, in the preferred form of the invention, the image memory 82 stores coefficient data, cursor data, virtual processing parameters, transient results of calculations, etc., as well as image pixel data, all such data undergoes the monitoring for errors. The technical advantage presented by this feature is significant, in that the ramifications of errors in such data may be very significant. For example, if an alpha particle strike in one of the VRAM memories causes an error in coefficient data stored therein, a subsequent convolution process using the coefficient could produce an error in the entire image. When such a convolved image is processed according to a different algorithm, then certain parts thereof may be damaged. In any event, the significance of a change or distortion in the image can be very significant, especially when processing images relating to the medical field. For instance, in processing images comprising X-rays, or the like, a distorted or damaged image may be misinterpreted by medical personnel, and thus a wrong diagnoses can result. Accordingly, the error correction and detection of data other than image pixel data provides an important advantage of the invention.

Image Memory Manager Unit

In accordance with another feature of the invention, there is provided an image memory management unit 154, as illustrated in FIGS. 42 and 43. The image memory management unit 154 of the invention is advantageous for allowing image processing operations to be performed on images larger than the available physical memory of the system. For example, an image requiring 5K×5K of memory can be processed with a system having a memory buffer of 2K×2K addressable locations. With such a feature, users are freed from the burden carrying out special memory allocation procedures. In addition, the processing of an image is made independent of the configuration and storage capacity of a particular memory system of an image computing system 22. As a result, there is provided an efficient sharing of memory space between different image objects to achieve a high access rate and a low cost per bit of memory. In accordance with the image computing system 22 of the invention, the on-screen memory 216 (FIG. 6) of the system is addressable by addresses which are calculated by the multiplier-adder circuits 146-150 and window clipping circuit 152 of the image algorithm processor 66. The image memory management unit 154 of the invention also calculates the memory addresses for the off-screen memory 214 of the system.

The image memory management unit 154 functions primarily to manage areas of the memory, termed pages or "tiles", and to translate logical memory addresses into physical memory addresses in a manner such that a user or programmer need not be concerned with the boundaries of an image made up of the various tiles. In processing a large image, such as in a convolving process, the addresses of the image memory 82 are continuously monitored to verify that a portion of the image under current processing resides in the physical memory. In contrast with conventional data processing memory management units, the present system is adapted for managing two dimensional memories, typical of image processing systems having memory sections which are selectably addressed by "X" and "Y" addresses. In prior memory management architectures, the only concern was the allocation of a block of one dimensional memory addresses. As will be described in more detail below, tiles of the image can be quickly and efficiently exchanged between the large logical or virtual disk memory area and the smaller physical memory area of the image memory 82 as need be, and made available to the user. This process is transparent to the user, in that no special provisions need to be made with regard to whether or not the image tile is resident in the physical memory.

The image memory management unit 154 of the invention is adapted for accommodating the processing of plural tasks, processes or objects. In the context of the present invention, a process is defined as an unrelated unit of work, generally spawned by another application. Objects define a virtual address space comprising multiple tiles associated with a single image. A page, or tile, is a portion of the overall image and refers to a physical N×N area of contiguous memory, where N is typically a power of "two". A current context defines the process associated with a group of objects and tiles. Each process may have access to different images, and each image may have multiple tiles present in the memory. The flexibility of the memory management unit of the invention is thus apparent.

The functions of the memory management unit 154 of the invention are depicted, in simplified form, in FIG. 42. First, and as noted in flow block 710, the image processing system of the invention computes a physical address, after having received X, Y logical addresses, process number and object index from the image algorithm processor 66. The object index and the process number form an address into an object index look-up. The process number is a registered value and the relative object number originates from the microcode word typically representing the relative source, mask or destination of the image. This index addresses the absolute object numbers for the current process. In this manner, the microcode program performing the image operation is independent of the image objects it uses. The output of the object index look-up table is the absolute object number. This table is updated in the process of allocating memory for tiles of a given object of a given process.

With reference again to FIG. 42, in the event that the memory address word is not found in memory, the normal operation of the image processing system is interrupted 718, and a determination is made 720 whether or not the page or tile of memory to be accessed is free. If such memory page or tile is free, then such page is brought 722 into the physical memory and a page table is updated 724. The page table indicates which pages or tiles are currently active, and therefore can be replaced by other pages or tiles, as the need arises.

If a page is not free, as noted by the decisional block 720, then a page select function is conducted 726, whereupon it is determined 728 whether or not the desired image memory tile is dirty. The term "dirty" refers to a tile which has been written to and the copy of the tile on disk does not match the corresponding tile in memory. On a negative determination thereof, control is branched to the block 722 for bringing in a new page of memory. If the memory is dirty, the dirty page is written 730 to the disk before the image space is reallocated. As will be detailed below in connection with the electrical circuits of the image memory management unit 154, the translation functions are carried out quickly and efficiently so that such tile swapping is essentially transparent to the user.

FIG. 42 is illustrative of the image memory management apparatus 154 for mapping logical memory addresses into physical memory addresses. The apparatus includes an object index look-up table (LUT) 732, having a pair of inputs identifying an object index and a process number. The object index LUT 732 may comprise a RAM with an output connected to the input of a content addressable memory (CAM) 734. The CAM 734 includes additional inputs identifying the process number, X-tile and Y-tile coordinates. The X and Y-tile coordinates are generated by inputting respective logical X and logical Y addresses to a pair of respective shifter circuits 736 and 738 to extract the most significant bits of the logical XY address. The shifter circuits 736 and 738 have as additional inputs the tile size to determine the amount of shifting. The output of the shifter circuits 736 and 738 comprise the respective X and Y tile coordinates. The output of the content addressable memory 734 comprises a hit address indicating that the address is located within the CAM 734. If no address can be found in the CAM 734 as a result of the noted address inputs, the CAM 734 provides an output indicating a tile fault or a memory exception.

The hit address output of the content addressable memory 734 is provided as an input to a cache parameter memory 740. The cache memory 740 provides outputs comprising protection flags, plane and bit masks and physical address offsets for the desired tile. The physical X, Y address offset output of the cache parameter memory 740 is input to a two-input adder 742. The other input to the adder 742 is generated as a result of the appropriate shifting of the logical X and Y addresses, combined with masks data in logic NAND circuits 744. The result of the logic AND circuits is logically ORed 746 and provides the least significant bits of the X and Y addresses merged together to form an offset into the tile of interest as the input to the adder 742. The output of the adder 742 represents a physical address employed by the image algorithm processor 66 for addressing the image memory 82.

In operation, logical X and Y addresses are input to the right shifters 736 and 738 to generate a tile coordinate pair number. In the preferred form of the invention, the entire logical or virtual memory space is divided into a desired number of pages or tiles. Large images may comprise multiple tiles which reside in the virtual memory, which may be a disk storage medium. The tile boundaries are constrained to modulo eight boundaries so that multiple tile access is not required during access of a single pixel word in the memory. Thus, with all tiles of the same power of two size, the right shifters 736 and 738 are utilized to proceed from one tile to another, simply by executing appropriate right shifts. The output of the right shifter 736 comprises a 16-bit Y tile coordinate, and the output of the right shifter 736 comprises a 16-bit X tile coordinate which, together, provide a 32-bit tile coordinate pair. The tile coordinate pair, together with the process number and the output of the object index LUT 732, define composite bits which form an address for addressing the content addressable memory 734.

The content addressable memory 734 and the cache parameter memory 740 function as a high speed associative memory to quickly determine if the memory address is located in the physical memory, or whether there exists a tile for such address. This arrangement is shown as 741 and is often referred to as a table lookaside buffer (TLB). With this arrangement, there are no tile boundary problems, and according to the manner in which the tiles are defined, and the addressing thereof, the image memory buffer appears as though all the virtual memory is available for prompt processing. Importantly, every pixel can be addressed in line, without concern of edge effects or tile boundaries.

The content addressable memory 734 achieves a fast parallel search to provide a high-speed output. The content addressable memory 734 is of conventional design to achieve the global (parallel) address search and comparison over a number of cells to provide an output hit address, if any. If none is found, a tile fault is produced. A tile fault is produced in two situations, (1) indicating that the requested tile is in the memory, but not referenced in the TLB 741, due to its limited storage area; and (2) indicating the tile is neither in memory nor is it in the TLB 741. The determination of the particular type of fault is determined by a conventional routine, such as conducting a table walk to find if the tile is located in memory, but not referenced in the TLB 741.

The cache parameter memory 740 comprises a conventional high-speed random access memory. The cache parameter memory 740 functions primarily to convert the hit address of the CAM 734 into a physical X, Y address offset output, a plane and bit mask, as well as protection flags. The plane and bit masks indicate which part of the physical memory is writable, i.e., not protected. Each object location in the TLB 741 contains a dirty bit flag, object reside flag and the base address for the object block in physical memory.

The object reside flag indicates the desired tile is in the physical memory, as noted by decisional block 712, and the address generation continues by fetching 714 the memory word, processing 716 the fetched memory word and continuing with the program. If, on the other hand, the object is not in physical memory, an interrupt will be generated at the next sequencer cycle to address the memory exception. Handling of memory exception cases will be discussed in detail below.

From the foregoing, the image memory management unit 154 is adapted for managing large two-dimensional image memories for processing large images. In addition, the memory management unit and method thereof is adapted for managing the allocation of the image memory to accommodate multiple tiles, objects and multiple processes.

Video Output Section

The video output section 106 receives the image color data read from the image memory 82 and converts such information into true color video signals. A constant stream of video signals are coupled to the monitor 28 to provide modulation of the monitor raster scanning apparatus to reproduce the image on the display screen. The video output section thereby provides an interface between the image memory 82 and an output device which, in the preferred embodiment, comprises a color display 28.

The video output section 106 includes four distinct video processors 110-116, each associated with the processing of respective red color information, green color information, blue color information and overlay information. FIG. 44 is a block diagram illustrating the functional units within one such video processor, and the interconnections between the other circuits of the image computer 22. For purposes of illustration, the video processor of FIG. 44 comprises a processor which processes red color information from the red image memory plane 84. The other three video processors 112-116 are comparably constructed and function in a similar manner.

The red video processor 110 includes a TTL/ECL translator 750 connected to the 64-bit image memory output data bus 752 carrying TTL pixel data signals, and converting the same into ECL logic levels. A sync signal, a blank signal and a video processor chip select (VPCS) signal are also input to the TTL/ECL translator 750 for converting the TTL levels thereof to ECL logic levels. The sync and blank signals are generated by the image memory controller 68 and function respectively to indicate the blanking interval on the display 28 and the video sync signal. The VPCS signal generated by the image algorithm processor 66 functions to enable or disable the video processor 110 when the image memory data bus 752 is to be used for purposes other than carrying image color information from the image memory plane 84 to the video processor 110. For example, and to be described in more detail below, addresses from the address bus 104 and data from the internal data bus 70 can be driven onto the image memory data bus 752 and processed through the video processor 106 for reading or writing the look-up tables 108.

A substantial portion of the video processor 110 is constructed of high-speed ECL logic to provide the data processing capabilities necessary. Also, ECL logic is highly desirable for its high speed operation and ease in providing logic functions using a wired-OR output connection between various circuits. The high speed requirements of the image computer 22 can be appreciated when it is realized that the master clock of the system functions at a 107 megahertz rate, or at about a 9.3 nanosecond clock rate.

The red video processor 110 includes a timing and control unit 754 which receives a master clock (MCLK) input and generates therefrom various clock signals used throughout the video output section 106. In actual practice, the MCLK signal and a MCLK*ECL signal are applied to the timing unit 754 for providing a differential 9.3 ns clock signal to the timing unit 754. The timing and control unit 754 provides all the timing and signal generation features of the red video processor 110, and includes programmable circuits for supplying a delay to the sync and blank signals for pixel panning purposes. Also, the timing and control unit 754 provides a number of programmable registers for supplying variable timing and control signals. For example, a pair of n-bit binary counters, which produce a ripple carry signal, comprise generators for a processor clock (PCLK) and a dot clock (DCLK). The PCLK signal is characterized by a fifty percent duty cycle signal which defines the minimum processing interval for the image memory controller. A DCLK signal is programmable to be equivalent to the master clock. The shift clock (SCLK) is generated by a 3-bit binary counter with a ripple carry for producing a fifty percent duty cycle signal which is translated into a TTL signal for use in clocking the image memory controller 68. An ECL level signal is also generated for use as a video processor shift register signal. To be discussed in more detail below, the video processor shift register converts the 64-bit image memory color value data into high-speed 8-bit serial pixel data.

A look-up table enable unit 756 includes circuits for controlling the selection of the desired random access memory chips of the look-up tables 108. The write enable signals of the look-up table memories are also controlled by the enable unit 756. A number of signals, such as an address mode, register select bits, data strobe and read/write commands are received by the look-up table enable unit 756 from a bus interface unit 758. The LUT enable unit 756 also includes an input concerning underlay or overlay select (ULY/OLYSEL) signals. The underlay or overlay select signal is derived from the logic look-up table driven by the overlay plane data which is stored in the image memory 82. The underlay/overlay select signal is used for selecting whether look-up table data from the color tables or the overlay table should be output as video image intensity data to the display monitor 28. In connection with this function, the look-up table enable unit 756 includes an LUT address enable (LUTAEN) signal which is coupled to the bus interface unit 758 for indicating a particular LUT address mode in which the look-up tables 108, which are indirectly controlled by the respective video processors, require addressing data information, but which do not require write enable or chip select information. A write enable signal (LWE) is also generated by the look-up enable unit 756. The LWE signal is derived from a read/write, data strobe and address mode signal of the bus interface unit 758. The LWE signal is active only when the address mode indicates that one of the look-up tables 108, which is directly controlled by the video processor 110, is being accessed. The read/write signal indicates a write operation and the data strobe signal is also active.

The video processor 110 can operate in several modes defined by an operate mode and an address mode. In the operate mode, a particular look-up table, known as a logic table, is always enabled. In this mode, the color/overlay select signal and the look-up table type are used to determine which look-up table outputs will be sent to the display 28. This operation is conducted on a pixel-by-pixel basis as data flows through the video processor 110. The look-up table type is a semi-static value which can be programmed through a video processor register. The LUT type signal can be a logic 1 or 0 which may indicate that a look-up table is of the overlay type (logic 0). A logic 1 may indicate that the look-up table is of the color type. The color/overlay signal may also vary according to each pixel so that color look-up table outputs or underlay look-up table outputs are sent to the video monitor 28. The look-up table enable unit enables the appropriate look-up table output when the LUT type matches the color/overlay signal value.

As noted above, the enabling of the video processor 110 is accomplished by setting the state of the video processor chip select (VPCS) signal to a desired value. The VPCS signal is controlled by the image algorithm processor 66, or other resident processing element, and thus is effective to place the video processor 110 in an active or inactive state. When the VPCS signal is in a first or active state, the video processor 110 functions to process image memory pixel data and to couple a resultant signal to the look-up tables 108 for conversion into a true color signal for output to the video monitor 28. When the video processor 110 is placed in an inactive state, the image algorithm processor 66, or other resident processing element, can access the video processor 110 or those look-up tables which are controlled by the video processor 110. When the VPCS signal is placed in the second state, the parallel-to-serial shift register of the video processor 110 is rendered inactive, whereupon a bus access mode is initiated in which pixel color data is no longer processed by the video processor 110. Rather, the bus interface unit 758 allows external address, data and control signals to be employed for the reading and writing of the random access memories of the look-up tables 108. In the event a read operation generated extended to the video processor 110 is desired, data is read out of the look-up table memory 108 and coupled to the internal data bus 70 to the image algorithm processor 66. Addresses are supplied over the address bus 104 to the video processor 110 from the image algorithm processor 66.

While not shown in FIG. 44, interface transceivers 107 and 109 (FIG. 3) are connected between the 64-bit image memory output data bus, and both the internal data bus 70 and the address bus 104. In this manner, external address and data information can be coupled into the video processor 110 via the existing 64-bit image memory output data bus. An image memory disable signal is directed to the image memory 82 for disabling the output serial ports thereof when the 64-bit image memory output data bus is used in the manner noted for transferring address and data information to the video processor 110.

Data can be input to any of the look-up tables 108 by the 5-bit bus LI signal which comprise conductors associated with various conductors of the 64-bit data bus 752 output from the TTL/ECL translator unit 750. Internal to the bus interface unit 758 are a number of data transceivers 109 and address transceivers for connection between the 64-bit data bus 752 and the data bus internal to the video processor 110, as well as from the 64-bit data bus 752 to the system address bus 104. Such transceivers are shown in FIG. 3. The data transceivers are 8-bit bidirectional transmit/receive devices, identified as integrated circuit type 74F245. Such a device has eight I/O ports for connection to eight conductors of the 64-bit data bus of the red image memory plane. Another eight I/O ports of the device are connected to eight conductors of the internal data bus 70. The device can then be controlled to transmit data from the internal data bus 70 for writing into the red look-up table, or the red overlay look-up table. Conversely, the transceiver can be controlled for transmitting eight bits of data read from the red color table, or the red overlay table, onto the internal data bus 70.

Three other similar transceivers are connected between the internal data bus 70 and the respective image memory data buses to provide bidirectional transfer of data between the respective color look-up tables 108 and the internal data bus 70. In this manner, the look-up tables 108 may be written with data from the image algorithm processor 66 to establish a predetermined color scale or intensity mapping of pixel data in the look-up tables. To verify that such information is correct, the look-up tables 108 can also be read, and the resultant data transferred to the image algorithm processor 66 to determine the correctness thereof. Four bit address transceivers 107, identified as integrated circuit type 74F244, are also connected between the system address bus 104 and the respective 64-bit image memory output data buses to provide address communications between the image algorithm processor 66 and the respective video processors 106 and look-up tables 108. Of course, both the data and address transceivers 107 and 109 can be placed into an output high impedance state and thereby remain transparent to the image memory data output bus. This same arrangement is used for providing communications between the video processors 106 and the image algorithm processor 66 for programming various registers and counters within the video processors 106.

The TTL/ECL translator 750 and the bus interface unit 758 are constructed so that conductors 0-9 of the image memory data output bus 752 are TTL input/output compatible for carrying bidirectional data between the video processors 106 and the internal data bus 70. Image memory data output bus conductors 10-25 are configured as TTL input to the video processor 110, for carrying internal data bus addresses and control signals. Conductors 26-63 of the image memory data output bus are TTL input compatible to the video processor 110 for carrying exclusively image memory pixel color data.

With reference yet to FIG. 44, a clocked flip-flop 760 is shown for controlling the intensity or brightness of the output of each digital analog converter (not shown) connected to the output of the color look-up tables 108. If the output of the flip-flop 760 is active, the digital-to-analog converters produce a 10% increase in the intensity of the color signals transmitted to the video monitor 28.

The red video processor 110 of FIG. 44 further includes a shift register unit 762 which receives the 64-bits of pixel color data from the red plane 84 of the image memory 82, and converts the same into an 8-bit output. Depending on the look-up table configuration, up to ten output bits can be utilized. Particularly, 8-bit pixels are input simultaneously to the shift register unit 762 at a clock rate of about 74 nanoseconds. The shift register unit 762 serializes the pixel words into a series of 8-bit pixels at a 9.3 nanosecond rate. The pixels output from the shift register unit 762 are applied to the look-up tables 108 as address input.

Figure 45:
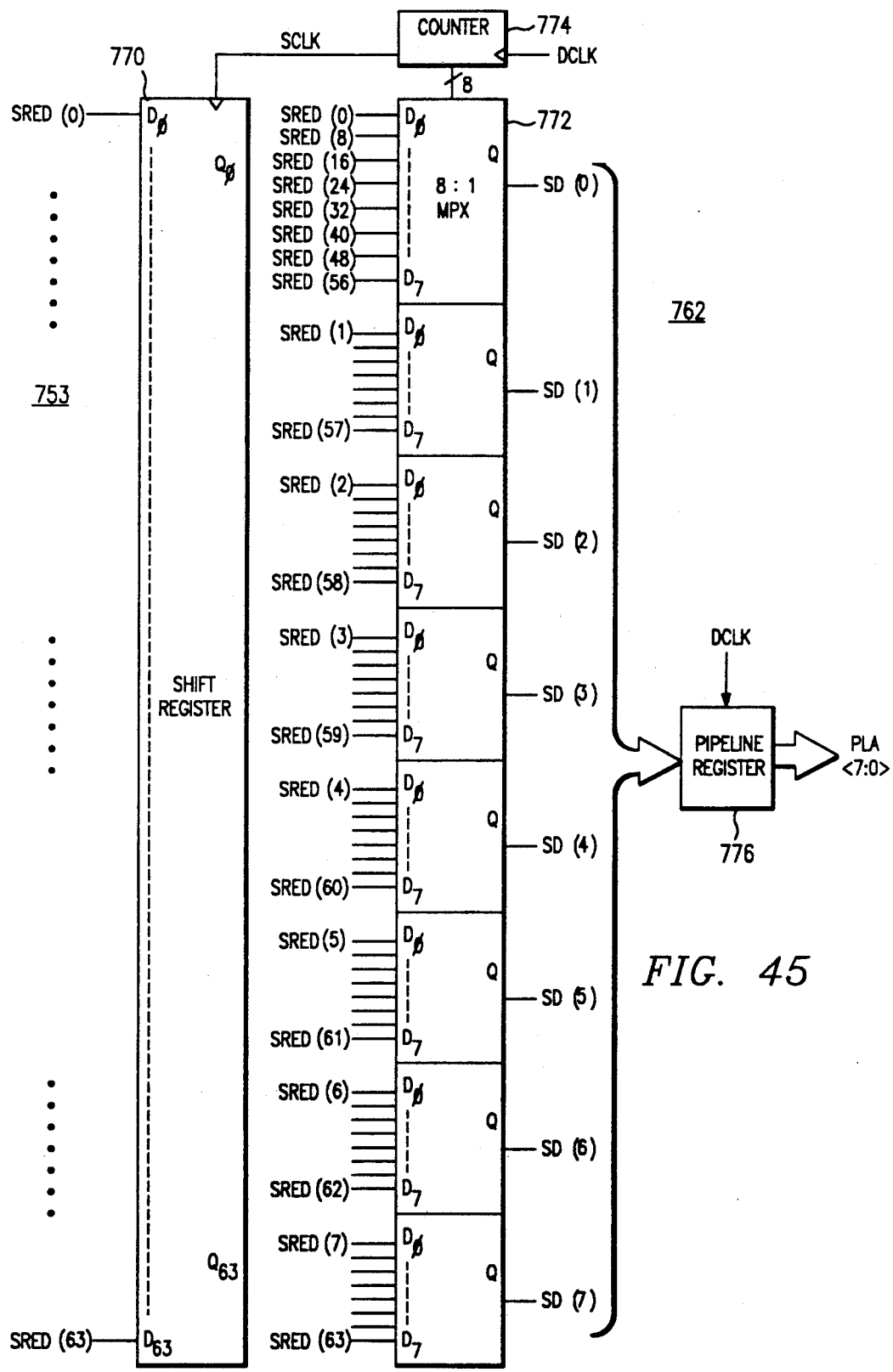
FIG. 45 illustrates the parallel-to-serial pixel conversion circuit of the video processor.

FIG. 45 illustrates a portion of the shift register unit 762 of the red video processor 110. The shift register unit 762 comprises a 64-bit parallel-in/parallel-out shift register 770, an eight section 8:1 multiplexer 772 clocked by a counter 774, and an output 8-bit pipeline register 776. The shift register 770 is internally connected to rearrange the sequence of bits SRED(0)-S-RED(63) into groups of 8-bit pixels, as shown at the output of the shift register 770. The shift register 770 is effective to convert the eight parallel pixels on DO bus 753 at a 74 ns clock rate. Thus, a new 64-bit pixel memory word is presented to the output of the shift register every 74 nanoseconds. Serialization of the eight parallel pixels simultaneously output by the red image memory plane 84 is accomplished by loading the parallel pixels from the data out (DO) bus 753 into the shift register 770 at the shift clock (SCLK) rate. The pixel bit are presented as eight bits groups at the output of the shift register 770.

The pixel bits are input to the eight section mutiplexer 772 with the first bit of each pixel connected to the D∅ input of each multiplexer. The second bit of each pixel is connected to the second input (D1) of each multiplexer, and so on. Thus, when each multiplexer is enabled to couple the first input thereof to the output, the first pixel is coupled to the pipeline register 776. On a second count of the counter 774, the second input of each of the eight multiplexers is coupled to the respective output to thereby transfer the second pixel to the pipeline register. The remaining six pixels of the eight pixel word are transferred in the same manner, after which the shift register 770 is loaded by SCLK with a new 64-bit memory word. The pipeline register 776 is clocked at the same rate, by DCLK, as the multiplexer section 772 so that an orderly flow of 8-bit pixels is transferred therebetween.

In actual practice, the multiplexer 772 comprises a large number of two, four and five-input ECL NOR-gates, arranged so that no more than two levels of logic circuits are encountered in the serialization of the image color data. The first level includes a number of NOR-gates and the second level of logic comprises a number of wired-OR connections. This arrangement forms the multiplexer 772 for conducting the serialization of the data. Other serialization schemes may be devised by those skilled in the art.

Due to the high speed operation of the multiplexer 772 which must be timed with the other shift register in the respective video processors, the pipelined register 776 corrects for any skewing between the timing differences which may occur between the various video processors 110–116.

Figure 46:
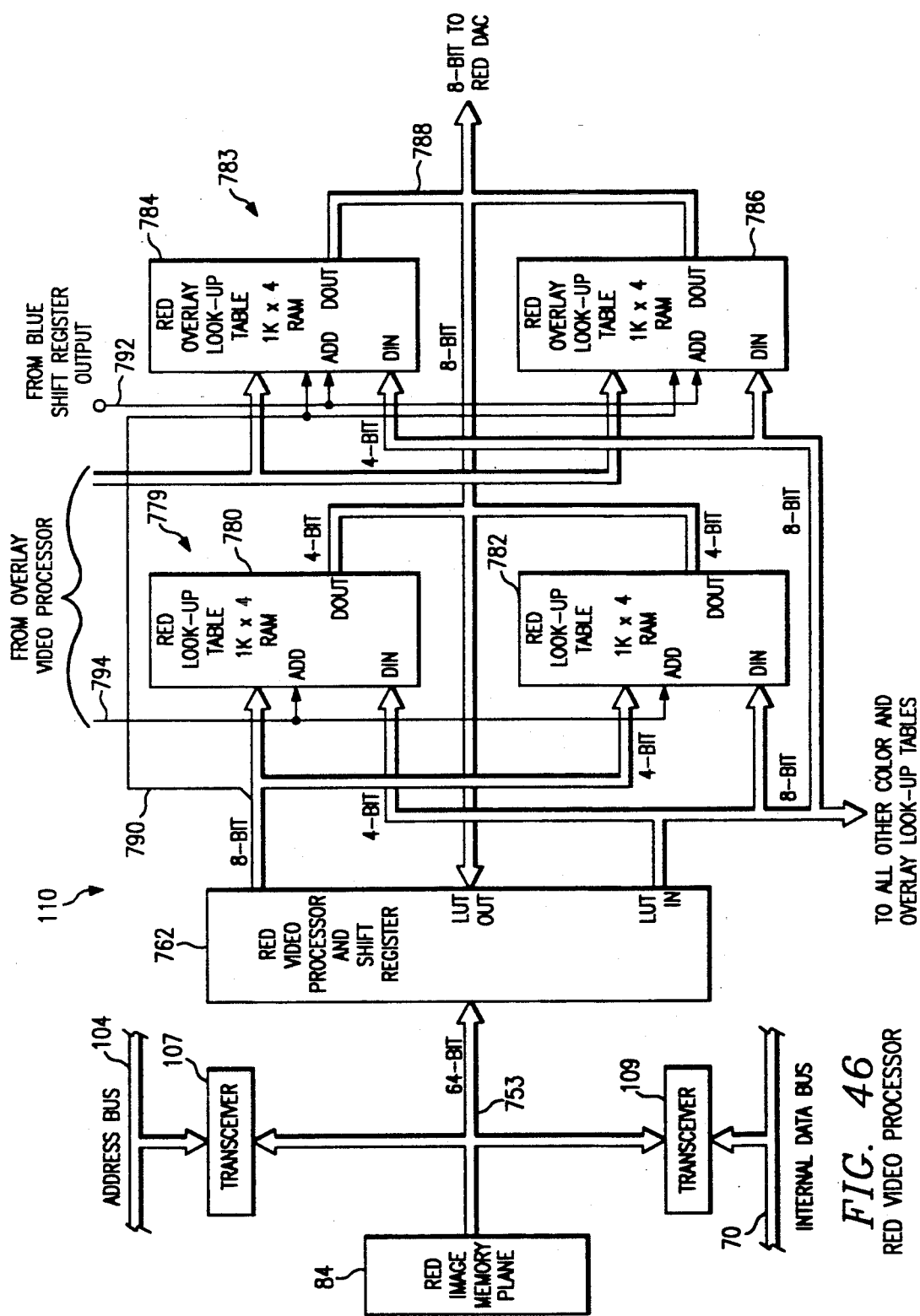
FIG. 46 illustrates the details, in block form, of the connection arrangement between an image memory plane, the video processor shift register section and the color and overlay look-up tables.

FIG. 46 illustrates a portion of the video output section 106 which processes data related to image color information for providing a video analog output of a color component to the color monitor 28. While the description of the invention involves the generation of red, green or blue color data for producing a color image on the monitor 28, a black and white image can also be produced by outputting the proper video signal levels of the respective red, green and blue colors. Particularly, if all the image color data corresponding to the red, green and blue colors are identical, a black and white image will be reproduced on the video monitor 28.

The shift register 762 serializes the red color information from the red image memory bank 84 into 8-bit pixels and transfers such pixel data to associated red look-up tables 780 and 782, comprising two 1K by 4-bit ECL dynamic random access memories. Memories suitable for use for the look-up table 780 are manufactured by Fujitsu, and identified as type 10474A. Each look-up table RAM includes a 10-bit address input, a 4-bit data input and a 4-bit data output. Not shown are the chip select and write/enable control signals which provide chip selection functions, as well as reading and writing control of such RAMs.

The red look-up table 780 and 782 includes two 1k by 4 RAMs to provide an 8-bit output comprising a color number representative of the true color of the pixel to be presented on the video monitor 28. To that end, the data out (DOUT) port of the red look-up table RAMs 780 and 782 are combined to provide an 8-bit word directed to the red digital-to-analog converter. The 8-bit bus is also coupled back to the red video processor 110.

The red overlay look-up table 784 and 786 is similar in construction to the red look-up table 780 and 782, and includes a pair of ECL 1k by 4 random access memories which provide a pair of 4-bit outputs. The outputs of the red overlay look-up table 784 and 786 are each connected in a wired-OR manner to the corresponding output bits of each of the red look-up table RAMs 780 and 782. The resultant parallel connection of 8-bits represents a common output 788 of the red color processing circuits. The 4-bit data input port of the red overlay look-up table RAMs 784 and 788 are connected in parallel to the respective data-inport terminals of the red look-up table RAMs 780 and 782. Address inputs provided to the red overlay look-up table RAMs 784 and 786 are provided as 8 inputs from the overlay video processor 116. An additional address bit is provided from the least significant bit (LSB) 790 of the red shift register output bus, as well as an LSB address bit 792 from the blue shift register address bus. As a result, the red overlay look-up table RAMs 784 and 786 are each provided with a 10-bit address input. In like manner, two address lines 794 from the overlay video processor 116 are provided as LSB address inputs to both red look-up tables 780 and 782. The 8-bits from the red shift register 762, together with the two LSB address bits 794 from the overlay video processor 116 provide a 10-bit address input to each of the red look-up tables 780 and 782.

Access to the red look-up tables 780 and 782 and the red overlay look-up tables 784 and 786 is provided via the red plane image memory output bus 753. The transceiver circuit 107, noted above, is connected between certain address lines of the address bus 104 and other lines of the 64-bit red image memory data output 753. In a comparable manner, the data transceiver 109 is connected between the red image memory data output bus 757 and the internal data bus 70. In order to read or write the red look-up table 780 and 782 or the red overlay look-up table 784 and 786, the red video processor 110 is taken out of a mode in which it processes 64-bits of image memory pixel data, and is placed in a mode for receiving read, write and address information on the address bus 104. When data is to be written into the red look-up tables 780 and 782, then the data transceivers 109 are placed in a mode of operation in which data is transferred from the internal data bus 70 to the red image memory output data bus 753. When the red look-up tables 780 and 782 are to be read by the external processing circuits, the data transceivers 109 are placed in another mode of operation in which data is transferred from red video processor 110 on the red image memory output data bus 753 to the internal data bus 70. This arrangement provides an efficient technique for accessing the look-up tables 108 without requiring additional connectors or pins on the red video processor 110.

Because the data input of each color and overlay look-up table of the video output section 106 is connected to the red video processor 110, the writing of data into all such look-up tables 108 is conducted via the red video processor 110. Because the updating of the look-up tables 108 of the video output section 106 is somewhat infrequent, the interconnections and I/O terminals can be minimized by providing all look-up table write functions through the red video processor 110. With the exception of the feature that the red video processor 110 conducts the writing of all the look-up tables 108 of the video output section 106, the green, blue and overlay video processors 112–116 are constructed substantially identically to the red video processor 110.

Figure 47:
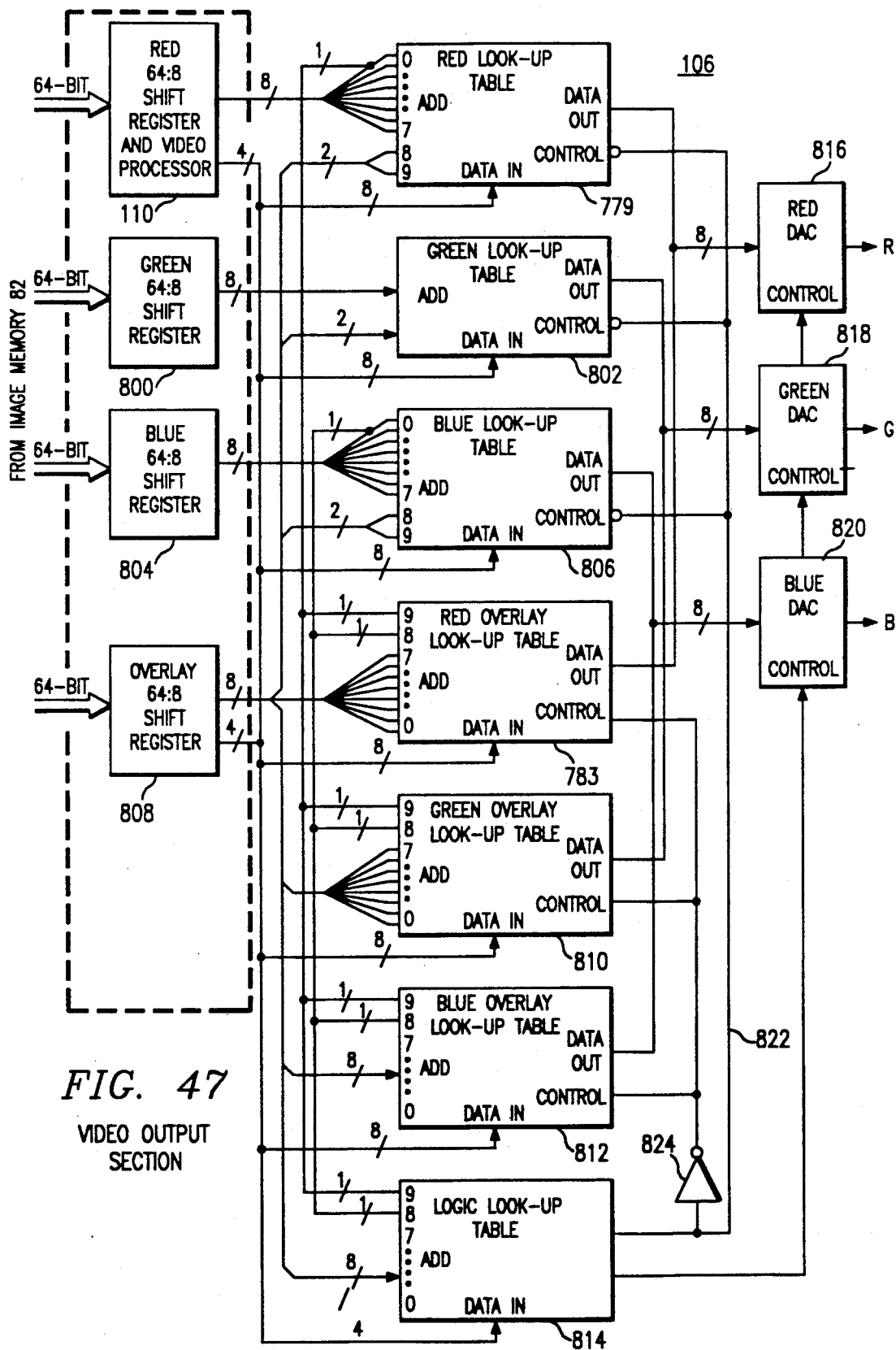
FIG. 47 illustrates in detailed block form the look-up table circuits of the video output section of the image computer of the invention.

FIG. 47 illustrates the circuits of the video output section 106 for processing image memory color data and for converting the same into red, green and blue video intensity signals. As described above, the red shift register 762 provides 8-bit addresses to the red look-up table 779. In like manner, the green shift register 800 provides 8-bit image data addresses to a green look-up table 802, and a blue shift register 804 provides 8-bit addresses to a blue look-up table 806. An overlay shift register 808 associated with the overlay video processor 116 provides 8-bit addresses to the red overlay look-up table 783, a green overlay look-up table 810, a blue overlay look-up table 812 and a logic look-up table 814. The output of the red look-up table 779 comprises 8-bits connected in parallel to the output of the red overlay look-up table 783. The green and blue look-up tables 802 and 806 are connected in a comparable manner to the respective green overlay look-up table 810 and the blue overlay look-up table 812. The three 8-bit outputs of the parallel-connected color look-up and overlay look-up tables are connected to the input of respective red, green and blue digital-to-analog converters 816–820. Each digital-to-analog converter converts the 8-bit digital input thereof to a corresponding output analog video signal directed to the color monitor 28. In the preferred form of the invention, the three converters 816–820 are integrated into a single integrated circuit.

The 8-bit address output of the red shift register 762 is connected to the most significant bit (MSB) address input of the red look-up table 779. The LSB address input to the red look-up table 779 is also connected to the MSB address input of each color overlay look-up table 783, 810 and 812, as well as the logic look-up table 814. The two LSB address inputs to the red look-up table 779 are supplied by the address output of the overlay shift register 808, and more particularly the two least significant bits thereof. With this address arrangement of the red look-up table 779, the two LSB output bits of the overlay shift register 808 are capable of providing access to four pages of the red look-up table 779, while the eight address bits provided by the red shift register 762 provide the unique address for accessing individual locations of each such page.

With the use of a 1k memory device, as noted above, the pages correspond to 256 addressable locations. The data-in port (DIN) of each look-up table is connected to the red video processor 110 for use in writing data into each such look-up table, as described above. The blue and green look-up tables 806 and 802 are addressed by eight address bits from the respective green and blue shift registers 800 and 804. Accessing of such tables to the individual memory locations is via the most significant bits derived from the output of the overlay shift register 808. In contrast with the red shift register output, the output of the green shift register 800 provides eight-bits only to the green look-up table 802, without the branching of associated least significant bits to the overlay look-up tables. Much like the red shift register output, the blue shift register output provides a least significant bit connected to a most significant bit address input of each color overlay table as well as to the logic look-up table 814. The least significant bits output by the red and blue shift registers 762 and 804 provide page control for the overlay and logic look-up tables. The cross-coupling of address information between the color shift registers and the overlay look-up tables, as well as between the overlay shift register 808 and the color look-up tables allows efficient page control without requiring additional address capabilities of the respective circuits.

As with conventional video look-up tables, a digital color representation is mapped into a true color digital representation and converted by a digital-to-analog converter into a corresponding true analog color signal. According to conventional techniques, the color look-up tables store true color representations which can effectively compress or expand the color spectrum according to specific purposes. For example, the color look-up tables may store color numbers within a narrow range so that when accessed and read, the intensity output does not vary significantly, even though the input intensity information is characterized by a large dynamic range. The contrast of the image is thereby diminished. To expand the contrast of an image without disturbing the image intensity information stored in the image memory 82, the color look-up tables would effectively store numbers having a wider dynamic range than that of the input image intensity data. When addressed, the outputs thereof provide a corresponding wider dynamic drive to the digital-to-analog converters and thereby effectively increase the contrast between the light and dark areas of the image. By providing four pages of addressable memory within each color look-up table, there are provided four different ranges of contrast into which the image memory intensity data can be mapped. The output of the overlay shift register 808 determines which page or intensity range in the color look-up tables will be active. Of course, the color look-up tables can be written with different mapping values to provide any desired number of intensity ranges. The color look-up tables can be rewritten with different mapping values during retrace or blanking periods of the video signal transmitted to the color monitor 28.

While the red, green and blue image memory sections store color value data of the image to be reproduced on the video monitor 28, the overlay plane 90 of the image memory 82 has stored in various locations thereof data which determines which page of the look-up table to be made active. Thus, when the color value data from the image memory 82 is read, together with the overlay data, the color look-up tables are simultaneously addressed by page address information, as well as location information within such page.

As described above, overlay information stored in the overlay plane 90 of the image memory 82 can correspond to text or cursor representations which are to be reproduced on the color monitor 28 at desired pixel locations, instead of image data. Thus, either a color look-up table is enabled or an overlay table is enabled for each pixel to produce the appropriate video signal. In other words, if a pixel corresponds to an image, the output of the color look-up tables will be selected. On the other hand, if the pixels represent text or cursor information, data in the overlay look-up tables will be selected for output to the video monitor 28. To that end, the logic look-up table 814 is provided for selecting whether the color or the overlay look-up tables will be selected. The output of the logic look-up table 814 includes a first conductor 822 connected to the color look-up tables for selection thereof when the signal output by the logic look-up table 814 is at a logic high level. An inverter 824 provides an inverted signal output by the logic look-up table 814 to the overlay tables. Thus, either the color look-up tables or the overlay look-up tables can be enabled in correspondence with the transmission of each pixel.

Much like the page selection of the color look-up tables, the overlay and logic look-up tables are page selected in accordance with the least significant bit of the respective red and blue shift register outputs. In various locations in the red and blue image memory planes 84 and 88, there is stored overlay look-up table page selection data, rather than image color value data. However, minimal degradation occurs since only the least significant bits of the image color data are affected when such locations are read and converted into color intensity information directed to the video monitor 28. It is also significant to note that since the human eye is most sensitive to the green colors, bits in the green image memory section are not used for page selection of the overlay look-up tables. The end result is that the presentation of images on the color monitor 28 are minimally affected by using various least significant bits of the color intensity information for page control in the overlay look-up tables. In order to further reduce the effect of any degradation occurring because of page select information stored in the image memory color planes, each overlay look-up table can have the same data stored in each page thereof. In this manner, the same data is output with respect to each overlay look-up table, irrespective of which page thereof is selected.

While the output of the logic look-up table 814 is shown controlling the color and overlay look-up tables, such output, in actual practice, is connected to the respective video processors for providing indirect control over the respective look-up tables. Also, the logic look-up table 814 has data stored therein for controlling the intensity of the red, green and blue digital-to-analog converters 816-820. An output of the logic look-up table is connected to each such digital-to-analog converter for providing a 10% increase in the intensity of the color signal output by each such converter. Conventional eight-bit digital-to-analog converters of the type noted are available with such an input control. This feature is useful for presenting cursor or text information overlayed on a bright image background. Thus, a cursor with increased intensity can be detected on a white or otherwise bright image background.

From the foregoing, disclosed is an image computer which is constructed and programmed to provide a highly-flexible processor to accommodate a major number of functions required for processing graphical and image data. The image computer of the invention provides a tree-structured arrangement of circuits, thereby allowing instructions to be separately operated upon by memory address processing circuits and image data processing circuits. The concurrent operation of such address and data processing circuits enable high-speed access to the image memory. The image memory and the pixel data processors are constructed to simultaneously process plural words of pixel data. Thus, not only is high-speed image data processing made possible, but also the parallel processing of plural words of pixel data. The image memory of the invention utilizes video DRAMS to permit independent operation of the dynamic random access portion thereof for pixel data processing purposes, as well as a serial shift register portion thereof for temporary pixel data storage for serial transferral to the video output section. By utilizing a large number of such video DRAMs, a large number of pixel words can be read from the image memory, thereby providing high resolution pixel information to the video monitor. For processing color video images, the image memory includes red, green and blue planes, each storing image color value data corresponding to the colors. Associated with each memory color plane is a parallel image processor and a video processor. Hence, pixel data for the primary colors is processed independently. The image memory further includes a viewable storage area which is much larger than that which can be accommodated by the standard video monitor. A window area is created in the image memory to provide a portion of the overall image which is selectable for viewing. Also provided is a memory manager unit which can accommodate images even larger than that storable in the image memory comprising the video DRAMs. The total image is stored in a mass storage unit, such as a disk unit, and on an as needed basis, the memory manager unit updates the image memory with that portion of the image which is required by the user to be processed or viewed on the monitor. The operations of the memory manager unit are transparent to the user and the programmer, and thus facilitate storage and processing of large images.

The image computer also includes circuits for providing error detection and correction of data read from the image memory. All data stored in the image memory, including pixel data, coefficient data, instruction data, etc. undergoes the error detection and correction process. The reliability of the image computer is thereby enhanced.

While the preferred embodiments of the methods and apparatus have been disclosed with reference to specific structures, circuits, memories and the like, it is to be understood that many changes in detail may be made as a matter of engineering choices without departing from the spirit and scope of the invention as defined by the appended claims. Indeed, those skilled in the art may prefer to embody the apparatus in other forms, and in light of the present description, they will find it easy to implement that choice. Also, it is not necessary to adopt all of the various advantageous features of the present disclosure into a single composite image computer system in order to realize the individual advantages disclosed herein.

TABLE I

APPENDIX
Sequencer Field Description

| 5 4 3 2 1 0 | Name | Meaning |
| --- | --- | --- |
| 0 0 0 0 0 0 | cont | Continue to next address |
| 0 0 0 0 0 1 | jsr | Jump to sub via B-bus |
| 0 0 0 0 1 0 | rtn | Return from subroutine |
| 0 0 0 0 1 1 | rplx | Repeat loop 'til X = 0, x-- |
| 0 0 0 1 0 0 | push | Push onto stack |
| 0 0 0 1 0 1 | loopt | Loop back if true |
| 0 0 0 1 1 0 | jpr | Jump via B-bus |
| 0 0 0 1 1 1 | jsrt | Jump to subroutine if true |
| 0 0 1 0 0 0 | jsrf | Jump to subroutine if false |
| 0 0 1 0 0 1 | loopf | Loop back if false |
| 0 0 1 0 1 0 | -- | Undefined |
| 0 0 1 0 1 1 | rply | Repeat loop ' til y = 0, y-- |
| 0 0 1 1 0 0 | ldxr | Load x via B-bus |
| 0 0 1 1 0 1 | ldyr | Load y via B-bus |
| 0 0 1 1 1 0 | pldxr | Push onto stack, load x via B-bus |
| 0 0 1 1 1 1 | pldyr | Push onto stack, load y via B-bus |
| 0 1 0 0 0 0 | j16r | 1-of-16 jump via B-bus |
| 0 1 0 0 0 1 | j16sr | 1-of-16 jump to subr via B-bus |
| 0 1 0 0 1 0 | twbxrt | TWB via B-bus if true 'til x=0 |
| 0 1 0 0 1 1 | twbyrt | TWB via B-bus if true 'til y=0 |
| 0 1 0 1 0 0 | -- | Undefined |
| 0 1 0 1 0 1 | -- | Undefined |
| 0 1 0 1 1 0 | twbxrf | TWB if false via B-bus 'til x=0 |
| 0 1 0 1 1 1 | twbyrf | TWB if false via B-bus 'til y = 0 |
| 0 1 1 0 0 0 | -- | Undefined |
| 0 1 1 0 0 1 | -- | Undefined |
| 0 1 1 0 1 0 | popc | Pop stack to C-bus |
| 0 1 1 0 1 1 | pushc | Push stack from C-bus |
| 0 1 1 1 0 0 | rstk | Read stack using stack read ptr |
| 0 1 1 1 0 1 | pirr | Push interrupt return register |
| 0 1 1 1 1 0 | rx | Read x counter |
| 0 1 1 1 1 1 | ry | Read y counter |
| 1 0 0 0 0 0 | jmp | Jump immediate |

TABLE I-continued

APPENDIX
Sequencer Field Description

| 5 4 3 2 1 0 | Name | Meaning |
|---|---|---|
| 1 0 0 0 0 1 | jmpt | Jump immediate if true |
| 1 0 0 0 1 0 | js | Jump immediate to subroutine |
| 1 0 0 0 1 1 | jst | Jump immediate to subr if true |
| 1 0 0 1 0 0 | j16 | 1-of-16 jump immediate |
| 1 0 0 1 0 1 | j16s | 1-of-16 jump immediate to subr |
| 1 0 0 1 1 0 | twbxt | TWB immediate if true 'til x=0 |
| 1 0 0 1 1 1 | twbyt | TWB immediate if true 'til y=0 |
| 1 0 1 0 0 0 | twbxf | TWB immediate if false 'til x=0 |
| 1 0 1 0 0 1 | twbyf | TWB immediate if false 'til y=0 |
| 1 0 1 0 1 0 | jmpf | Jump immediate if false |
| 1 0 1 0 1 1 | jsf | Jump immediate to subr if false |
| 1 0 1 1 0 0 | -- | Undefined |
| 1 0 1 1 0 1 | -- | Undefined |
| 1 0 1 1 1 0 | -- | Undefined |
| 1 0 1 1 1 1 | -- | Undefined |
| 1 1 0 0 0 0 | ldx | Load x immediate |
| 1 1 0 0 0 1 | ldy | Load y immediate |
| 1 1 0 0 1 0 | pldx | Push onto stack, load x immediate |
| 1 1 0 0 1 1 | pldy | Push onto stack, load y immediate |
| 1 1 0 1 0 0 | -- | Undefined |
| 1 1 0 1 0 1 | -- | Undefined |
| 1 1 0 1 1 0 | -- | Undefined |
| 1 1 0 1 1 1 | -- | Undefined |
| 1 1 1 0 0 0 | -- | Undefined |
| 1 1 1 0 0 1 | -- | Undefined |
| 1 1 1 0 1 0 | -- | Undefined |
| 1 1 1 0 1 1 | -- | Undefined |
| 1 1 1 1 0 0 | rtnt | Return from subroutine if true |
| 1 1 1 1 0 1 | rtnf | Return from subroutine if false |
| 1 1 1 1 1 0 | jmpcs | Jump immediate and clear stack |
| 1 1 1 1 1 1 | jzcs | Jump to zero and clear stack |

TABLE II

X-Y Adder Field Definition

A.

| Y1 | Y0 | MEANING | DWE* |
|---|---|---|---|
| 0 | 0 | Pass B | No Write |
| 0 | 1 | Add | Write |
| 1 | 0 | Inc B | Write |
| 1 | 1 | Dec B | Write |

B.

| X3 | X2 | X1 | X0 | MEANING |
|---|---|---|---|---|
| 0 | 0 | 0 | 0 | Pass A |
| 0 | 0 | 0 | 1 | B−A (0) |
| 0 | 0 | 1 | 0 | A−B (0) |
| 0 | 0 | 1 | 1 | A+B (0) |
| 0 | 1 | 0 | 0 | A XOR B |
| 0 | 1 | 0 | 1 | A or B |
| 0 | 1 | 1 | 0 | A and B |
| 0 | 1 | 1 | 1 | Nes A |
| 1 | 0 | 0 | 0 | Inv A |
| 1 | 0 | 0 | 1 | Dec A |
| 1 | 0 | 1 | 0 | A−B (1) |
| 1 | 0 | 1 | 1 | A+B (1) |
| 1 | 1 | 0 | 0 | B−A (cc) |
| 1 | 1 | 0 | 1 | A−B (cc) |
| 1 | 1 | 1 | 0 | A+B (cc) |
| 1 | 1 | 1 | 1 | Incr A |

C.

| | | MEANING |
|---|---|---|
| 0 | 0 | Pass A |
| 0 | 1 | A or B |
| 1 | 0 | A XOR B |
| 1 | 1 | A and B |

TABLE III

Barrel Shift and Bit Reversal Field Definition

| bsbr2 | bsbr1 | bsbr0 | MEANING |
|---|---|---|---|
| 0 | 0 | 0 | Shift Left Logical (SLL) |
| 0 | 0 | 1 | Shift Right Logical (SRL) |

TABLE III-continued

Barrel Shift and Bit Reversal Field Definition

| bsbr2 | bsbr1 | bsbr0 | MEANING |
|---|---|---|---|
| 0 | 1 | 0 | Rotate Left (ROTL) |
| 0 | 1 | 1 | Shift Right Arithmetic (SRA) |
| 1 | 0 | 0 | SLL with Register value (SLLR) |
| 1 | 0 | 1 | SRL With Register value (SRLR) |
| 1 | 1 | 0 | SLL with Bit reversal (SLLB) |
| 1 | 1 | 1 | SRA with Register value (SRAR) |

TABLE IV

Bus Control Field Definition

A.

| IDB | IDB0 | | MEANING |
|---|---|---|---|
| | 0 | | A - IDB |
| | 1 | | NOP |

B.

| ADDRESS | Addr1 | Addr0 | MEANING |
|---|---|---|---|
| Bus | 0 | 0 | NOP |
| | 0 | 1 | Y Adder - Addr |
| | 1 | 0 | X ALU - Addr |
| | 1 | 1 | M/A - Addr |

C.

| | Addr0 | MEANING |
|---|---|---|
| | 0 | NOP |
| | 1 | Y Adder - Addr |

A.

| C BUS | | | | | |
|---|---|---|---|---|---|
| CB4 | CB3 | CB2 | CB1 | CB0 | MEANING |
| 0 | 0 | 0 | 0 | 0 | NOP |
| 0 | 0 | 0 | 0 | 1 | IDB - C reg |
| 0 | 0 | 0 | 1 | 0 | IDB (msb) - Stipple reg |
| 0 | 0 | 0 | 1 | 1 | IDB - MF reg |
| 0 | 0 | 1 | 0 | 0 | IDB - Intr Vector |
| 0 | 0 | 1 | 0 | 1 | IDB - Sequencer |
| 0 | 0 | 1 | 1 | 0 | IDB - Conditionals |
| 0 | 0 | 1 | 1 | 1 | MF bus - C reg |
| 0 | 1 | 0 | 0 | 0 | M/A - C reg |
| 0 | 1 | 0 | 0 | 1 | X ALU - C reg |
| 0 | 1 | 0 | 1 | 0 | X ALU(msb)- Stipple reg |
| 0 | 1 | 0 | 1 | 1 | X ALU - MF reg |
| 0 | 1 | 1 | 0 | 0 | X ALU - Intr Vector |
| 0 | 1 | 1 | 0 | 1 | X ALU - Sequencer |
| 0 | 1 | 1 | 1 | 0 | X ALU - Status reg |
| 0 | 1 | 1 | 1 | 1 | NOP |
| 1 | 0 | 0 | 0 | 0 | Sequencer - C reg |
| 1 | 0 | 0 | 0 | 1 | Conditionals - C reg |
| 1 | 0 | 0 | 1 | 0 | Intr Vector - C reg |
| 1 | 0 | 0 | 1 | 1 | NOP |
| 1 | 0 | 1 | 0 | 0 | X min/max - C reg |
| 1 | 0 | 1 | 0 | 1 | Y min/max - C reg |
| 1 | 0 | 1 | 1 | 0 | X/Y pixel - C reg |
| 1 | 0 | 1 | 1 | 1 | NOP |
| 1 | 1 | 0 | 0 | 0 | MF reg - C reg |
| 1 | 1 | 0 | 0 | 1 | NOP |
| 1 | 1 | 0 | 1 | 0 | NOP |
| 1 | 1 | 0 | 1 | 1 | NOP |
| 1 | 1 | 1 | 0 | 0 | NOP |
| 1 | 1 | 1 | 0 | 1 | NOP |
| 1 | 1 | 1 | 1 | 0 | NOP |
| 1 | 1 | 1 | 1 | 1 | Interrupt Acknowledge |

B.

| | | | MEANING |
|---|---|---|---|
| 0 | 0 | 0 | NOP |
| 0 | 0 | 1 | IDB - C reg |
| 0 | 1 | 0 | IDB - Sequencer |
| 0 | 1 | 1 | MF bus - C reg |
| 1 | 0 | 0 | M/A - C reg |
| 1 | 0 | 1 | X ALU - C reg |
| 1 | 1 | 0 | X ALU - Sequencer |
| 1 | 1 | 1 | X ALU(msb)- - Stipple reg |

C.

| | | MEANING |
|---|---|---|
| 0 | 0 | NOP |
| 0 | 1 | IDB - C reg |
| 1 | 0 | IDB - Sequencer |
| 1 | 1 | MF bus - C reg |

D.

| | MEANING |
|---|---|
| 0 | NOP |
| 1 | X ALU - Status reg |

TABLE V

Circuit Control Field Definition

A.

TABLE V-continued

Circuit Control Field Definition

| in3 | in2 | in1 | in0 | Y Add | X ALU | LFT Mult | RGT Mult | Add | Sign |
|---|---|---|---|---|---|---|---|---|---|
| 0 | 0 | 0 | 0 | y_step | x_step | x_size | b_upper | a_upper | s |
| 0 | 0 | 0 | 1 | y_step | x_step | x_size | b_upper | a | s |
| 0 | 0 | 1 | 0 | y_step | x_step | x_size | b_lower | a_upper | s |
| 0 | 0 | 1 | 1 | y_step | x_step | x_size | b_lower | a | s |
| 0 | 1 | 0 | 0 | y_step | x_step | a_upper |  | b_upper | N/A s |
| 0 | 1 | 0 | 1 | y_step | x_step | a_upper |  | b_lower | N/A s |
| 0 | 1 | 1 | 0 | y_step | x_step | a_lower |  | b_upper | N/A s |
| 0 | 1 | 1 | 1 | y_step | x_step | a_lower |  | b_lower | N/A s |
| 1 | 0 | 0 | 0 | y_step | b | x_size | b_lower | a_upper | s |
| 1 | 0 | 0 | 1 | y_step | b | x_size | b_lower | a | s |
| 1 | 0 | 1 | 0 | a | x_step | x_size | b_upper | a | s |
| 1 | 0 | 1 | 1 | a | x_step | x_size | b_lower | a | s |
| 1 | 1 | 0 | 0 | a | b | x_size | b_lower | a | s |
| 1 | 1 | 0 | 1 | y_step | x_step | a_upper |  | b_lower | N/A s |
| 1 | 1 | 1 | 0 | y_step | x_step | a_lower |  | b_upper | N/A s |
| 1 | 1 | 1 | 1 | y_step | x_step | a_lower |  | b_lower | N/A s |

B.

| | | | | A bus | | B bus | |
|---|---|---|---|---|---|---|---|
| xy3 | xy2 | xy1 | xy0 | upper | lower | upper | lower |
| 0 | 0 | 0 | 0 | xxx | xxx | xxx | xxx |
| 0 | 0 | 0 | 1 |  | xxx |  | x_step |
| 0 | 0 | 1 | 0 |  | y_step |  | xxx |
| 0 | 0 | 1 | 1 |  | y_step |  | x_step |
| 0 | 1 | 0 | 0 | xxx | x_size | xxx | xxx |
| 0 | 1 | 0 | 1 | x_max | x_min | y_max | y_min |
| 0 | 1 | 1 | 0 | xxx | x_min | xxx | y_min |
| 0 | 1 | 1 | 1 | xxx | x_max | xxx | y_max |
| 1 | 0 | 0 | 0 | xxx | x_min | xxx | xxx |
| 1 | 0 | 0 | 1 | xxx | x_max | xxx | xxx |
| 1 | 0 | 1 | 0 | xxx | xxx | xxx | y_min |
| 1 | 0 | 1 | 1 | xxx | xxx | xxx | y_max |
| 1 | 1 | 0 | 0 | x_min | xxx | y_min | xxx |
| 1 | 1 | 0 | 1 | x_max | xxx | y_max | xxx |
| 1 | 1 | 1 | 0 | xxx | x_addr | xxx | y_addr |
| 1 | 1 | 1 | 1 | x_addr |  | xxx | y_addr xxx |

C.

| | | upper | lower | upper | lower |
|---|---|---|---|---|---|
| | 0 | xxx | xxx | xxx | xxx |
| | 1 | x_addr | xxx | y_addr | xxx |

D.

| A bus | NAME | STAT/STIP | MEANING |
|---|---|---|---|
| 0 | MF Invert | Status | 1: MF data inverted |
| 1 | MF Jam | Status | 1: Stipple = MF bus |
| 2 | MF select | Status | 1: MF reg, 0: WCC |
| 3 | Addr sel | Status | (Not Used) |
| 4 | Intr enable | Status | 1: enabled |
| 5 | Pix word | Status | 1: 0x00 or 0xff to MF bus |
| 6 | (spare) | Status |  |
| 7 | (spare) | Status |  |
| 8 | Stipple (0) | Stipple | Stipple register (lsb) |
| 9 | Stipple (1) | Stipple |  |
| 10 | Stipple (2) | Stipple |  |
| 11 | Stipple (3) | Stipple |  |
| 12 | Stipple (4) | Stipple |  |
| 13 | Stipple (5) | Stipple |  |
| 14 | Stipple (6) | Stipple |  |
| 15 | Stipple (7) | Stipple | Stipple register (msb) |
| 16-31 | (not used) | 0 |  |

TABLE VI

| Bits | Length | Field/Description |
|---|---|---|
| 31 | 1 | A port override |
| 30 | 1 | <unused> |
| 29 | 1 | A port enable |
| 28-24 | 5 | A port address |
| 23 | 1 | B port override |
| 22 | 1 | <unused> |
| 21 | 1 | B port enable |
| 20-16 | 5 | B port address |
| 15 | 1 | C port override |
| 14 | 1 | <unused> |
| 13 | 1 | C port enable |
| 12-8 | 5 | C port address |
| 7 | 1 | D port override |
| 6 | 1 | <unused> |
| 5 | 1 | D port enable |
| 4-0 | 5 | D port address |

TABLE VII
PARALLEL IMAGE PROCESSOR
ALU Operations

| Mode | Code | Arith/log | IN + Cin | Flag | Code | Shift | Code |
|---|---|---|---|---|---|---|---|
| 8 × 8 | 0 | 0 (Clear) | 000000 0 | CLR | 000 | NO SHIFT | 000 |
| 4 × 16 | 1 | A NOR B | 000001 0 | SET | 001 | SHL/FILL 0 | 001 |
| | | XA AND B | 000010 0 | MF | 010 | SHR/FILL 1 | 010 |
| | | A AND XB | 000100 0 | LSB | 011 | ROTL | 011 |
| | | A AND B | 001000 0 | ZERO | 100 | NO SHIFT | 100 |
| | | A OR B | 001110 0 | MSB | 101 | SHR/FILL 0 | 101 |
| | | A NAND B | 000111 0 | Cout | 110 | SHR/FILL 1 | 110 |
| | | A EXOR B | 000110 0 | OVR | 111 | ROTR | 111 |
| | | A EXNOR B | 001001 0 | | | | |
| | | NOT A | 000011 0 | | | | |
| | | NOT B | 001100 0 | | | | |
| | | A | 001100 0 | | | | |
| | | B | 001010 0 | | | | |
| | | 1 (set) | 001111 0 | | | | |
| | | A PLUS B | 100110 0 | | | | |
| | | A MINUS B | 011001 1 | | | | |
| | | INC A | 001100 1 | | | | |
| | | INC B | 001010 1 | | | | |
| | | DEC A | 110011 1 | | | | |
| | | A + B + 1 | 100110 1 | | | | |
| | | A − B − 1 | 011001 0 | | | | |

What is claimed is:

1. An image processing system, comprising:
   a memory for storing image data, said memory having a number of storage locations greater than needed for displaying an image on a monitor;
   a memory address generation circuit for generating addresses for accessing said memory;
   a window defining circuit for defining a window are in said memory corresponding to a viewable area of said monitor;
   circuitry for simultaneously writing plural pixels to said memory;
   a window clipping circuitry for monitoring the addresses generated by said address generator circuit and operable to determine whether any one of said plural pixels are located outside said window; and
   masking circuitry for writing selected bits of desired pixels into said memory without overwriting non-selected bits.

2. The image processing system of claim 1, further including means for moving said window area to different areas in said memory.

3. The image processing system of claim 1, further including means for defining said window having a corner coordinate of $X_0$, $Y_0$ and a diagonal corner coordinate of $X_1$, $Y_1$ and means for storing said coordinates for comparison with a pixel location defined as having coordinates X, Y.

4. The image processing system of claim 1 wherein masking circuitry comprises circuitry for generating a pixel mask indicating the desired pixels and for generating a bit mask indicating the selected bits within the pixels to mask.

5. The image processing system of claim 4 wherein said circuitry for simultaneously writing comprises circuitry for simultaneously writing a predetermined number of pixels in the memory and wherein said masking circuitry comprises circuitry for generating a pixel mask word having a bit corresponding to each of said predetermined number of pixels.

6. The image processing system of claim 5 wherein each pixel comprises a predetermined number o bits and wherein masking circuitry further comprises circuitry for generating a bit mask word having a bit corresponding to each of said predetermined number of pixel bits.

7. A method of processing image data comprising the steps of:
   storing image data in a memory having a number of storage locations greater than needed for displaying an image on a monitor;
   generating addresses for accessing said memory;
   defining a window area in said memory corresponding to a viewable are of said monitor;
   generating plural pixels for simultaneously writing to said memory;
   monitoring the generated addresses and determining whether one or more of the plural pixels are located outside said window; and
   writing selected bits of desired pixels into the memory without overwriting nonselected bits.

8. The method of claim 7 and further comprising the step of moving the window area to different area in said memory.

9. The method of claim 7 and further comprising the step of defining a wind having a corner coordinate of $X_0$, $Y_0$, and a diagonal corner coordinate of $X_1$, $Y_1$.

10. The method of claim 4 and further comprising the step of storing said coordinates for comparison with a pixel location defined as having coordinates X, Y.

11. The method of claim 7 wherein said writing step comprises the steps of generating a pixel mask indicating the desired pixels and generating a bit mask indicating which the selected bits to mask within the desired pixels.

12. The method of claim 11 wherein said step of generating plural pixels comprises the step of generating a predetermined number of pixels for writing to the memory and wherein said step of generating a pixel mask word having a bit corresponding to each of said predetermined number of pixels.

13. The method of claim 12 wherein each pixel comprises a predetermined number of bits and wherein said step of generating a bit mask comprises the step of generating a bit mask word having a bit corresponding to each of said predetermined number of pixel bits.

* * * * *

UNITED STATES PATENT AND TRADEMARK OFFICE
CERTIFICATE OF CORRECTION

PATENT NO. : 5,146,592

DATED : September 8, 1992

INVENTOR(S) : David M. Pfeiffer et al.

It is certified that error appears in the above-identified patent and that said Letters Patent is hereby corrected as shown below:

Column 16, line 5, delete "FIGUREs" and insert -- FIG.--.

Column 20, line 57, after "the", delete "coordinate" and insert -- coordinates --.

Column 29, line 37, after "in", change "black" to "block".

Column 36, line 10, after "424" insert -- , --.

Column 51, line 6, after "the", change "associate" to "associated".

Column 60, line 10, after "such" insert -- a --.

Column 62, line 32, after "which", change "defined" to "defines".

Column 89:
Claim 1, line 31, after "window", delete "are" and insert -- area --.

Column 89:
Claim 6, line 65, after "number", delete "o" and insert -- of --.

Column 90:
Claim 7, line 33, after "viewable", delete "are" and insert -- area --.

Column 90:
Claim 8, line 42, after "different", delete "area" and insert -- areas --.

UNITED STATES PATENT AND TRADEMARK OFFICE
CERTIFICATE OF CORRECTION

PATENT NO. : 5,146,592

DATED : September 8, 1992

INVENTOR(S) : David M. Pfeiffer et al.

It is certified that error appears in the above-identified patent and that said Letters Patent is hereby corrected as shown below:

Column 90:
Claim 9, line 45, after "a" 1st occurrence, delete "wind" and insert -- window --.

Column 90:
Claim 10, line 47, after "claim", change "4" to --9--.

Signed and Sealed this

Twelfth Day of October, 1993

Attest:

BRUCE LEHMAN

Attesting Officer

Commissioner of Patents and Trademarks